(12) United States Patent
Lee et al.

(10) Patent No.: US 12,296,310 B2
(45) Date of Patent: May 13, 2025

(54) COSMETIC MANUFACTURING APPARATUS, CONTROL METHOD OF THE SAME, AND COSMETIC MANUFACTURING SYSTEM

(71) Applicant: AMOREPACIFIC CORPORATION, Seoul (KR)

(72) Inventors: Jaehyung Lee, Yongin-si (KR); Jongwoo Kim, Yongin-si (KR); Dongyoung Kim, Yongin-si (KR); Kyungjun Ma, Yongin-si (KR); Jongchul Park, Yongin-si (KR); Hyunseung Lee, Yongin-si (KR); Jinu Im, Yongin-si (KR); Byeng Su Joung, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 873 days.

(21) Appl. No.: 17/478,045

(22) Filed: Sep. 17, 2021

(65) Prior Publication Data
US 2022/0088550 A1 Mar. 24, 2022

(30) Foreign Application Priority Data

Sep. 22, 2020 (KR) .......................... 10-2020-0122025
Sep. 22, 2020 (KR) .......................... 10-2020-0122038
(Continued)

(51) Int. Cl.
*B01F 15/00* (2006.01)
*A45D 44/00* (2006.01)
(Continued)

(52) U.S. Cl.
CPC ........ *B01F 35/2205* (2022.01); *A45D 44/005* (2013.01); *B01F 23/69* (2022.01);
(Continued)

(58) Field of Classification Search
CPC .. B01F 35/2205; B01F 23/69; B01F 33/8442; B01F 35/7176; B01F 2101/21;
(Continued)

(56) References Cited

U.S. PATENT DOCUMENTS 4,871,262 A * 10/1989 Krauss ................. B01F 35/714
366/605
5,903,465 A * 5/1999 Brown .................... G07F 17/18
700/242
(Continued)

FOREIGN PATENT DOCUMENTS

| EP | 1093842 A1 | 4/2001 |
|---|---|---|
| KR | 10-1694147 B1 | 1/2017 |
| KR | 10-2019-0050832 A | 5/2019 |

*Primary Examiner* — Donnell A Long
(74) *Attorney, Agent, or Firm* — Sughrue Mion, PLLC

(57) ABSTRACT

A cosmetic manufacturing apparatus includes a main body providing a cosmetic manufacturing space; a part supply unit providing at least one of a mixing container for accommodating cosmetic materials and a component constituting a cosmetic container; a cosmetic material supply unit for discharging one or more cosmetic materials stored in a cosmetic material storage unit to the mixing container; a conveying means for moving at least one of the mixing container and the component constituting the cosmetic container which have been provided to the part supply unit; and a control unit for controlling at least one of the cosmetic material supply unit and the conveying means so that the one or more cosmetic materials stored in the cosmetic material storage unit are mixed and accommodated into at least one of the mixing container and the component constituting the cosmetic container.

12 Claims, 25 Drawing Sheets

(30) Foreign Application Priority Data

| | | |
|---|---|---|
| Sep. 22, 2020 | (KR) | 10-2020-0122387 |
| Sep. 22, 2020 | (KR) | 10-2020-0122396 |
| Sep. 22, 2020 | (KR) | 10-2020-0122410 |
| Sep. 22, 2020 | (KR) | 10-2020-0122429 |
| Sep. 22, 2020 | (KR) | 10-2020-0122457 |
| Sep. 22, 2020 | (KR) | 10-2020-0122594 |

(51) Int. Cl.

| | |
|---|---|
| *B01F 3/18* | (2006.01) |
| *B01F 13/10* | (2006.01) |
| *B01F 15/02* | (2006.01) |
| *B01F 23/60* | (2022.01) |
| *B01F 33/84* | (2022.01) |
| *B01F 35/22* | (2022.01) |
| *B01F 35/71* | (2022.01) |
| *G05B 19/418* | (2006.01) |
| *B01F 101/21* | (2022.01) |
| *G06Q 10/087* | (2023.01) |

(52) U.S. Cl.
CPC ...... *B01F 33/8442* (2022.01); *B01F 35/7176* (2022.01); *G05B 19/41865* (2013.01); *G05B 19/4189* (2013.01); *A45D 2044/007* (2013.01); *B01F 2101/21* (2022.01); *G05B 2219/32035* (2013.01); *G06Q 10/087* (2013.01)

(58) Field of Classification Search
CPC ........ B01F 29/30; B01F 33/85; B01F 35/881; A45D 44/005; A45D 2044/007; G05B 19/41865; G05B 19/4189; G05B 2219/32035; G06Q 10/087; Y02P 90/02
See application file for complete search history.

(56) References Cited

U.S. PATENT DOCUMENTS

| | | | |
|---|---|---|---|
| 2008/0087352 A1* | 4/2008 | Malanowicz | B01F 33/846 141/69 |
| 2014/0277704 A1 | 9/2014 | Memar | |
| 2019/0291069 A1 | 9/2019 | McIntosh | |

* cited by examiner

[FIG. 1]
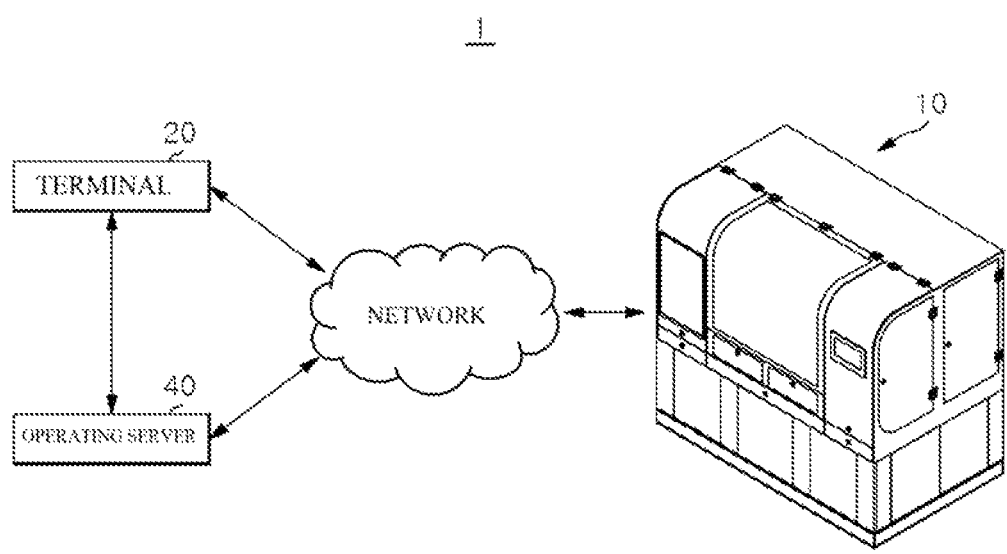

[FIG. 2]
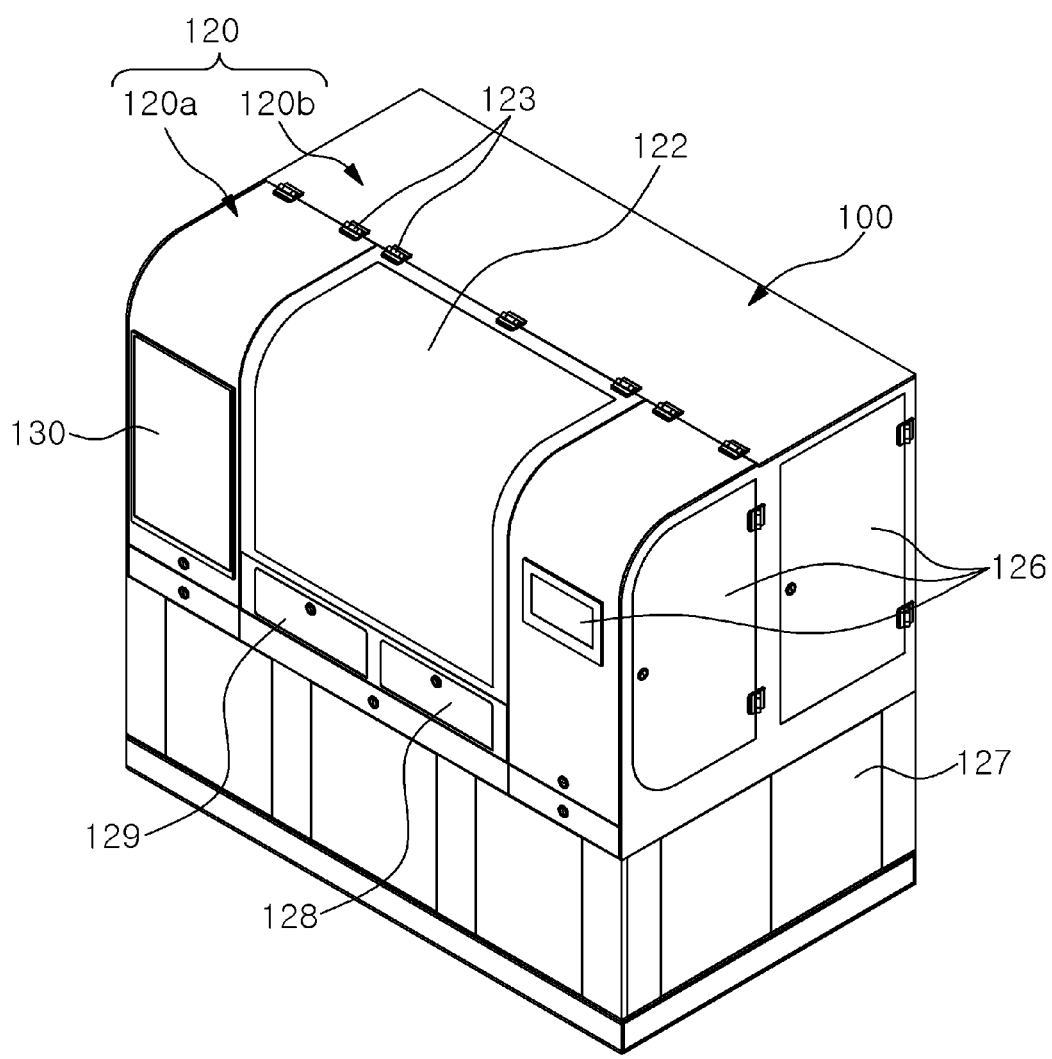

[FIG. 3]
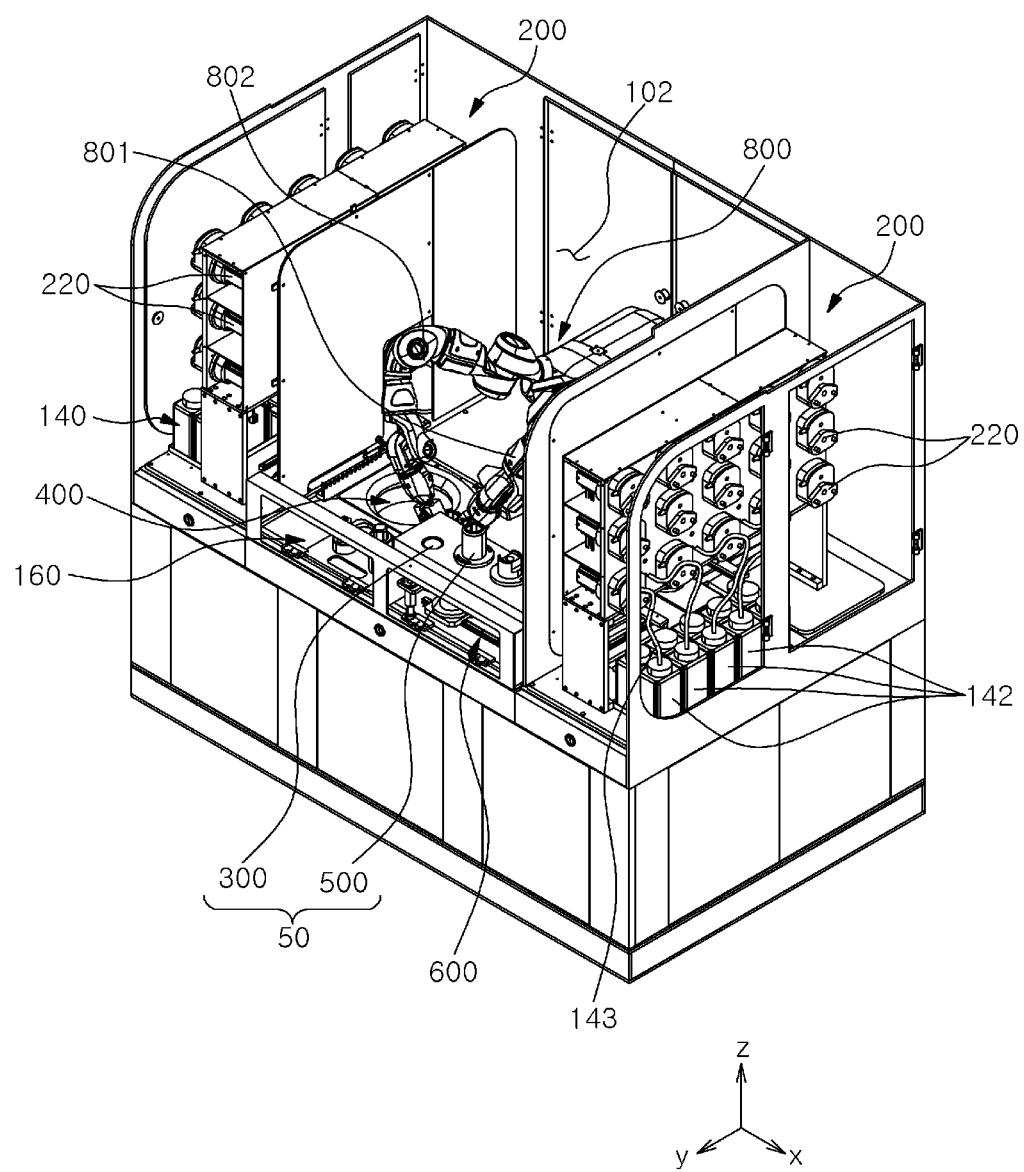

[FIG. 4]
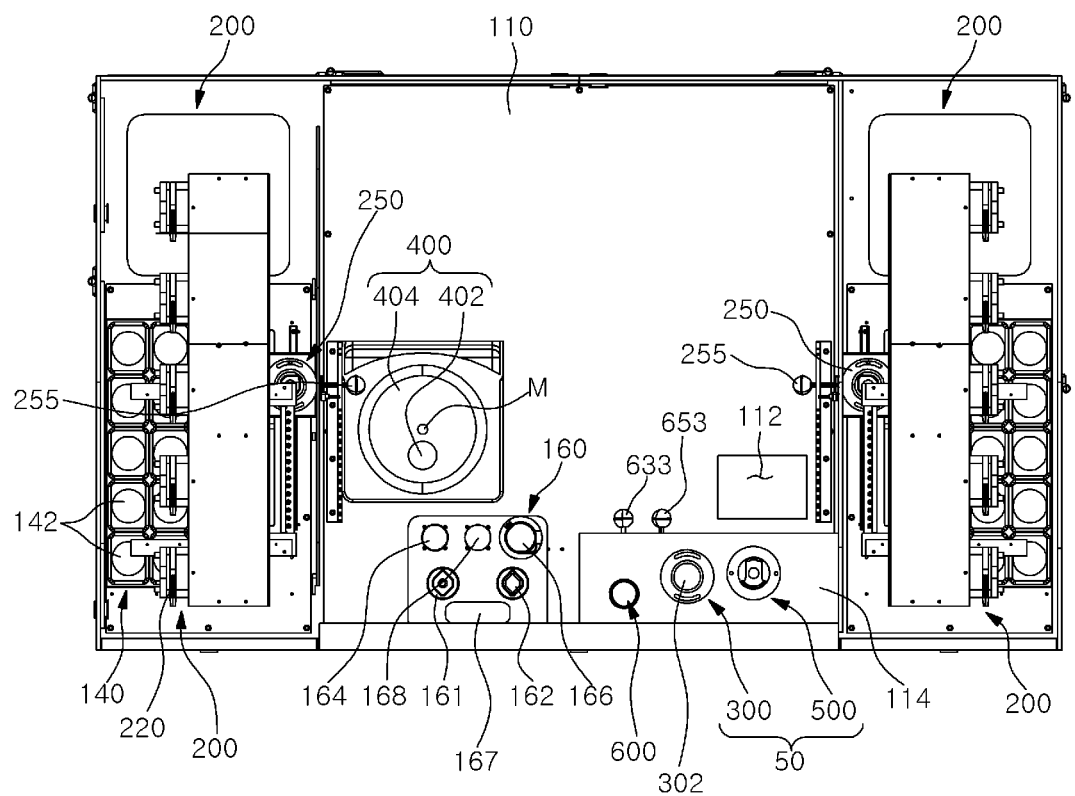

[FIG. 5]
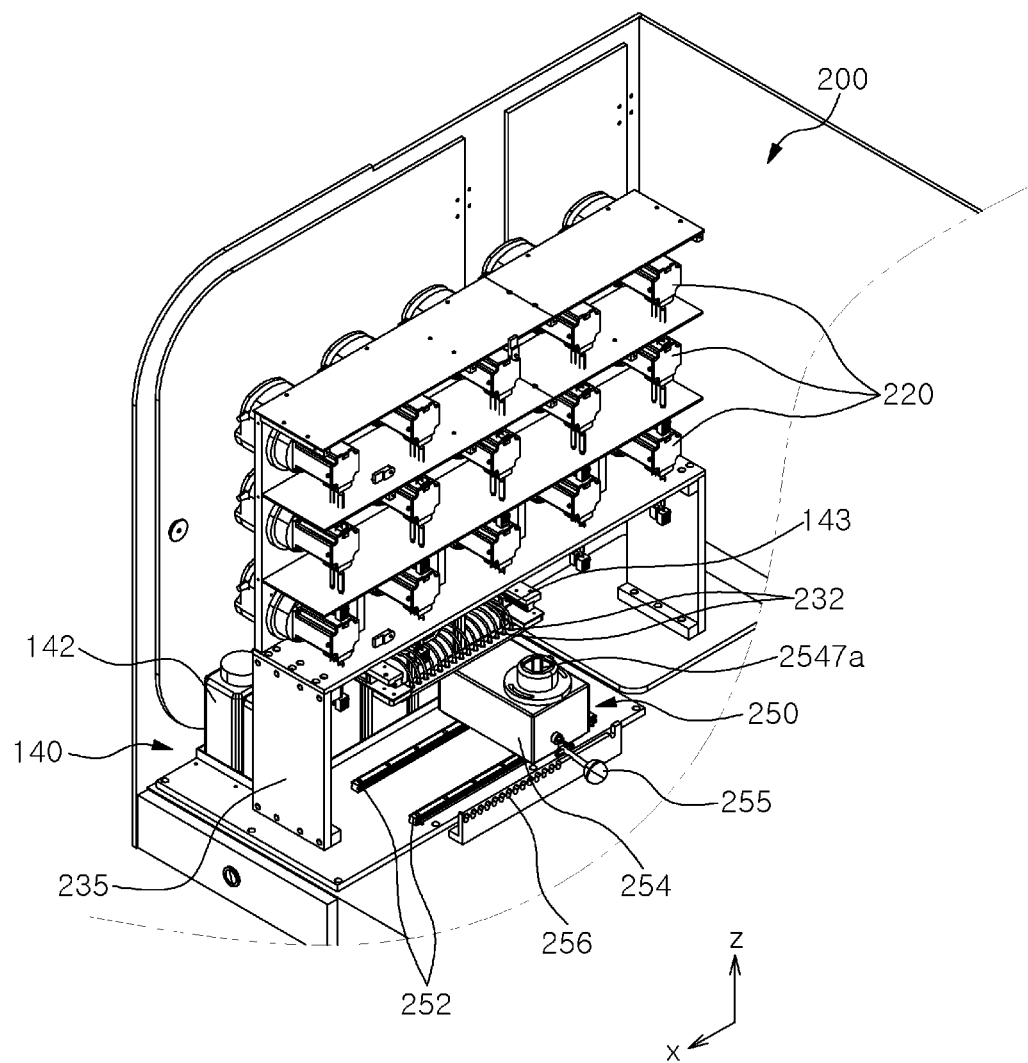

[FIG. 6]
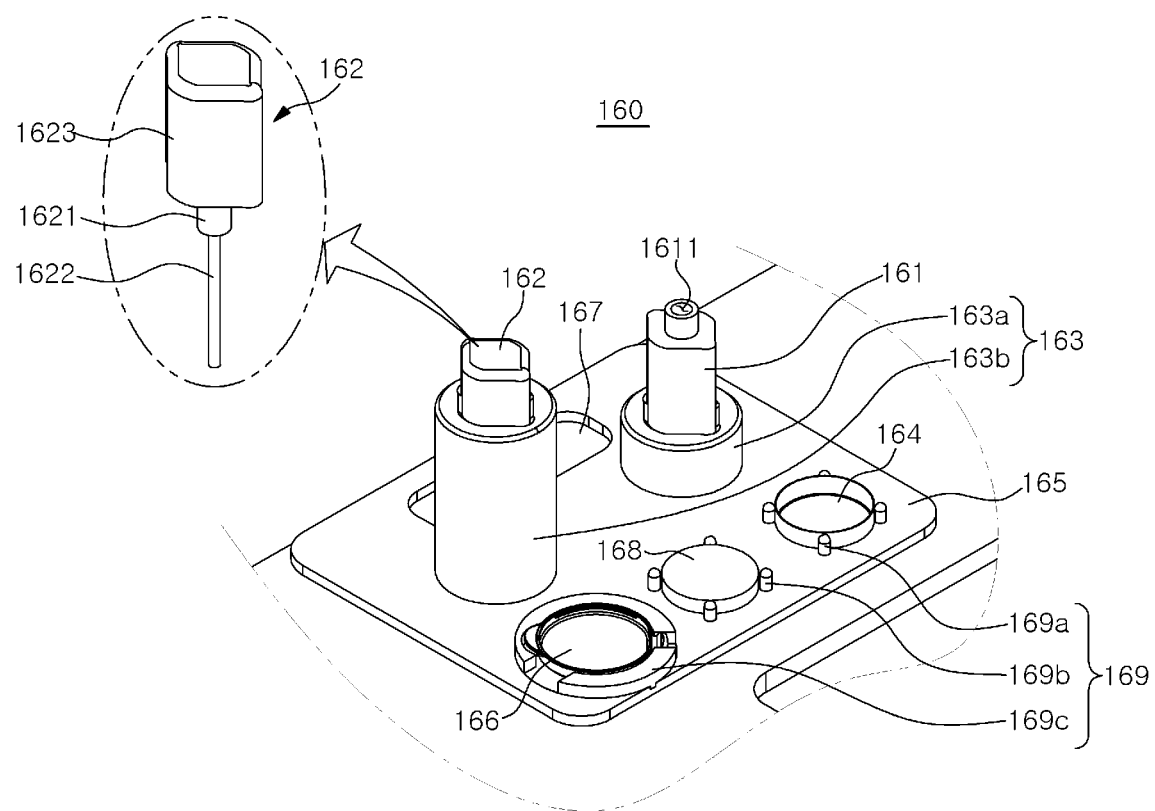

[FIG. 7]
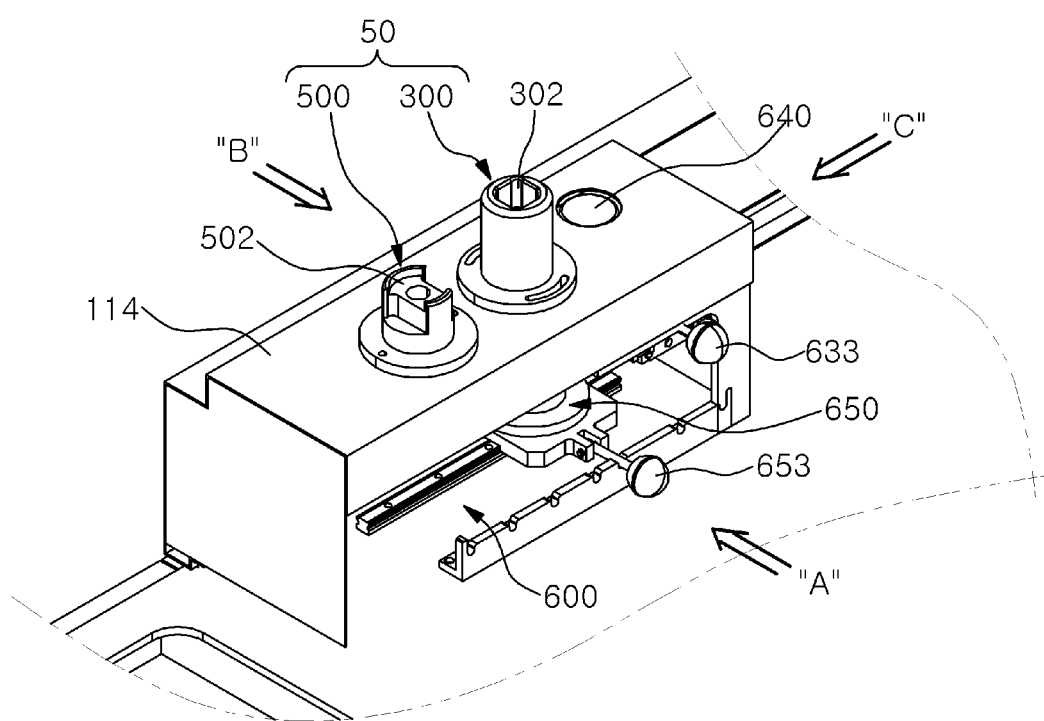

[FIG. 8]
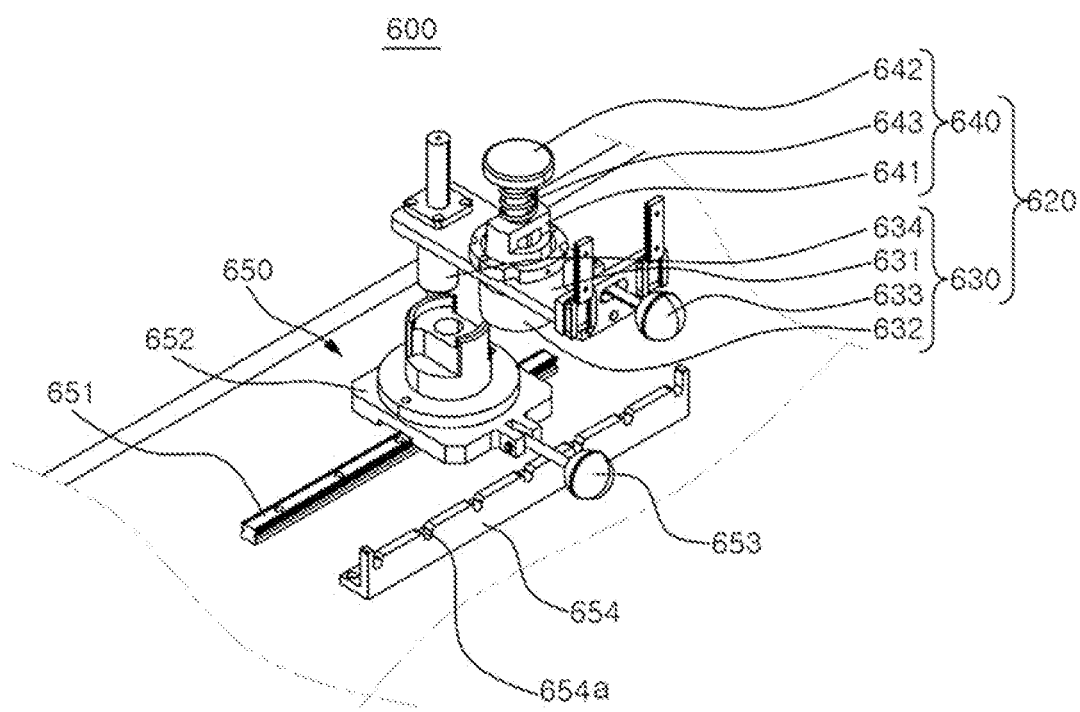

[FIG. 9]
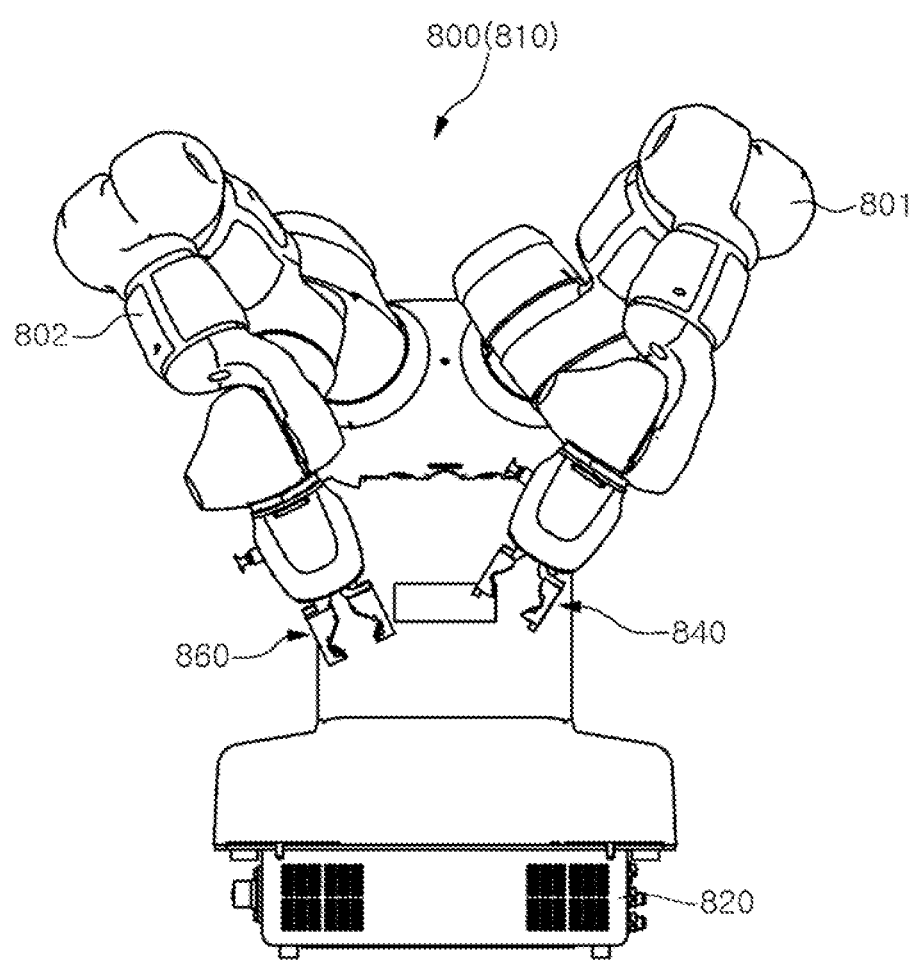

[FIG. 10]
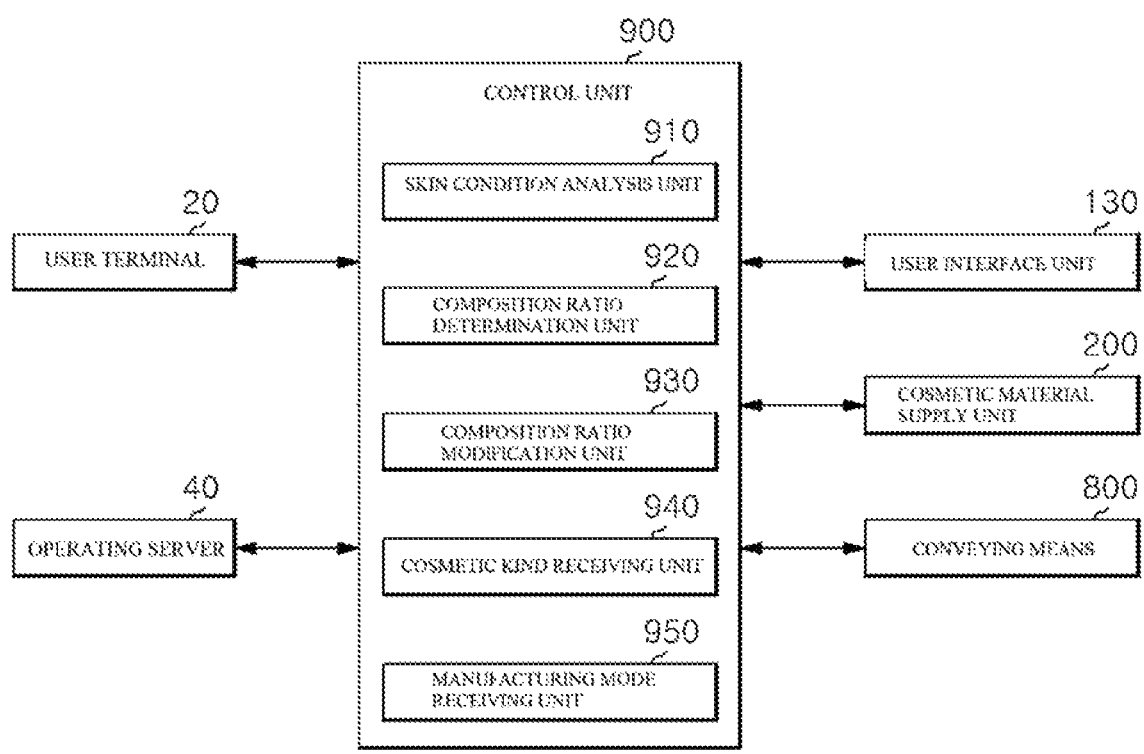

[FIG. 11]
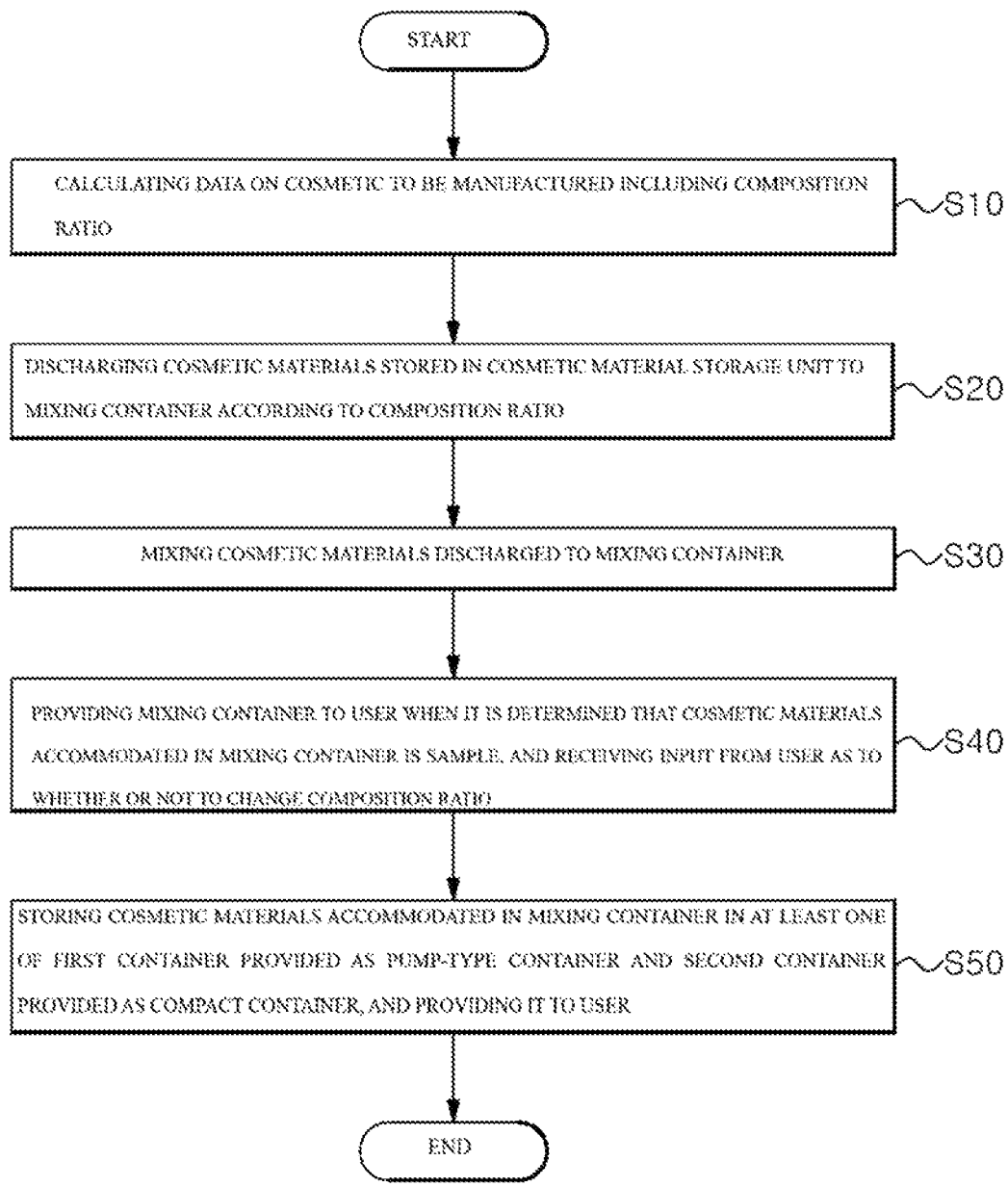

[FIG. 12]
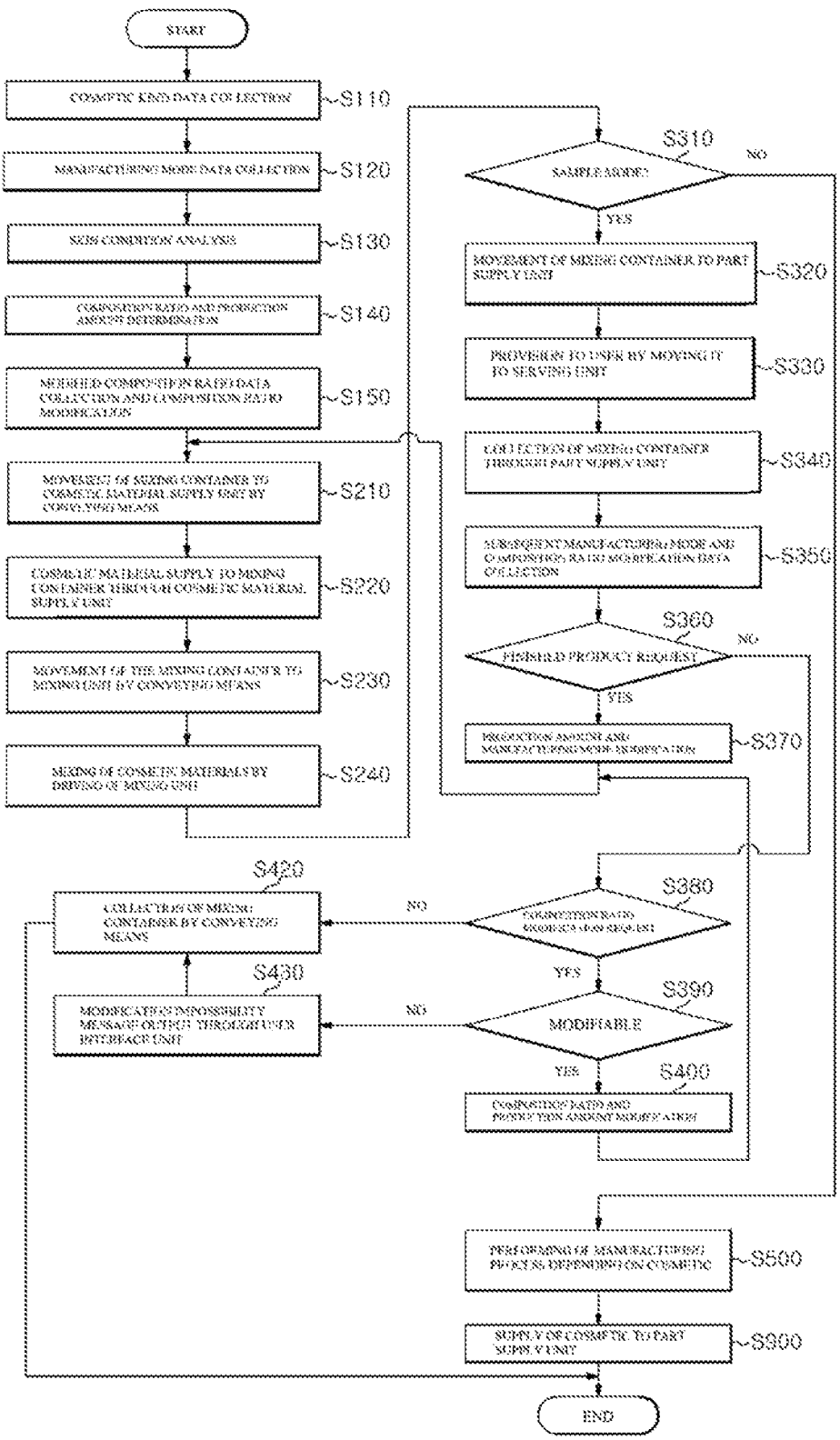

[FIG. 13]
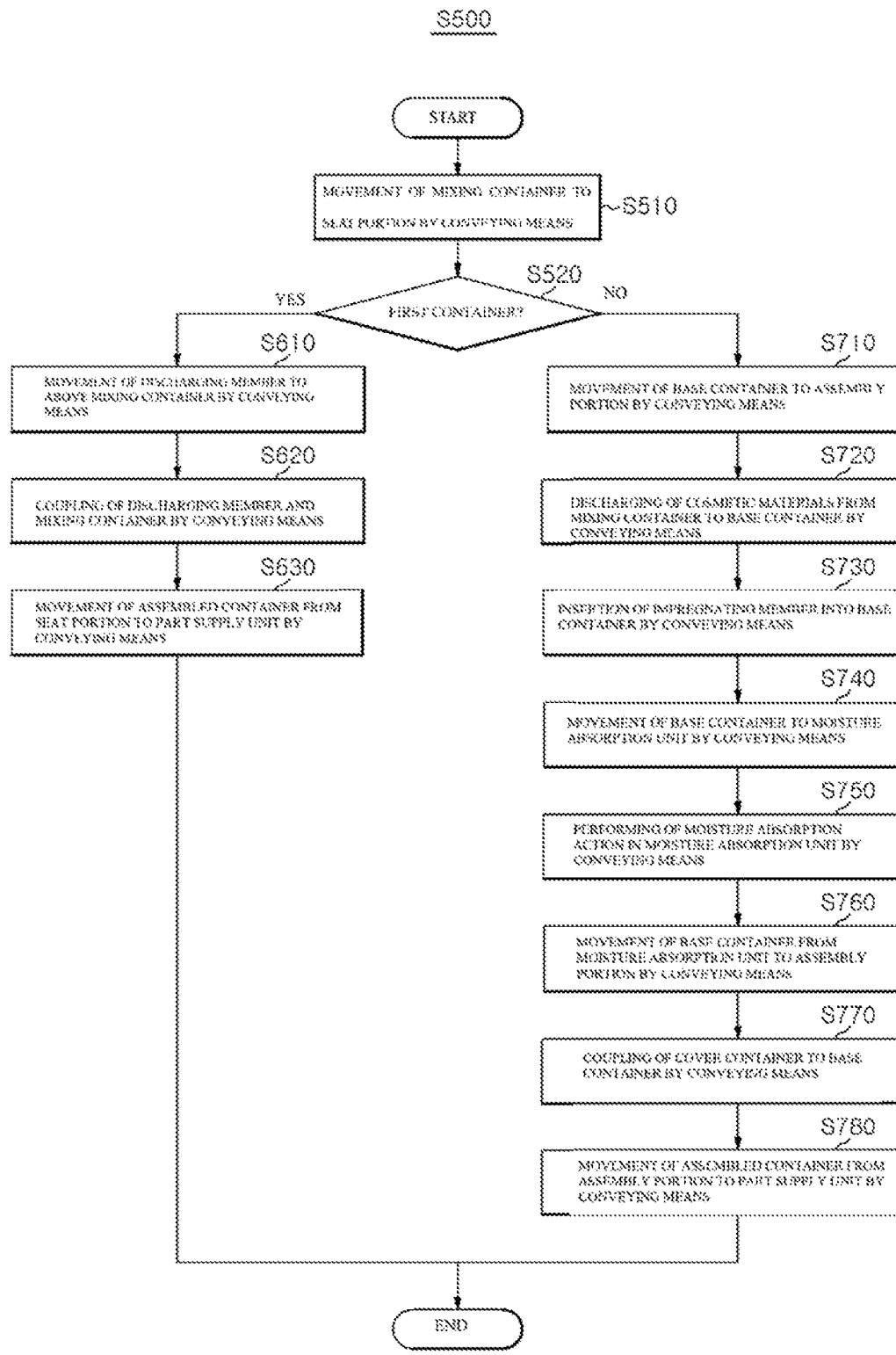

[FIG. 14]
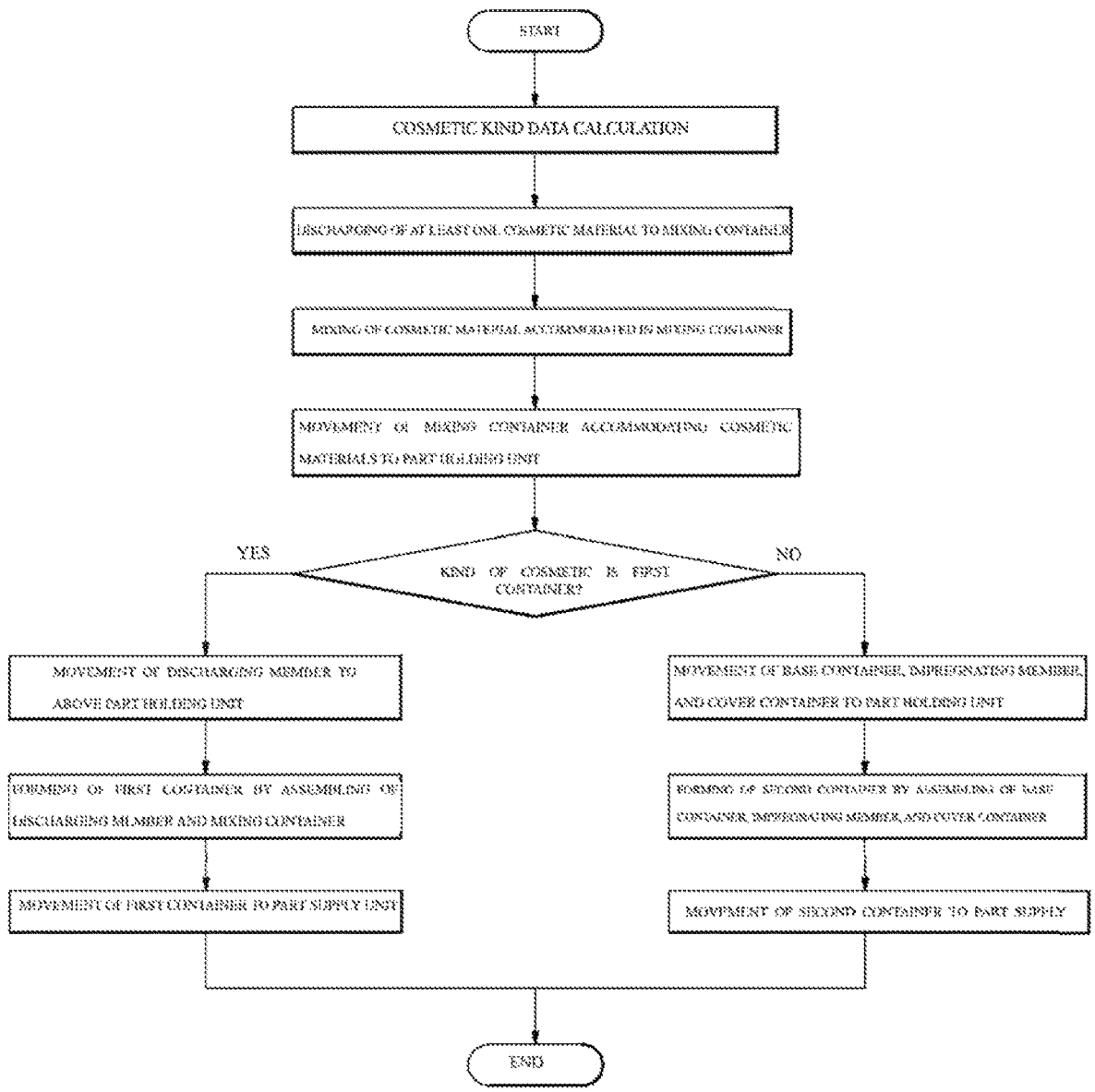

[FIG. 15]
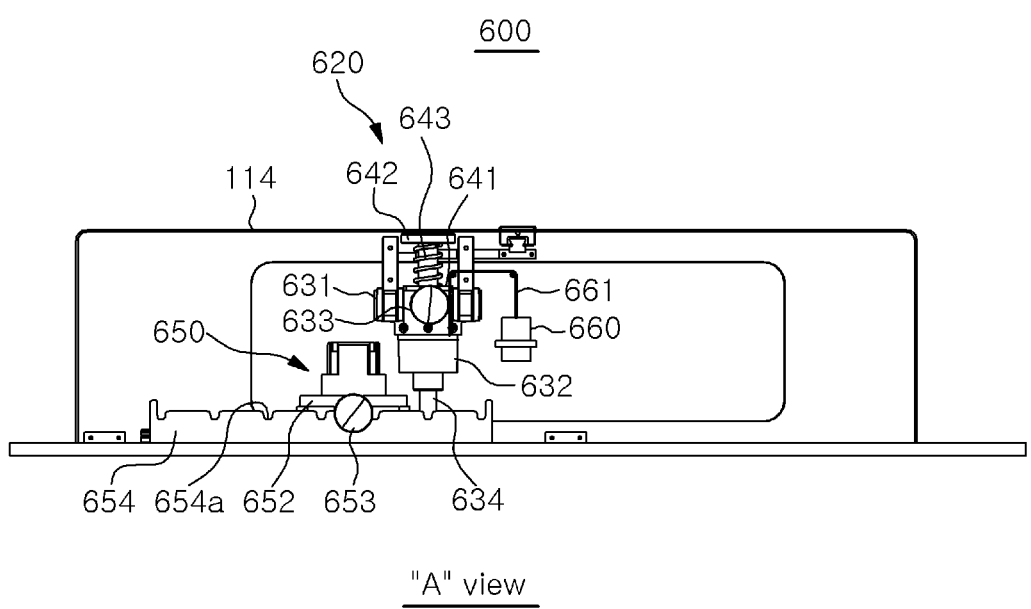
"A" view

[FIG. 16]
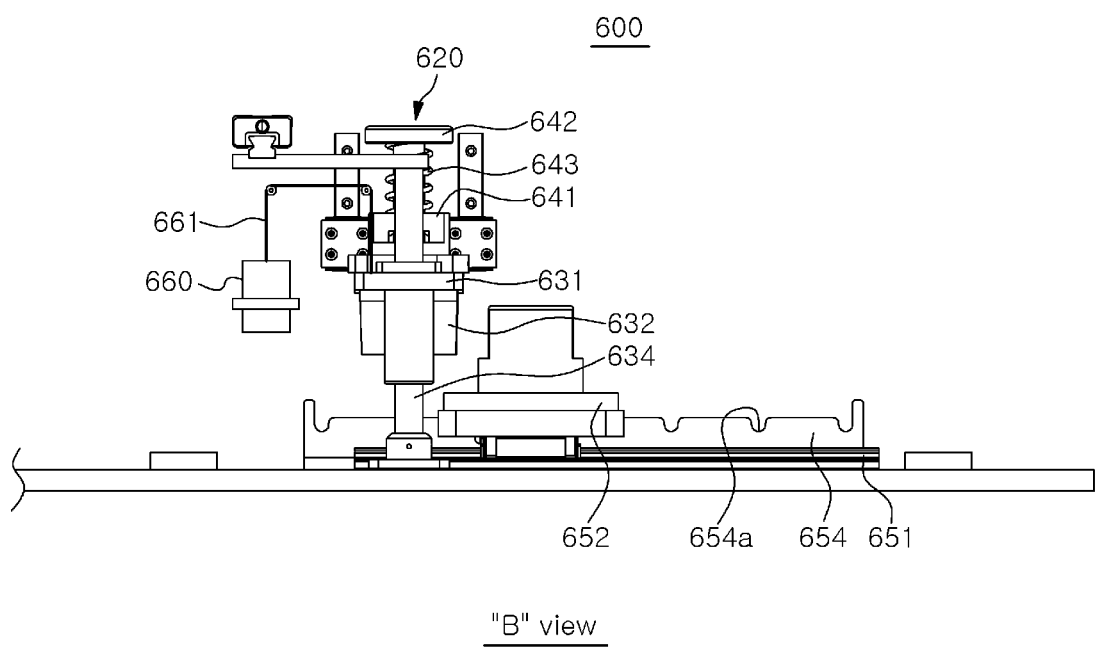
"B" view

[FIG. 17]
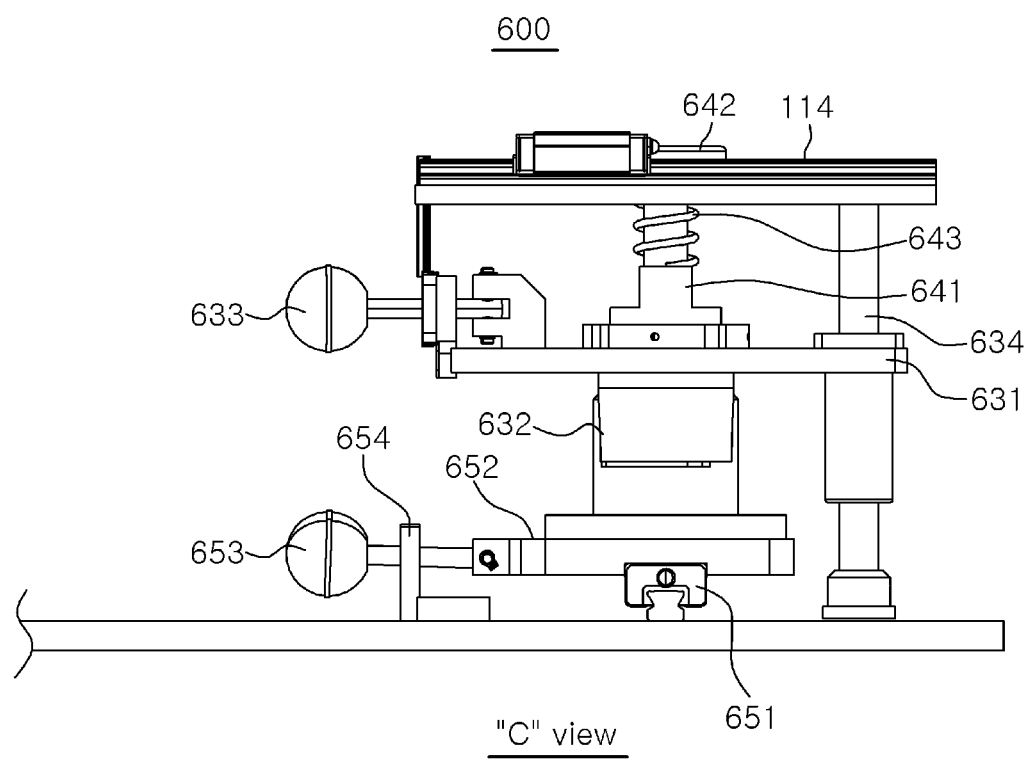
"C" view

[FIG. 18]
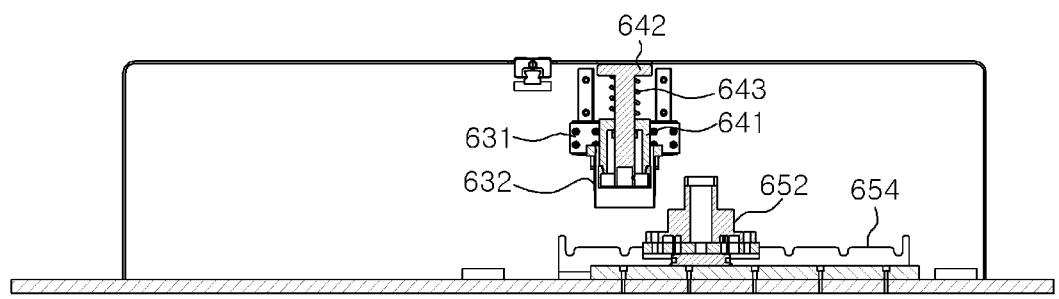

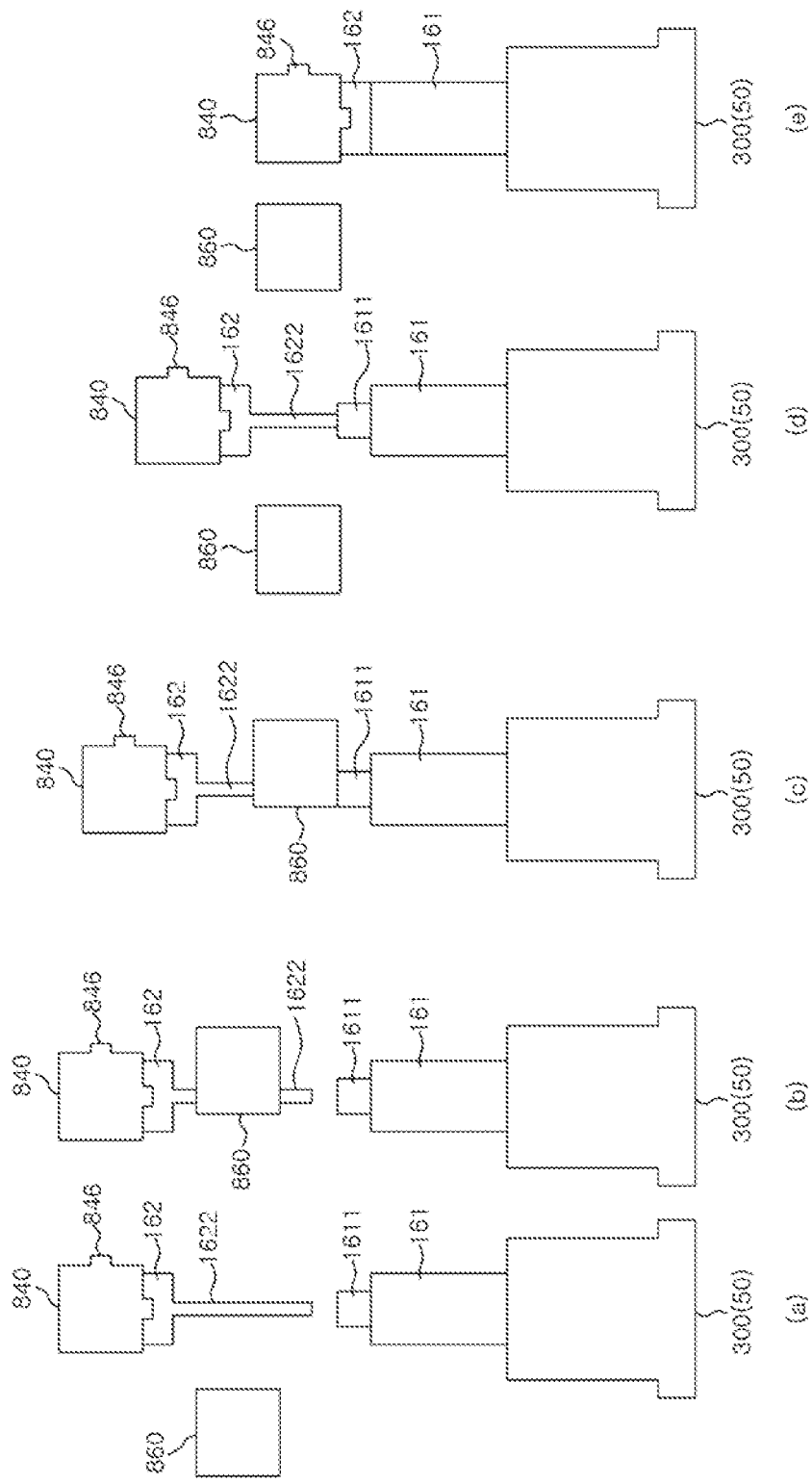

[FIG. 22]
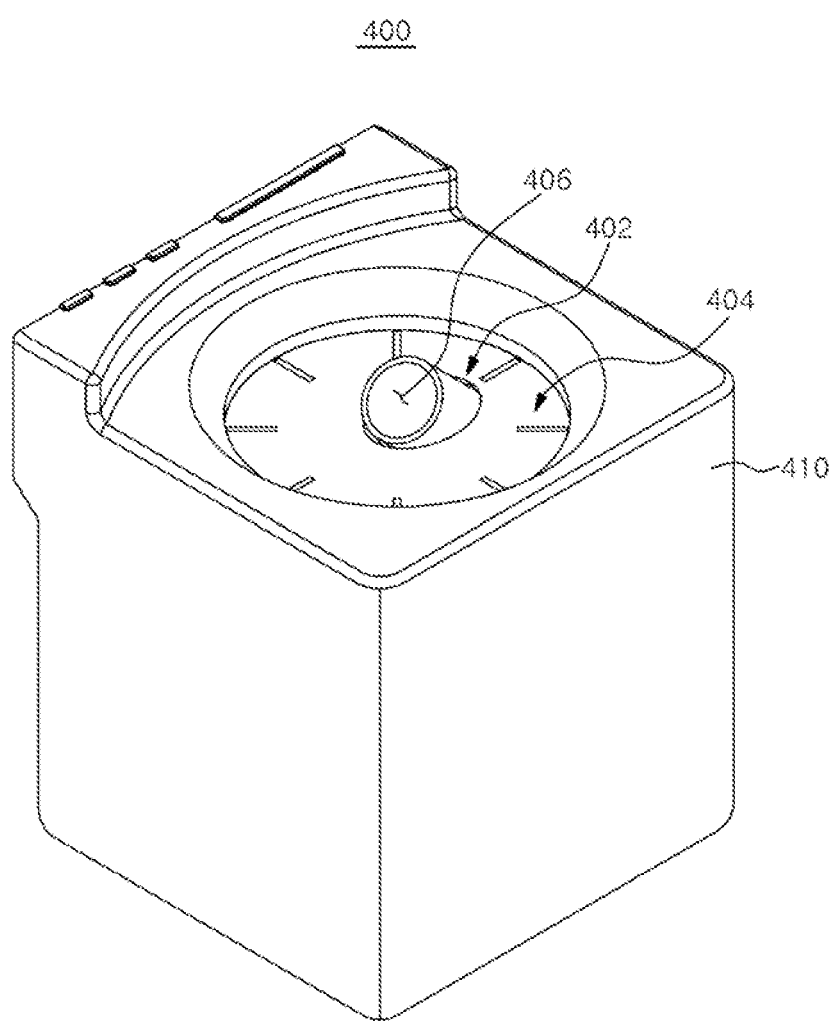

[FIG. 23]
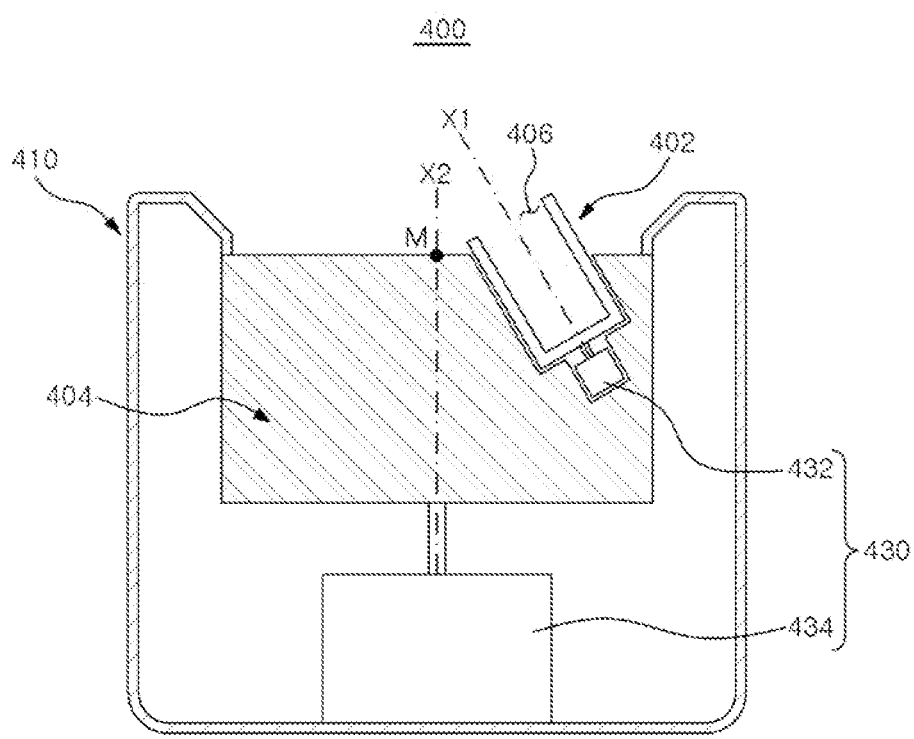

[FIG. 24]
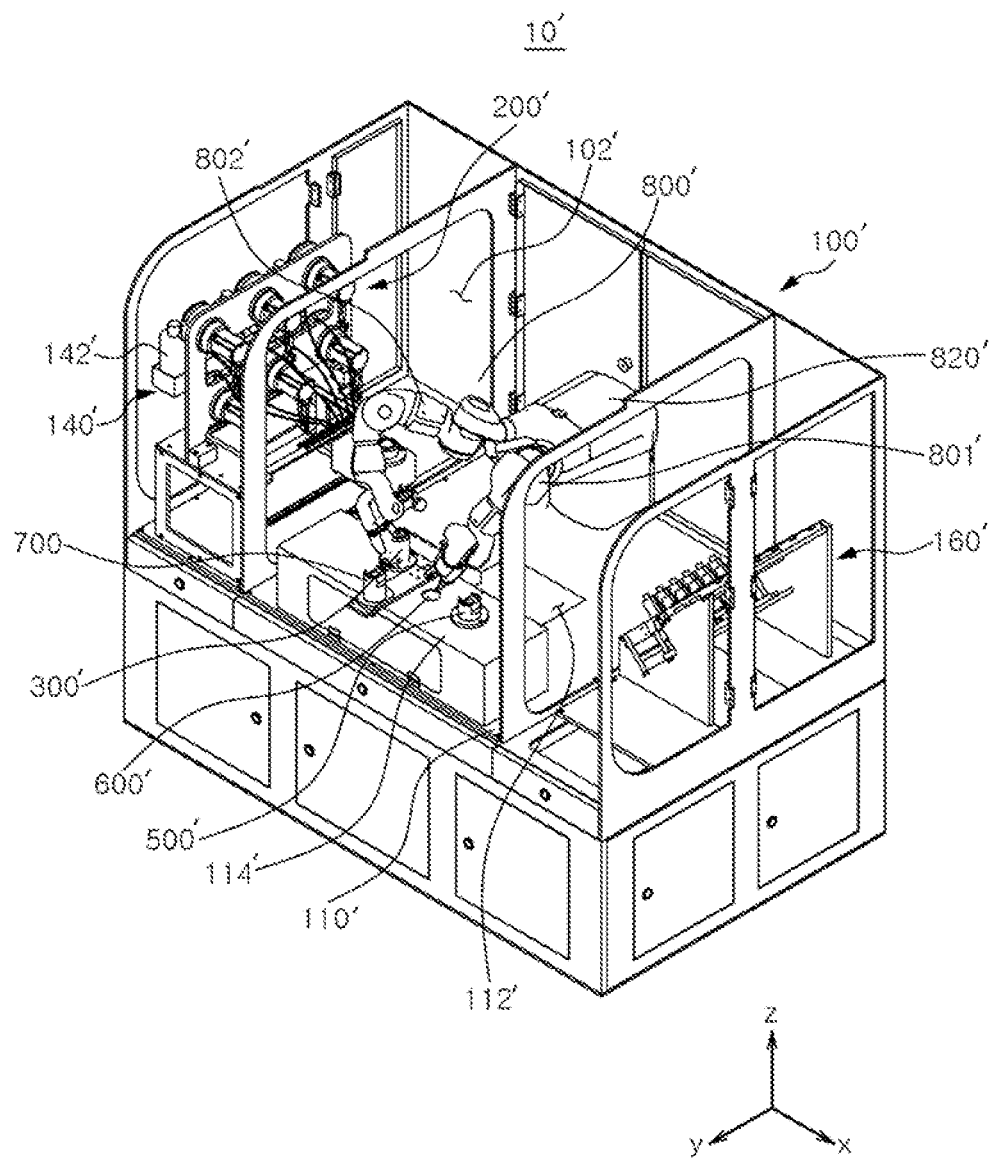

[FIG. 25]
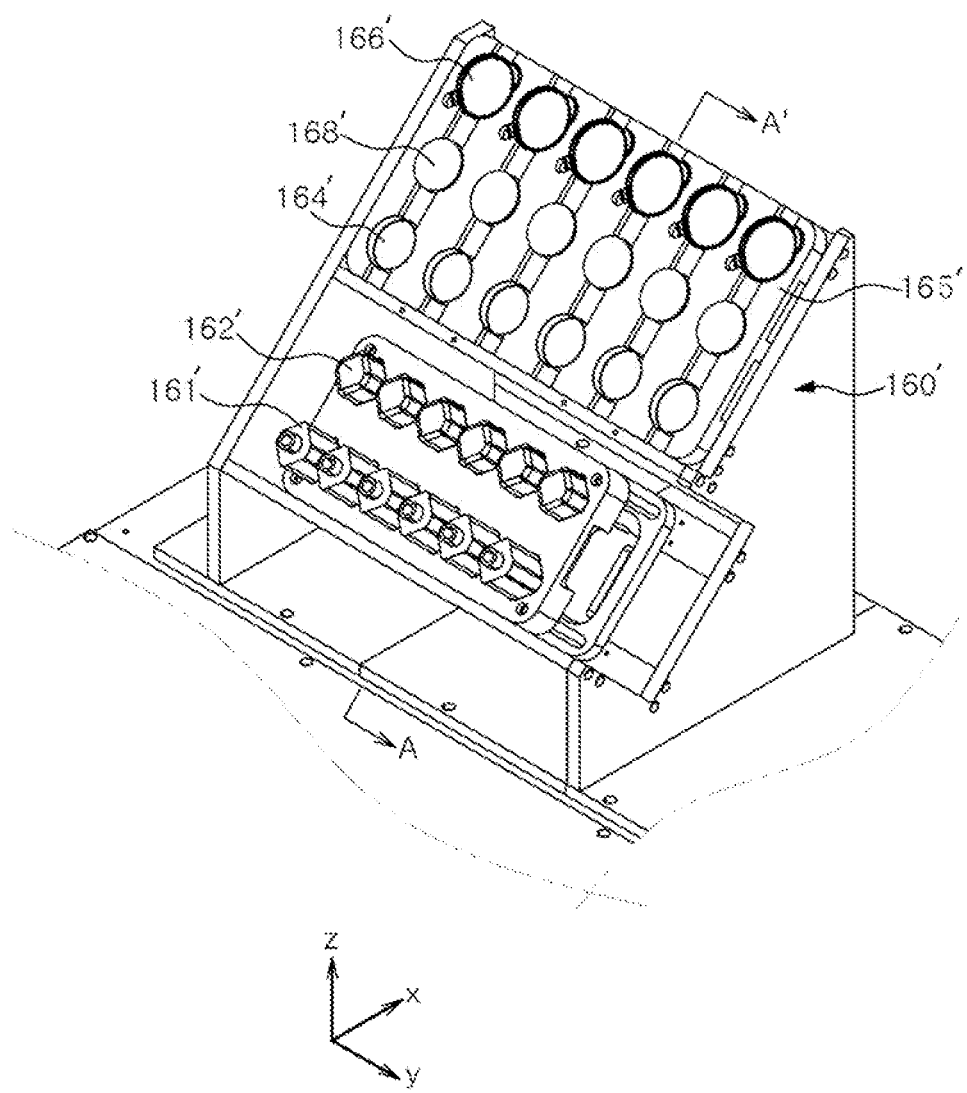

COSMETIC MANUFACTURING APPARATUS, CONTROL METHOD OF THE SAME, AND COSMETIC MANUFACTURING SYSTEM

CROSS-REFERENCE TO RELATED APPLICATION(S)

This application is based on and claims priority of Korean Patent Applications No 10-2020-0122025, No 10-2020-0122396, No 10-2020-0122387, No 10-2020-0122594, No 10-2020-0122038, No 10-2020-0122457, No 10-2020-0122410, and No 10-2020-0122429 filed on Sep. 22, 2020 with the Korean Intellectual Property Office, the entire contents of which are hereby incorporated by reference.

TECHNICAL FIELD

This disclosure relates to a cosmetic manufacturing apparatus, a control method thereof, and a cosmetic manufacturing system.

BACKGROUND

Cosmetics are used for beauty and skin health, and consumers' desire to use cosmetics suitable for them is getting stronger. In order to satisfy these needs, various types of user cosmetic manufacturing apparatuses have been proposed.

In general, a cosmetic manufacturing apparatus operates by measuring or diagnosing a user's skin condition, calculating a mixing ratio of cosmetic materials suitable for the user based on this, and then mixing the cosmetic materials according to the mixing ratio to manufacture a cosmetic. As technology develops in recent years, such a cosmetic manufacturing apparatus has been proposed as an automated apparatus in which a series of processes can be sequentially performed.

However, the cosmetic manufacturing apparatus according to the prior art has the following problems.

The conventional cosmetic manufacturing apparatus has a problem that it takes a very long time to manufacture the cosmetic desired by the user. Additionally, the cosmetic manufacturing apparatus may be provided so that the process of manufacturing cosmetics can be continuously carried out from measuring or diagnosing the skin condition of the user. From the user's point of view, waiting for the completion of cosmetics in front of the cosmetic manufacturing apparatus is just a tedious process. Therefore, although one or two uses based on curiosity can be expected, there is a possibility that the continuous use rate of the cosmetic manufacturing apparatus will be lowered.

Further, additional and inconvenient operations, such as, coupling the lid of the cosmetic container or a discharging member by an operator who operates the cosmetic manufacturing apparatus, in order for cosmetics that can be provided through the cosmetic manufacturing apparatus to be delivered to an actual user, withdrawing the cosmetic container from the cosmetic manufacturing apparatus, and handing it to the user, must be performed.

SUMMARY

A cosmetic manufacturing apparatus, a control method thereof and a cosmetic manufacturing system according to an embodiment of this disclosure are proposed to solve the above-described problems, and this disclosure is to provide a cosmetic manufacturing apparatus, a control method thereof, and a cosmetic manufacturing system capable of increasing the productivity of a cosmetic manufacturer or sales store by automating the cosmetic manufacturing process.

This disclosure is to provide a cosmetic manufacturing apparatus, a control method thereof, and a cosmetic manufacturing system, which are capable of manufacturing cosmetics suitable for a user's skin condition.

Additionally, this disclosure is to provide a cosmetic manufacturing apparatus, a control method thereof, and a cosmetic manufacturing system which are capable of reducing the manufacturing time of cosmetics.

According to an aspect of the disclosure, there may be provided a cosmetic manufacturing apparatus comprising: a main body (100) providing a cosmetic manufacturing space (102); a part supply unit (160) providing at least one of a mixing container (161) for accommodating cosmetic materials, and a component which constitute a cosmetic container; a cosmetic material supply unit (200) discharging one or more cosmetic materials stored in a cosmetic material storage unit (140) to the mixing container (161); a conveying means (800) for moving at least one of the mixing container (161) and the component constituting the cosmetic container which have been provided to the part supply unit (160); and a control unit (900) controlling at least one of the cosmetic material supply unit (200) and the conveying means (800), such that one or more cosmetic materials stored in the cosmetic material storage unit (140) can be mixed and accommodated in at least one of the mixing container (161) and the component constituting the cosmetic container.

Additionally, there may be provided a cosmetic manufacturing apparatus (10) further including a mixing unit (400) rotatably provided to mix cosmetic materials accommodated in the mixing container (161).

Further, there may be provided a cosmetic manufacturing apparatus, wherein the conveying means (800) includes a plurality of conveying units (801, 802) that move the component provided in the part supply unit (160) to the part holding unit (50), and assemble the component moved to the part holding unit (50) into a first container to be provided as a pump-type container, or into a second container to be provided as a compact type container.

Additionally, there may be provided a cosmetic manufacturing apparatus, wherein the conveying means (800) includes a first conveying unit (801) and a second conveying unit (802) that are movable independently of each other, and wherein when assembling the first container to form a pump-type container, one of the first conveying unit (801) and the second conveying unit (802) grips a cap (1623) of a discharging member (162), and the other is moved up and down while being in contact with a straw (1622), such that the straw (1622) of the discharging member (162) is aligned with an inlet portion 1611 of the mixing container (161) in the part holding unit (50), and when assembling the second container to form a compact container, one of the first conveying unit (801) and the second conveying unit (802) seats the base container (164) constituting the second container on the part holding unit (50), and the other turns over the mixing container (161), such that the cosmetic materials accommodated in the mixing container (161) can be moved to the base container (164).

Further, there may be provided a cosmetic manufacturing apparatus, further comprising a part holding unit (50) on which the mixing container (161) and the component in the part supply unit (160) are moved and seated, wherein the part holding unit (50) includes a seat portion (300) providing a space in which the first container to be provided as a pump-type container can be assembled; and an assembly portion (500) providing a space in which the second container to be provided as a compact container can be assembled.

Further, there may be provided a cosmetic manufacturing apparatus, wherein the component in the part supply unit (160) includes a discharging member (162) provided as a part of the first container, and wherein the conveying means 800 moves the mixing container (161) in the part supply unit 160 to the cosmetic material supply unit (200) so that the mixing container (161) provided as an empty container from the part supply unit (160) receives cosmetic materials; moves the mixing container (161) in the cosmetic material supply unit (200) to the mixing unit (400) where the cosmetic materials accommodated in the mixing container (161) is mixed; moves the mixing container (161) in the mixing unit (400) to the part holding unit (50) so as to provide the mixing container (161) as a part of the first container; and moves the discharging member (162) in the part supply unit (160) to above the mixing container (161) in the part holding unit (50), and couples the discharging member (162) with the mixing container (161).

Further, there may be provided a cosmetic manufacturing apparatus, wherein the component in the part supply unit (160) includes an impregnating member (168), a base container (164) for accommodating the impregnating member (168), and a cover container (166) for covering the impregnating member (168), which are provided as parts of the second container; and wherein the conveying means (800), moves the mixing container (161) in the part supply unit 160 to the cosmetic material supply unit (200) so that the mixing container (161) provided as an empty container from the part supply unit (160) receives cosmetic materials; moves the mixing container (161) in the cosmetic material supply unit (200) to the mixing unit (400) where the cosmetic materials accommodated in the mixing container (161) is mixed; moves the base container (164) in the part supply unit (160) to the part holding unit (50); tilts the mixing container (161) storing the cosmetic materials above the top of the base container (164) so that the base container (164) in the part holding unit (50) receives the cosmetic materials.

Further, there may be provided a cosmetic manufacturing apparatus, wherein the cosmetic material supply unit 200 includes a cosmetic supply means (220) for discharging a predetermined amount of cosmetic material stored in a cartridge (142); a plurality of discharging holes (232) through which cosmetic materials conveyed from the cosmetic material supply unit (220) are discharged; and a mixing container conveying unit (250) that fixes the mixing container (161) to accommodate the cosmetic materials discharged from the plurality of discharging holes (232) into the mixing container (161), and is movable under the discharging holes (232).

Further, there may be provide a cosmetic manufacturing apparatus, wherein the mixing unit 400 includes a first rotating member (402) into which the mixing container (161) can be inserted, and which is rotatable; and a second rotating member (404) for rotating the first rotating member (402), and wherein the first rotating member (402) is spaced apart from the center (M) of the second rotating member (404) by a predetermined distance.

Further, there may be provided a cosmetic manufacturing apparatus, wherein the control unit (900) controls such that the first rotating member (402) into which the mixing container (161) is inserted may be stopped at a preset position.

Further, there may be provided a cosmetic manufacturing apparatus, wherein the component includes the base container 164 and the impregnating member 168 which are provided as parts of the second container, and wherein the cosmetic manufacturing apparatus further comprises a moisture absorption tool (600) for impregnating the impregnating member (168) with the cosmetic materials accommodated in the base container (164).

Further, there may be provided a cosmetic manufacturing apparatus, wherein the table (114) is provided on one side of the conveying means (800), the moisture absorption unit (600) is provided under the table (114), and the part holding unit (50) on which at least one of the mixing container (161) and the component can be seated is disposed on the top of the table (114).

Further, there may be provided a cosmetic manufacturing apparatus, wherein the part supply unit (160) includes a tray (165) on which the component can be placed; a first container component support (163) for supporting the mixing container (161) and the discharging member (162), which are provided as parts of the first container; and a second container component support (169) for supporting the base container (164), the impregnating member (168), and the cover container (166), which are provided as parts of the second container.

According to another aspect of the disclosure, there may be provided a control method of a cosmetic manufacturing apparatus, the control method comprising: calculating data on a cosmetic to be manufactured including the composition ratio by the control unit (900); discharging the cosmetic materials stored in the cosmetic storage unit (140) to the mixing container (161) according to the composition ratio by controlling the cosmetic material supply unit (200) and the conveying means (800) by the control unit (900); mixing the cosmetic materials discharged into the mixing container (161) by controlling the mixing unit (400) and the conveying means (800) by the control unit (900); and storing the cosmetic materials accommodated in the mixing container (161) in at least one of the first container provided as a pump-type container and the second container provided as a compact container and providing it to a user, by controlling the conveying means (800) by the control unit (900).

Further, there may be provided a control method of a cosmetic manufacturing apparatus, further comprising: after the mixing the cosmetic materials discharged to the mixing container (161), providing the mixing container (161) to the user when the control unit (900) determines that the cosmetic materials accommodated in the mixing container (161) is a sample, and receiving an input from the user as to whether or not to change the composition ratio.

Further, there may be provided a control method of a cosmetic manufacturing apparatus, wherein the discharging the cosmetic materials stored in the cosmetic storage unit (140) to the mixing container (161) according to the composition ratio (S20) by controlling the cosmetic material supply unit (200) and the conveying means (800) by the control unit (900) includes moving the mixing container (161) in the part supply unit (160) toward the cosmetic material supply unit (200) by controlling the conveying means (800) by the control unit (900) (S210); and supplying the cosmetic material to the mixing container (161) according to the composition ratio (S220) by controlling the cosmetic material supply unit (200) and the conveying means (800) by the control unit (900).

Further, there may be provided a control method of a cosmetic manufacturing apparatus, wherein the mixing the cosmetic materials discharged into the mixing container (161) by controlling the mixing unit (400) and the conveying means (800) by the control unit (900) includes: moving the mixing container (161) in the cosmetic material supply unit (200) to the mixing unit (400) by controlling the conveying means (800) by the control unit (900); and rotating and revolving the mixing container (161) so as to mix the cosmetic materials stored in the mixing container (161) by controlling the mixing unit (400) by the control unit (900).

Further, there may be provided a control method of a cosmetic manufacturing apparatus, wherein the storing the cosmetic materials accommodated in the mixing container (161) in at least one of the first container provided as a pump-type container and the second container provided as a compact container and providing it to the user by controlling the conveying means (800) by the control unit (900) includes: moving the mixing container (161) accommodating the mixed cosmetic material to the part holding unit (50) by controlling the conveying means (800) by the control unit (900); when the kind of cosmetic input to the control unit (900) is the first container, forming the first container by controlling the conveying means (800) by the control unit (900) to move the discharging member (162) in the part supply unit (160) to the upper part of the part holding unit (50), and assemble the discharging member (162) with the mixing container (161); when the kind of cosmetic selected input to the control unit (900) is the second container, forming the second container by controlling the conveying means (800) by the control unit (900) to move the base container (164), the impregnating member (168), and the cover container (166) in the part supply unit (160) to the part holding unit (50), and assemble the base container (164), the impregnating member (168), and the cover container (166) with one other; and moving the assembled first container or the second container to the part supply unit (160) and providing it to the user by controlling the conveying means (800) by the control unit (900).

According to another aspect of the disclosure, there may be provide a cosmetic manufacturing system comprising: a terminal (20) for receiving information about a user context and measuring user's skin condition; an operating server (40) for collecting or processing data from the terminal (20) and transmitting it to a cosmetic manufacturing apparatus (10); and the cosmetic manufacturing apparatus (10) of items 1 to 13 which receives a composition ratio from at least one of the terminal (20) and the operating server (40), or process information transmitted from at least one of the terminal (20) and the operating server (40) to calculate the composition ratio, and manufactures a cosmetic according to the calculated composition ratio.

The cosmetic manufacturing apparatus, the control method thereof, and the cosmetic manufacturing system according to an embodiment of this disclosure have an advantage in that the manufacturing process of cosmetics is automated, thereby increasing the productivity of the cosmetic manufacturing place or sales store.

Additionally, cosmetics suitable for the user's skin condition can be manufactured advantageously.

Also, the manufacturing time of the cosmetics can be shortened.

BRIEF DESCRIPTION OF DRAWINGS

FIG. 1 is a diagram illustrating the configuration of the cosmetic manufacturing system according to an embodiment of the disclosure.

FIG. 2 is a perspective view showing the outer appearance of the cosmetic manufacturing apparatus of FIG. 1.

FIG. 3 is a perspective view showing the internal configuration of the cosmetic manufacturing apparatus of FIG. 2.

FIG. 4 is a top view (a conveying means is not shown) of the inside of the cosmetic manufacturing apparatus of FIG. 1 when viewed from the top.

FIG. 5 is a perspective view showing a cosmetic material supply unit disposed on one side of a main body of the cosmetic manufacturing apparatus of FIG. 1.

FIG. 6 is a perspective view showing a part supply unit disposed on one side of a main body of the cosmetic manufacturing apparatus of FIG. 1.

FIG. 7 is a perspective view showing a part holding unit and a moisture absorption unit, which are components of the cosmetic manufacturing apparatus of FIG. 1.

FIG. 8 is a perspective view showing the moisture absorption unit, which is a part of the cosmetic manufacturing apparatus of FIG. 1.

FIG. 9 is a perspective view showing the conveying means, which is a part of the cosmetic manufacturing apparatus of FIG. 1.

FIG. 10 is a block diagram illustrating a configuration capable of communicating with a control unit of the cosmetic manufacturing apparatus of FIG. 1.

FIG. 11 is a flowchart illustrating a control method of the cosmetic manufacturing apparatus of FIG. 1.

FIG. 12 is a flowchart showing in more detail the control method of the cosmetic manufacturing apparatus of FIG. 1.

FIG. 13 is a flowchart showing specific processes of a manufacturing step according to the kind of cosmetic of FIG. 12.

FIG. 14 is a flowchart illustrating a method of controlling a cosmetic manufacturing apparatus depending on a cosmetic kind by summarizing FIGS. 12 and 13.

FIG. 15 is a view of FIG. 7 when viewed from the direction "A".

FIG. 16 is a view of FIG. 7 when viewed from the direction "B".

FIG. 17 is a view of FIG. 7 when viewed from the direction "C".

FIG. 18 is a cross-sectional view showing the structure of a static holder and a pressing part of a moisture absorption unit.

FIG. 21 is a diagram schematically illustrating a step of coupling a mixing container and a discharging member, which are some compartments of the cosmetic manufacturing apparatus of FIG. 1.

FIG. 22 is a schematic perspective view of a mixing unit that is a component of the cosmetic manufacturing apparatus of FIG. 1.

FIG. 23 is a schematic cross-sectional view of the mixing unit of FIG. 22.

FIG. 24 is a perspective view showing a cosmetic manufacturing apparatus according to another embodiment of this disclosure.

FIG. 25 is a perspective view illustrating a part supply unit of the cosmetic manufacturing apparatus of FIG. 24.

DETAILED DESCRIPTION

Figure 19A:
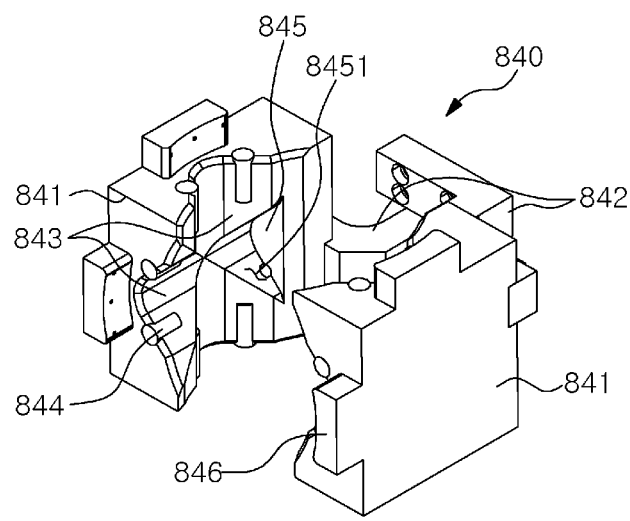
FIG. 19(a) and FIG. 19(b) are perspective views illustrating a first gripper of a conveying means of FIG. 9.

Hereinafter, specific exemplary embodiments of this disclosure will be described in detail with reference to the drawings. Additionally, it is noted that in the description of the disclosure, the detailed description for known related configurations or functions may be omitted when it is deemed that such description may obscure essential points of the disclosure.

In the following description, "cosmetic" may be understood as a product that acts directly or indirectly on the user's skin to give a cosmetic effect to the skin, protect the skin, improve or change the skin condition, or have one or more of these functions, and "cosmetic material" may be understood as a substance constituting such cosmetic. Hereinafter, "composition ratio" may be understood as a weight ratio or volume ratio of cosmetic materials provided as a cosmetic.

The cosmetic manufacturing apparatus 10 and the cosmetic manufacturing system 1 of this embodiment can manufacture customized cosmetics.

Here, the customized cosmetic may be understood as a cosmetic manufactured according to the composition ratio of the cosmetic determined based on the user's skin condition or the result of analyzing or diagnosing the skin condition.

Alternatively, a customized cosmetic may be understood as a cosmetic manufactured according to a composition ratio determined based on a user's intention or a user context collected through various channels. Here, the user context may be understood as being data related to the user's life, such as the user's biometric information, spatial information around the user, the preset time range and preset spatial range related to the user's schedule, the user's shopping history, the user's purchase history, and the user's online activity record, and Data that can be transmitted from any device or a third party, which can be transmitted from any device or a third party.

FIG. 1 is a diagram illustrating the configuration of the cosmetic manufacturing system 1 according to an embodiment of the disclosure.

Referring to FIG. 1, the cosmetic manufacturing system 1 according to an embodiment of this disclosure, which manufactures a cosmetic by collecting data and determining a composition ratio for manufacturing a customized cosmetic, may include a cosmetic manufacturing apparatus 10, a terminal 20, and an operating server 40. In this embodiment, the cosmetic manufacturing system 1 is a system for manufacturing a customized cosmetic, and the cosmetic manufacturing apparatus 10 will be described by way of example as an apparatus capable of manufacturing a customized cosmetic. However, the spirit of this disclosure is not limited thereto, and may be employed to produce cosmetics having one predetermined composition ratio.

Components constituting the cosmetic manufacturing system 1 may be connected through a network to exchange data with each other or to transmit data from one side to another side. Here, the network includes both a wired network and a wireless network, and the kind thereof is not limited as long as it can transmit data.

The cosmetic manufacturing apparatus 10 may mix a plurality of cosmetic materials based on the composition ratio data required for manufacturing a cosmetic, put them into a cosmetic container, and provide it to a user. Here, the cosmetic container may include a first container provided as a pump-type container and a second container provided as a compact container, which will be described later.

Each of these first and second containers may be understood as a container formed by coupling at least one of a mixing container 161 for accommodating a cosmetic material, and the component constituting the cosmetic container.

For example, when the first container is the pump-type container, the mixing container 161 and a discharging member 162 which is one of the components may be coupled to each other to provide the first container (see FIG. 6). However, the spirit of this disclosure is not limited to the case where the mixing container 161 is necessarily provided as a part of the first container, but the components may include a separate receiving container (not shown) which can be coupled with the discharging member 162 to provide the first container.

In addition, when the second container is a compact container, the second container may be provided by coupling a base container 164, an impregnating member 168, and the cover container 166, which are some of the components.

That is, in this embodiment, the components may include a part constituting the first container (e.g., the discharging member 162 when the mixing container 161 and the discharging member 162 are coupled, and the receiving container and the discharging member 162 when the separate receiving container and the discharging member 162 are coupled) and a part constituting the second container (e.g., the base container 164, the impregnating member 168, the cover container 166).

Additionally, the composition ratio data may be understood as electronic data including the types of a plurality of cosmetic materials and their component ratios. Such composition ratio data may be completely processed and provided to the cosmetic manufacturing apparatus 10, or may be created by the cosmetic manufacturing apparatus 10 by transmitting basic data to be processed (including user context) to the cosmetic manufacturing apparatus 10.

For example, the composition ratio data may be provided to the cosmetic manufacturing apparatus 10 from the terminal 20, such as a user's own mobile phone, tablet PC, or desktop computer. In this case, the composition ratio data may be provided to the cosmetic manufacturing apparatus 10 directly from the terminal 20, or through the operating server 40 managed by an operating host of the cosmetic manufacturing apparatus 10. According to an embodiment, the terminal 20 may provide basic data for generating composition ratio data, for example, data such as a photographed image of the user's skin.

The terminal 20 may receive information about the user context, and the input information may be transmitted to at least one of the operating server 40 and the cosmetic manufacturing apparatus 10.

Additionally, the terminal 20 may include a measurement sensor (not shown) for measuring the user's skin condition. For example, the measurement sensor may include at least one of a camera, a moisture sensor, and an oil content sensor.

When the measurement sensor is provided as a camera, the user's skin condition may be photographed through the camera provided to the terminal 20, and the user's skin condition may be determined based on the photographed image of the user's skin.

The composition ratio data may be provided to the cosmetic manufacturing apparatus 10 from the measurement sensor of the terminal 20 capable of measuring the user's skin condition.

The terminal 20 may transmit a result measured through the measurement sensor (e.g., a camera, a moisture sensor, an oil sensor, or the like) to the cosmetic manufacturing apparatus 10 as it is, or transmit analyzed or diagnosed skin condition data to the cosmetic manufacturing apparatus 10.

Although, in this embodiment, the measurement sensor is described by way of example as being a part of the terminal 20, the spirit of this disclosure is not limited thereto, and the measurement sensor may be provided through a device separate from the terminal 20.

The cosmetic manufacturing apparatus 10 may determine the composition ratio data based on the data received from the terminal 20. According to an embodiment, the terminal 20 may transmit the above-described skin condition data to the cosmetic manufacturing apparatus 10 through the operating server 40. In this case, the operating server 40 may generate the composition ratio data based on the data received from the terminal 20, and provide it to the cosmetic manufacturing apparatus 10.

Alternatively, the cosmetic manufacturing apparatus 10 may transmit the data received from the terminal 20 to the operating server 40, and may receive the composition ratio data generated by the operating server 40 and use it for manufacturing cosmetics.

The operating server 40 may receive the data required for the generation of the composition ratio data as described above, generate the composition ratio data, and provide it to the cosmetic manufacturing apparatus 10, or may transmit the received composition ratio data to the cosmetic manufacturing apparatus 10 as it is. At this time, the operating server 40 may generate the composition ratio data suitable for each user based on the separately collected user context as well as the data transmitted from the terminal 20, and may transmit the generated composition ratio data to the cosmetic manufacturing apparatus 10 according to the user's request or the request of the cosmetic manufacturing apparatus 10.

In this embodiment, the cosmetic manufacturing apparatus 10 may assemble a plurality of cosmetic containers having different shapes.

Although, in this embodiment, the cosmetic manufacturing apparatus 10 is described by way of example as assembling two kinds of cosmetic containers (the first container and the second container), the spirit of this disclosure is not limited thereto, and the cosmetic manufacturing apparatus may assemble all known cosmetic containers.

The cosmetic manufacturing apparatus 10 may provide a pump-type container which can discharge cosmetic materials by the pressure provided by a pump, and a compact container which can store cosmetic materials in the impregnating member and provide them through a cosmetic tool such as a powder puff. Hereinafter, the pump-type container will be referred to as the first container, and the compact container will be referred to as the second container.

However, this is only an example, and the types of cosmetic containers that the cosmetic manufacturing apparatus 10 may provide are not limited thereto.

For example, the cosmetic manufacturing apparatus 10 may be configured to provide a stick-type container having an applicator, such as a lip tint, mascara, or the like, and may provide a cosmetic container consisting of a simple cosmetic container main body and a cap, without employing any pump. In other words, the kinds of the first container and the second container do not limit the spirit of this disclosure, but the first container and the second container may be understood as arbitrary cosmetic containers, respectively.

Hereinafter, a detailed configuration of the cosmetic manufacturing apparatus 10 will be described.

FIG. 2 is a perspective view showing the outer appearance of the cosmetic manufacturing apparatus 10 of FIG. 1; FIG. 3 is a perspective view showing the internal configuration of the cosmetic manufacturing apparatus 10 of FIG. 2; FIG. 4 is a top view (a conveying means is not shown) of the inside of the cosmetic manufacturing apparatus of FIG. 1 when viewed from the top; FIG. 5 is a perspective view showing the cosmetic material supply unit 200 disposed on one side of a main body of the cosmetic manufacturing apparatus of FIG. 1; FIG. 6 is a perspective view showing a part supply unit 160 disposed on another side of the main body of the cosmetic manufacturing apparatus of FIG. 1; FIG. 7 is a perspective view showing a part holding unit 50 and a moisture absorption unit 600, which are parts of the cosmetic manufacturing apparatus of FIG. 1; FIG. 8 is a perspective view showing the moisture absorption unit, which is a part of the cosmetic manufacturing apparatus of FIG. 1; FIG. 9 is a perspective view showing the conveying means, which is a part of the cosmetic manufacturing apparatus of FIG. 1; and FIG. 10 is a block diagram illustrating a configuration capable of communicating with a control unit of the cosmetic manufacturing apparatus of FIG. 1.

Referring to FIGS. 2 to 10, the cosmetic manufacturing apparatus 10 may include a main body 100 providing a space 102 for manufacturing a cosmetic; a cosmetic material storage unit 140 for storing a plurality of cartridges 142 in which cosmetic materials are stored; a part supply unit 160 which provides a mixing container 161 that can accommodate and mix cosmetic materials, and one or more components that constitute a cosmetic container; a cosmetic material supply unit 200 for supplying cosmetic materials from the cosmetic material storage unit 140 to the mixing container 161; a mixing unit 400 for mixing the cosmetic materials in the mixing container 161 by applying an external force to the mixing container 161 storing the cosmetic materials supplied from the cosmetic material supply unit 200; a part holding unit 50 that provides a space in which the first container and the second container can be assembled; a moisture absorption unit 600 for impregnating the cosmetic material into an impregnating member 168 provided as a component of the compact container; a conveying means 800 capable of moving the component constituting the mixing container 161 or the cosmetic container from one of the cosmetic material supply unit 200, the part supply unit 160, the mixing unit 400, the moisture absorption unit 600, and the part holding unit 50, to another; and the cosmetic manufacturing apparatus may include a control unit 900 capable of providing cosmetics or customized cosmetics to a user by controlling at least one of the cosmetic material supply unit 200, the conveying unit 800, and the mixing unit 400.

Here, the part holding unit 50 may include a seat portion 300 providing a space in which the first container can be assembled, and an assembly portion 500 providing a space in which the second container can be assembled and the seat portion 300 and the assembly portion 500 may be disposed on a table 114.

According to an embodiment, the cosmetic manufacturing apparatus 10 may lack any one or more of the above-described components, and thus the spirit of this disclosure is not limited thereto. For example, when the cosmetic manufacturing apparatus 10 manufactures only the first container, the components of the moisture absorption unit 600 and the assembly portion 500 may be omitted.

As described above, the cosmetic manufacturing apparatus 10 may be understood as a device that mixes cosmetic materials according to the composition ratio, puts the mixed cosmetic materials in a cosmetic container (e.g., a first container or a second container), and provides the cosmetic container to a user.

In this embodiment, the cosmetic manufacturing apparatus 10 will be described by way of example as being installed in a retail store where cosmetics are sold, or any type of store where a user can visit and purchase cosmetics. However, this is only an example, and the spirit of this disclosure is not limited thereto. For example, the cosmetic manufacturing apparatus 10 may be installed in a cosmetic manufacturing plant for mass production, or installed and used for manufacturing cosmetics, in a place other than where cosmetics are sold.

The main body 100 may form the outer appearance of the cosmetic manufacturing apparatus 10, and may provide the cosmetic manufacturing space 102 in which the components (e.g., the part supply unit 160, the cosmetic material supply unit 200, the conveying means 800, the part holding unit 50, the moisture absorption unit 600, and the like) for manufacturing cosmetics are installed. In order to provide the cosmetic manufacturing space 102, the main body 100 may have any three-dimensional appropriate shape, and in this embodiment, it is illustrated by way of example as having a rectangular parallelepiped shape as a whole.

In the cosmetic manufacturing space 102, the above-described cosmetic material storage unit 140, part supply unit 160, cosmetic material supply unit 200, part holding unit 50 (seat portion 300 and assembly portion 500), mixing unit 400, moisture absorption unit 600, conveying means 800 or the lie may be disposed, and these components may be disposed on the base 110 forming the bottom surface of the cosmetic manufacturing space 102. According to the embodiment, it will be apparent that the above-described components may be installed on any wall forming the cosmetic manufacturing space 102.

Further, when the cosmetic manufacturing apparatus 10 is viewed from the top (see FIG. 4), the cosmetic material supply unit 200 may be disposed on the left side and the right side; the part supply unit 160 may be disposed in the front left center; the part holding unit 50 may be disposed in the front right center; and the conveying means 800 may be disposed in the rear center. Additionally, the mixing unit 400 may be disposed at the rear side of the part supply unit 160. In this embodiment, it will be described by way of example that the two cosmetic material supply units 200 are provided in the left and right sides. However, such arrangement and the number of the cosmetic material supply units 200 are merely exemplary, and their arrangement can be changed as long as the conveying means 800 is movable. Here, based on FIG. 3, the front side may be understood as a +y direction and the right side may be understood as a +x direction.

In addition, the part holding unit 50 may be disposed on the top of the table 114, and the moisture absorption unit 600 may be disposed under the table 114.

In addition, the part holding unit 50 may include the seat portion 300 and the assembly portion 500, and the assembly portion 500 is disposed on one side of the table 114 with respect to the seat portion 300, while a pressing part 640 of the moisture absorption part 600 may be exposed another side thereof (see FIG. 4). Here, the pressing unit 640 may be exposed through a hole formed in the table 114, and the conveying means 800 to be described later may press the exposed pressing unit 640. The pressing unit 640 is a configuration used in the process of impregnating the cosmetic material in the impregnating member 168 when the second container is manufactured, and a detailed description thereof will be described later.

The body 100 may include a housing 120 for protecting the cosmetic manufacturing space 102 from the outside space.

Specifically, the housing 120 constituting the main body 100 may include a front housing 120a in which the transparent window 122 is disposed, and a rear housing 120b connected to the front housing 120a through the connecting member 123. Here, the connecting member 123 may be a hinge. Since the user can lift at least a portion of the front housing 120a upward, maintenance convenience of the internal configuration of the cosmetic manufacturing apparatus 10 can be improved.

A portion of the housing 120 may be provided with the transparent window 122 to check the cosmetic manufacturing process performed in the cosmetic manufacturing space 102 from the outside. For example, the front central region of the housing 120 may be formed with the transparent window 122, through which all or some of the operation of the conveying means 800 and operations performed in the cosmetic manufacturing space 102 can be disclosed to a user, so that it is possible to increase the user's trust in the customized cosmetics manufactured by the cosmetic manufacturing apparatus 10.

In addition, a user interface 130 may be provided on one side of the housing 120. The user interface unit 130 may be configured to provide the user with status information of the cosmetic manufacturing apparatus 10 or the manufacturing process of customized cosmetics and associated information, and to receive preset information from the user. For example, the user interface 130 may be a touch screen, and may include a microphone and a speaker for sound input/output. The position at which the user interface unit 130 is provided on the housing 120 may be set so as not to overlap the transparent window 122, and in this embodiment, it is illustrated by way of example that the interface is provided in the front left region of the main body 100.

The user may perform an operation through the user interface unit 130, such as analyzing user's skin condition, checking the diagnosis result, checking the composition ratio data of a customized cosmetic to be provided to the user, adjusting the composition ratio data of a customized cosmetic to be manufactured, selecting a cosmetic having specific composition ratio data, or the like. In addition, personal information required for personalization of manufactured customized cosmetics may be input.

Additionally, a plurality of opening and closing doors 126 may be provided on at least one side of the housing 120. The user may open the opening/closing door 126 to exchange the cartridges 142 or to maintain components disposed in the cosmetic manufacturing space 102. Further, a lower support 127 capable of storing various articles may be provided on the lower side of the housing 120, which is the cosmetic manufacturing space 102.

In addition, a selectively openable/closable part supply door 129 may be provided on one side of the housing 120. The part supply door 129 may be provided on the front side of the part supply unit 160 to be described later, and may be selectively opened and closed.

In this regard, the part supply door 129 may be provided in a rotating structure or a slide structure having an elastic restoring force, and thus, may be pushed and opened when a tray 165 of the part supply unit 160 is moved to the outside of the main body 100, and then be returned to its original state and be closed when the tray 165 is moved into the interior of the main body 100.

In addition, the user or a separate robot may open the part supply door 129, and place the components constituting the first container (e.g., the mixing container 161 and the discharging member 162) and the components constituting the second container (e.g., the base container 164, the impregnating member 168, and the cover container 166) in the part supply unit 160. Additionally, when the assembled first container or second container is placed on the part supply unit 160, the user may open the part supply door 129 and take out the assembled finished product.

In addition, a moisture absorption door 128 that can be selectively opened and closed may be provided on another side of the housing 120. By providing such moisture absorption unit door 128, it is possible to increase the maintenance convenience of the moisture absorption unit 600 to be described later.

Meanwhile, on the base 110, a recovery portion 112 may be provided for recovering the mixing container 161, which is no longer needed after mixing the cosmetic materials when the cosmetic manufacturing apparatus 10 is used to manufacture the second container. The recovery portion 112 may be disposed adjacent to the assembly portion 500, and may be provided in the form of a hole punched in the base 110, so that the conveying means 800 can simply drop the mixing container 161 after finishing the discharge into the base container 164, from above the recovery portion 112 in order to recover it. In this case, a container (not shown) for recovering the discarded mixing container 161 may be provided under the recovery portion 112.

The cosmetic material storage unit 140 may be disposed on one side of the main body 100, and include a plurality of cartridges 142. In the following description, one side of the main body 100 may be understood as one direction based on the conveying means 800 installed on the base 110, and another side of the main body 100 may be understood as another direction different from the one side. In this embodiment, based on the drawings, the cosmetic material storage unit 140 is illustrated by way of example as being disposed on the left and right sides of the conveying means 800.

Cosmetic materials used as raw materials for cosmetics may be stored in respective cartridges 142. Any one kind of cosmetic material may be divided and provided in a plurality of cartridges 142. The cartridge 142 may be connected to a cosmetic material supply means 220 such as a pump provided in the cosmetic material supply unit 200, and may be replaced when the cosmetic material stored therein is exhausted.

In this embodiment, it is described by way of example that a plurality of cartridges 142 are provided, each cartridge 142 storing a preset type of cosmetic material. The plurality of cartridges 142 may be disposed side by side on one wall of the housing 120, and a portion of the housing 120 may be formed to be openable for replacement of the cartridge 142.

Each cartridge 142 may be connected to the cosmetic material supply means 220 through a tube 143. The cosmetic material stored in the cartridge 142 may be discharged to the mixing container 161 located in a mixing container conveying unit 250 through the cosmetic material supply means 220.

The cosmetic material supply unit 200 may be disposed adjacent to the cosmetic material storage unit 140. Specifically, the cosmetic material supply unit 200 may be disposed on the upper side of the cosmetic material storage unit 140. Here, the upper side may be understood as a +z direction based on FIG. 3.

The cosmetic material supply unit 200 may discharge the cosmetic material stored in the cartridge 142 to the mixing container 161 in the mixing container conveying unit 250 according to the composition ratio generated by the control unit 900. Here, the composition ratio may be preset and stored in a memory (not shown), received from the terminal 20 and the operating server 40, or be calculated by the control unit 900 based on the received data.

In addition, the cosmetic material supply unit 200 may be provided in plurality so as to be separated in an independent space. In this embodiment, it will be described by way of example that the two cosmetic material supply units 200 are provided in the left and right sides of the main body 100, respectively.

Each cosmetic material supply unit 200 may include a cosmetic supply means 220 for conveying the cosmetic material stored in the cartridge 142 by providing power for supplying the cosmetic material; a plurality of discharging hole 232 through which the cosmetic material conveyed from the cosmetic material supply means 220 is discharged; and a mixing container conveying unit 250 movably provided under the plurality of discharging holes 232 with the mixing container 161 fixed therein (see FIG. 5).

The cosmetic supply means 220 may suck the cosmetic material from the cartridge 142 at a preset speed and discharge the cosmetic material to the mixing container 161. For example, the cosmetic supply means 220 may include a peristaltic pump capable of fine flow control.

In this case, the cosmetic material suction and discharge speed of the cosmetic supply means 220 may be changed according to a preset condition or control of the control unit 900. For example, the control unit 900 may adjust the supply flow rate and flow velocity by controlling the peristaltic pump provided as the cosmetic supply means 220 according to the amount of the cosmetic material injected into the mixing container 161.

The cosmetic supply means 220 may be supported by the cosmetic material supply unit support 235, and the mixing container conveying unit 250 may be provided under the cosmetic supply means 220.

Here, the discharging hole 232 through which the cosmetic material is discharged may be provided on one side of the cosmetic material supply unit support 235, and the mixing container conveying unit 250 is moved to the lower side of the discharging hole 232 so that the cosmetic material can be received in the mixing container 161.

A connection flow path may be provided between the cosmetic supply means 220 and the discharging hole 232 through which the cosmetic material is discharged. Here, when the cosmetic supply means 220 is provided as a peristaltic pump, the connection flow path may be the tube 143. That is, the tube 143 may be understood as a means for connecting the cartridge 142 and the discharging hole 232 through the cosmetic supply means 220.

The cosmetic supply means 220 may be provided in a number corresponding to respective cartridges 142. For example, one cosmetic supply means 220 may be connected to one cartridge 142, and each cosmetic supply means 220 may adjust the discharge amount of the cosmetic material stored in the cartridge 142.

The cosmetic supply means 220 may discharge the cosmetic material stored in the cartridge 142 to the mixing container 161 seated in the mixing container conveying unit 250.

The mixing container conveying unit 250 may include a seat groove 2547a for a mixing container into which the mixing container 161 is inserted. In addition, the mixing container conveying unit 250 may reciprocate along a direction (y-axis direction) in which the plurality of discharging holes 232 are arranged.

The mixing container conveying unit 250 may have the mixing container 161 seated in the mixing container seat groove 2547a, and allow the mixing container 161 to receive the cosmetic materials discharged from the plurality of discharging holes 232 while reciprocating under the discharging holes 232 (see FIG. 5). Here, the number of the discharging holes 232 may be equal to or greater than that of the cosmetic supply means 220.

The mixing container conveying unit 250 may move to the next discharging hole 232 after waiting for a preset period of time under each discharging hole 232. While the mixing container conveying unit 250 waits for the preset period of time, the cosmetic material may be discharged from the discharging hole 232 to the mixing container 161.

Specifically, the mixing container conveying unit 250 may include a movable block 254 for a mixing container that is moved along a guide rail 252 for a mixing container; a seat groove 2547a for a mixing container provided on the movable block 254 for a mixing container and capable of fixing the mixing container 161 thereon; and a locking lever 255 for a mixing container that extends from the movable block 254 for a mixing container and can be gripped by the conveying means 800.

In addition, the guide rail 252 for a mixing container extending along the arrangement direction (y direction) of the discharging holes 232 may be provided at the lower side of the mixing container conveying unit 250, and a stopper 256 for a mixing container, through which the locking lever 255 for a mixing container can be caught, may be provided at the lower side of the locking lever 255 for a mixing container. Here, the guide rail 252 for a mixing container and the stopper 256 for a mixing container may be understood as being installed on the base 110. In addition, the stopper 256 for a mixing container may be provided with a plurality of grooves into which the locking lever 255 for a mixing container can be fitted. The spacing of the plurality of grooves corresponds to the spacing of the discharging holes of the cosmetic supply means 220.

In this embodiment, the movement of the movable block 254 for a mixing container is described by way of example as being made by the conveying means 800. For example, after gripping the locking lever 255 for a mixing container which extends from the movable block 254 for a mixing container, the conveying means 800 may reciprocate it in the y-axis direction.

After the conveying means 800 grips the locking lever 255 for a mixing container, and releases the movable block 254 for a mixing container from the constrained state, and then moves the movable block 254 for a mixing container, it may insert the locking lever into the groove of the stopper 256 for a mixing container at a different position, constraining the movable block 254 for a mixing container again, so that the mixing container 161 can stably be maintained at corresponding position while the cosmetic material is discharged. In this case, while the movable block 254 for a mixing container is fixed to the stopper 256 for a mixing container and any one cosmetic material is discharged to the mixing container 161, the conveying means 800 can freely perform other operations. Therefore, it is possible to shorten the manufacturing time by efficiently configuring the overall manufacturing process.

According to an embodiment, the movement and position maintenance of the movable block 254 for a mixing container may be implemented by a separately provided driving device. For example, the movable block 254 for a mixing container may be a movable block provided to a linear motor guide. In this case, the control unit 900 controls the linear motor guide to allow the mixing container 161 seated on the movable block 254 for a mixing container to receive the cosmetic material provided through the cosmetic supply means 220, at a static position.

Meanwhile, a weight sensor capable of measuring a change in weight of the mixing container 161 may be further provided inside the movable block 254 for a mixing container. As the cosmetic material is injected into the mixing container 161 by the cosmetic material supply unit 200, the weight of the mixing container 161 may change, and the control unit 900 may adjust the supply speed of the cosmetic material through the cosmetic material supply unit 200 according to the results measured by the weight sensor.

The part supply unit 160 may supply components of the cosmetic containers (e.g., the first container and the second container) that can be assembled in the cosmetic manufacturing apparatus 10.

Specifically, the part supply unit 160 may include a tray 165 on which components can be placed; a first container component support 163 capable of supporting a component for forming the first container; and a second container component support 169 capable of supporting a component for forming the second container.

Hereinafter, those supplied by the part supply unit 160, such as components constituting the mixing container 161 and the cosmetic container, will be collectively referred to as "parts".

The tray 165 may be provided on the base 110, and be movable such that at least a portion of the tray 165 can be exposed to the outside of the main body 100. For example, the tray 165 may be able to slide to the outside of the main body 100 through the part supply door 129.

In this case, the user or a separate robot can easily place a component constituting the first container and a component constituting the second container on the part supply unit 160, and the first container and the second container can be easily discharged to the outside of the main body 100 after finishing their assembly.

The first container component support 163 may include a mixing container support 163a capable of supporting the mixing container 161; and a discharging member support 163b capable of supporting the discharging member 162.

The mixing container support 163a may be provided with a groove into which the mixing container 161 can be inserted. The discharging member support 163b may be provided with a groove into which the straw 1622 can be inserted, so that the discharging member 162 can be supported.

The second container component support 169 may include a base container support 169a capable of supporting the base container 164; an impregnating member support 169b capable of supporting the impregnating member 168; and a cover container support 169c that can support the cover container 166.

In addition, a groove 167 may be provided on the front surface of the tray 165, and the assembled first container or the second container may be placed in the groove 167 of the tray 165.

In this embodiment, the first container may be understood as being formed by assembling the mixing container 161 with the discharging member 162.

Specifically, the discharging member 162 may include a pumping part 1621 that generates a pressure difference to provide a force capable of conveying the fluid; a straw 1622 connected to the pumping part 1621 and inserted into the mixing container 161 to suck the cosmetic material stored in the mixing container 161; and a cap 1623 capable of sealing the inlet 1611 of the mixing container 161.

The mixing container 161 may provide a space for storing cosmetic materials, and may include an inlet 1611 into which a straw 1622 can be inserted.

The mixing container 161, which is a part of the first container, may be used for storing cosmetic materials of the finished product. That is, the mixing container 161 may be used as a part of customized cosmetic container after having been used for mixing cosmetics.

Additionally, the second container may be understood as being formed by assembling the base container 164, the impregnating member 168, and the cover container 166 with one another.

Specifically, the base container 164 may accommodate the impregnating member 168 provided with cosmetics and a sponge, and the cover container 166 may selectively seal the impregnating member 168 in the base container 164.

A makeup tool such as a powder puff may be provided in advance in the cover container 166.

Specifically, the cover container 166 may include an inner cover coupled to the base container 164 to support the makeup tool and cover the impregnating member 168, and an outer cover to protect the entire container by covering the makeup tool. The inner cover and the outer cover may each rotate to shield the impregnating member 168 or the makeup tool.

Additionally, the cosmetic manufacturing space 102 may be provided with the part holding unit 50 where the first container and the second container can be assembled (see FIG. 7).

Specifically, the part holding unit 50 may include a seat portion 300 where the first container can be assembled; and an assembly portion 500 where the second container can be assembled. The part holding unit 50 may be provided on the top of the table 114, and a hole through which the pressing unit 640 and which is spaced apart from the part holding unit 50 by a predetermined distance may be exposed may be provided in the table 114.

The seat portion 300 may be a position where the mixing container 161 temporarily waits before moving to the next process in the manufacturing process of the customized cosmetic, or be used for supporting the mixing container 161 during the assembly of the first container. When two robot arms are used as the conveying means 800 as in this embodiment, the seat portion 300 may disposed at a position where both robot arms can access it, thereby conveying parts between the two robot arms.

Specifically, the mixing container 161 may be formed in a structure having an edge in its longitudinal section, and the mixing container seat groove 302 having a shape corresponding to the shape of the mixing container 161 may be provided in the seat portion 300. The conveying means 800 may perform a process of changing the direction of the mixing container 161 to a preset direction so that the mixing container 161 can be accurately fitted into the mixing container seat groove 302, and then seating the mixing container 161 therein. As a result, the mixing container 161 may always be positioned at a preset position, and stably maintain its posture during the coupling process with the discharging member 162 against an external force in the rotational direction.

The assembly portion 500 may provide a location and space for manufacturing cosmetics as a finished product by assembling components constituting the cosmetic container to one another. In this embodiment, it is described by way of example that the second container is assembled in the assembly portion 500. That is, although in this embodiment the assembly of the first container is performed in the seat portion 300, and the assembly of the second container is performed in the assembly portion 500, the spirit of this disclosure is not limited thereto. For example, both the assembly of the first container and the assembly of the second container may be performed in the seat portion 300. In this case, the seat portion 300 may be understood as the assembly portion 500. Alternatively, both the assembly of the first container and the assembly of the second container may be performed in the assembly portion 500. A detailed assembly process of each container will be described later.

The coupling of the base container 164, the impregnating member 168, and the cover container 166 (assembly of the second container) may occur on the assembly portion 500. Specifically, the base container 164 may be located on the assembly portion 500 by the conveying means 800; the cosmetics stored in the mixing container 161 may be put into the base container 164; the impregnating member 168 may be placed on the base container 164; the moisture absorption unit 600 may be subjected to the moisture absorption process; and then the cover container 166 may be coupled to the base container 164 to cover the impregnating member 168. A more detailed description thereof will be given below.

The assembly portion 500 may include a base container seat groove 502 in which the base container 164 can be seated so as to receive the cosmetic materials mixed in the mixing container 161 during the assembly process of the second container. The conveying means 800 may grip the base container 164 on the part supply unit 160, and move it to the base container seat groove 502. After the mixing container 161 in which mixing is completed is conveyed by the conveying means 800 from the seat portion 300 or the mixing unit 400, the cosmetic materials may be discharged to the base container 164 on the assembly portion 500.

Specifically, the base container 164 may be formed in a structure having an edge in at least one portion or a cylindrical shape, and the base container seat groove 502 may have a shape corresponding to the cornered structure or cylindrical shape of the base container 164. The conveying means 800 may perform a process of seating the base container 164 after changing the direction of the base container 164 to a preset direction so that the base container 164 can be accurately fitted in the base container seat groove 502. As a result, the base container 164 may always be positioned at a preset position, and stably maintain its posture during the coupling process with the cover container 166 against an external force in the rotational direction.

In addition, the impregnating member 168 may be accommodated by the conveying means 800 in the base container 164 seated on the assembly portion 500, after completing the accommodation of the mixed cosmetic materials. The base container 164 in which the accommodation of the impregnating member 168 has been completed may be moved to the moisture absorption unit 600 by the conveying means 800 again to be subjected to a moisture absorption process.

In the moisture absorption unit 600, a process of impregnating the cosmetic materials into the impregnating member 168 included in the second container may be performed. The base container 164 on the assembly portion 500, in which the accommodation of the cosmetic materials and the loading of the impregnating member 168 has been completed, may be moved to the moisture absorption unit 600 where the cosmetic materials may be sufficiently impregnated into the impregnating member 168 by the moisture absorption tool 620 provided in the moisture absorption unit 600. The moisture absorption tool 620 may perform the impregnation action by repeatedly performing the process of pressing the impregnating member 168 to a preset pressure.

The moisture absorption unit 600 may include a moisture absorption tool 620 and a base container conveying unit 650 (see FIG. 8).

The moisture absorption tool 620 may be understood as a configuration capable of impregnating a cosmetic material into the impregnating member 168 by pressing the impregnating member 168 inserted into the base container 164.

The base container conveying unit 650 may be understood as a configuration for seating the base container 164 moved from the assembly portion 500 thereon and then moving it to the lower side of the moisture absorption tool 620. Cosmetic materials and the impregnating member 168 are accommodated in the base container 164 seated on the base container conveying unit 650.

The moisture absorption tool 620 may include an static holder 630 capable of fixing the base container 164 seated on the base container conveying unit 650 by ascending and descending in the height direction (z direction) from the bottom of the table 114, and a pressing unit 640 capable of pressing the impregnating member 168 on the top of the base container 164 fixed by the static holder 630. Here, the table 114 may have a hole through which the pressing unit 640 may be exposed, and the conveying means 800 may allow the impregnating member 168 to be impregnated by pressing the exposed pressing unit 640.

Additionally, the base container conveying unit 650 may include a movable block 652 for the base container on which the base container 164 is seated, a guide rail 651 for the base container providing a path along which the movable block 652 for the base container moves, a locking lever 653 for the base container for moving the movable block 652 for the base container, a stopper 654 for the base container that can fix the locking lever 653 for the base container at a preset position. Here, the conveying means 800 may grip the locking lever 653 for the base container, and move the movable block 652 for the base container on which the base container 164 is seated to the lower end of the pressing unit 640.

The moisture absorption unit 600 may include the base container conveying unit 650 which receives the base container 164 provided by the conveying means 800 from the assembly portion 500, and moves it to a position where the moisture absorption is performed by the moisture absorption tool 620.

The base container 164 whose moisture absorption has been completed in the moisture absorption unit 600 may be conveyed back to the assembly portion 500 by the conveying means 800, and seated thereon, and the conveying means 800 may convey the cover container 166 from the part supply unit 160 and couple it to the base container 164. The coupling of the base container 164 and the cover container 166 may be achieved by mechanical fitting coupling such as hook coupling, and for this, the conveying means 800 may apply a predetermined external force to the cover container 166. A more detailed description of the moisture absorption unit 600 will be described in more detail with reference to FIGS. 15 to 18 to be described later.

The mixing unit 400 is a component that applies an external force to the mixing container 161 in which the cosmetic materials are received through the cosmetic material supply unit 200 so that the cosmetic materials can be well mixed in the mixing container 161.

The mixing unit 400 may be rotatable to mix the cosmetic materials accommodated in the mixing container 161.

In this embodiment, the mixing unit 400 is described by way of example as being a device for mixing cosmetic materials by revolving the mixing container 161 at a high speed while rotating it on its axis at the same time.

Specifically, the mixing unit 400 may include a rotatable first rotating member 402 into which the mixing container 161 can be inserted; and a second rotating member 404 capable of rotating the first rotating member 402. Here, the first rotating member 402 may be spaced apart from the center M of the second rotating member 404 by a predetermined distance, and the first rotating member 402 may be stopped at a position preset by the control unit 900.

In this case, the conveying means 800 may insert the mixing container 161 into the first rotating member 402 when it is located at a preset position, thereby facilitating the control of the conveying means 800.

After accommodating the mixing container 161, the mixing unit 400 may be operated for a preset period of time under the control of the control unit 900, and when the mixing process in the mixing unit 400 is completed, the mixing container 161 may be moved to a subsequent process position by the conveying means 800.

In addition, the conveying means 800 may grip the mixing container 161 which contains no cosmetic material therein and is placed on the part supply unit 160, and move it to the mixing container conveying unit 250 of the cosmetic material supply unit 200. At this time, when moving the mixing container 161 to the mixing container conveying unit 250 disposed on one side (the left side of FIG. 4) of the main body 100, it can be directly moved from the part supply unit 160 to the mixing container conveying unit 250, while, when moving the mixing container 161 to the mixing container conveying unit 250 disposed on another side (the right side of FIG. 4) of the main body 100, it may be moved from the part supply unit 160 through the seat portion 300 to the mixing container conveying unit 250.

In addition, the conveying means 800 may move the mixing container 161 to the seat portion 300 after the receiving of the cosmetic material has been finished for a mixing container on the mixing container conveying unit 250 or the mixing process for a mixing container has been performed in the mixing unit 400.

In addition, the conveying means 800 may assemble the first container by coupling the discharging member 162 to the mixing container 161 seated on the seat portion 300, or may assemble the second container through processes of seating the base container 164 on the assembly part 500, pouring the cosmetic materials accommodated in the mixing container 161 to the base container 164, putting the impregnating member 168 into the base container 164, impregnating the cosmetic materials into the impregnating member 168 through the moisture absorption unit 600, and covering the base container 164 containing the impregnating member 168 with the cover container 166.

In addition, the conveying means 800 may place the assembled first container or the second container in the groove 167 of the part supply unit 160.

In addition, the conveying means 800 may push the tray 165 of the part supply unit 160 so that at least a portion of the tray 165 is exposed to the outside of the main body 100, thereby presenting to a user the first container or the second container that has been assembled.

The conveying means 800 may include a plurality of conveying units 801, 802 that may move the component provided in the part supply unit 160 to the part holding unit 50, and assemble the component moved to the part holding unit 50 into the first container to be provided as a pump-type container, or into the second container to be provided as a compact type container. Although, in this embodiment, two conveying units 801 and 802 are provided as the conveying means 800, the number of conveying units is not limited thereto as long as it is one or more.

Generally, the conveying means 800 may include a first conveying unit 801 and a second conveying unit 802 that are movable independently of each other.

When assembling the first container to form a pump-type container, one of the first conveying unit 801 and the second conveying unit 802 may grip the cap 1623 of the discharging member 162, and the other may be moved up and down while being in contact with the straw 1622, such that the straw 1622 of the discharging member 162 is aligned with the inlet portion 1611 of the mixing container 161 in the part holding unit 50.

When assembling the second container to form a compact container, one of the first conveying unit 801 and the second conveying unit 802 may seat the base container 164 constituting the second container on the part holding unit 50, and the other may turn over the mixing container 161, such that the cosmetic materials accommodated in the mixing container 161 can be moved to the base container 164.

The conveying means 800 may move parts between the components disposed on the above-described base 110. As described above, in this embodiment, the robot arm is provided by way of example as the conveying means 800. Specifically, the conveying means 800 may include a first conveying unit 801 that may correspond to one robot arm and a second conveying unit 802 that may correspond to another robot arm. The first conveying unit 801 and the second conveying unit 802 may be provided as a multi-articulated robot arm 810, respectively, and the degree of freedom that the articulated robot arm 810 may have may be provided differently depending on an embodiment. In this embodiment, a device having 6 degrees of freedom is used by way of example as the articulated robot arm 810.

The first conveying unit 801 and the second conveying unit 802 may be connected to one robot arm control unit 820, and extend from the robot arm control unit 820. The robot arm control unit 820 may control the first conveying unit 801 and the second conveying unit 802 according to the control of the control unit 900 to perform a preset function.

As there are various types of known articulated robot arms, detailed information related to the structure and control of the robot arm 810 will be omitted in this embodiment.

Meanwhile, a first gripper 840 is provided to the first conveying unit 801, and a second gripper 860 is provided to the second conveying unit 802. The first gripper 840 and the second gripper 860 may have a structural shape suitable for the functions to be performed by the first conveying unit 801 and the second conveying unit 802, respectively. Specific details related to the grippers 840 and 860 will be described later.

What has been described as a function and operation of the conveying means 800 in the above description may be performed by any one or both of the first conveying unit 801 and the second conveying unit 802. The conveying unit used for each function and operation may be selected differently depending on the arrangement of the components.

The first conveying unit 801 and the second conveying unit 802 may perform differently operation for moving the mixing container 161 provided in the part supply unit 160 to the cosmetic material supply unit 200, depending on the position where the cosmetic material supply unit 200 is disposed.

Specifically, in the case of accommodating the cosmetic material in the mixing container 161 from the cosmetic material supply unit 200 disposed on one side (the left side of FIG. 4), the second conveying unit 802 may grip the mixing container 161 disposed in the part supply unit 160, and move the mixing container 161 directly to the mixing container conveying unit 250 disposed at one side.

Additionally, in the case of accommodating the cosmetic material in the mixing container 161 from the cosmetic material supply unit 200 disposed on another side (the right side of FIG. 4), the second conveying unit 802 may grip the mixing container 161 disposed in the part supply unit 160, and seat the mixing container 161 on the seat portion 300. Thereafter, the first conveying unit 801 may grip the mixing container 161 seated on the seat portion 300, and move the mixing container 161 to the mixing container conveying unit 250 disposed on the other side.

In this way, the first conveying unit 801 and the second conveying unit 802 may be in charge of the work performed on one side and the work performed on another side inside the cosmetic manufacturing space 102, respectively.

The first conveying unit 801 may move parts from any one of the cosmetic material supply unit 200 disposed on the other side, the seat portion 300, the assembly portion 500, and the moisture absorption unit 600 to another thereof, or may perform an operation necessary for assembling the first container and the second container (including the moisture absorption process).

Specifically, the first conveying unit 801 may convey the mixing container 161 from the seat portion 300 to the mixing container conveying unit 250 disposed on the other side, move the mixing container conveying unit 250 under the cosmetic material supply unit 200 disposed on the other side, assemble the discharging member 162 to the mixing container 161 seated on the seat portion 300, provide the impregnating member 168 to the base container 164 seated on the assembly portion 500, convey the base container 164 from the assembly portion 500 to the moisture absorption unit 600, move the base container 164 in the moisture absorption unit 600 according to a preset order, convey the base container 164 and the impregnating member 168 in a state in which moisture absorption has been completed from the moisture absorption unit 600 back to the assembly portion 500, or couple the cover container 166 to the base container 164 seated on the assembly portion 500.

To this end, the first gripper 840 may have a structure capable of gripping and moving respective parts. In addition, the first gripper 840 may include a structure capable of operating the base container conveying unit 650 provided for conveying the base container 164 on the moisture absorption unit 600. Further, the first gripper 840 may also have a function of coupling the discharging member 162 to the mixing container 161 seated on the seat portion 300 by rotation.

Additionally, the second conveying unit 802 may move parts from any one of the part supply unit 160, the cosmetic material supply unit 200 disposed on one side, the seat portion 300, the mixing unit 400, and the assembly portion 500 to another thereof, or may perform an operation necessary for assembling the first container and the second container.

Specifically, the second conveying unit 802 may move the mixing container 161 from the part supply unit 160 to the cosmetic material supply unit 200 disposed on one side (the left side of FIG. 4), move the mixing container conveying unit 250 under the cosmetic material supply unit 200, move the mixing container 161 from the cosmetic material supply unit 200 disposed on one side to the mixing unit 400, move the mixing container 161 in which mixing has been completed from the mixing unit 400 to the seat portion 300, assist in assembling the mixing container 161 with the discharging member 162, move the first container which has been assembled in the seat portion 300 or the second container which has been assembled in the assembly part 500 to the groove 167 of the component supply part 160, or provide an external force for moisture absorption in the moisture absorption unit 600.

To this end, the second gripper 860 may have a structure capable of gripping and moving the mixing container 161. In addition, the second gripper 860 may include a structure capable of gripping and moving the locking lever 255 for a mixing container provided to the mixing container conveying unit 250. Further, the second gripper 860 may have a structure for aligning the straw 1622 when the first conveying unit 801 couples the discharging member 162 to the mixing container 161. Also, the second gripper 860 may have a structure for operating the moisture absorption tool 620 of the moisture absorption unit 600.

The operations performed by the first conveying unit 801 and the second conveying unit 802 as described above can be implemented by using the characteristics of the multi-articulated robot arm 810, and various methods for controlling this are known, and detailed descriptions related thereto will be omitted.

Meanwhile, in this embodiment, it is described by way of example that the multi-articulated robot arm 810 is provided as the conveying means 800, but the spirit of this disclosure is not limited thereto. For example, a conveying device capable of linear movement in the three-axis direction may be provided as the conveying means 800, and additional devices for performing the above-described functions may be added thereto.

Meanwhile, the control unit 900 may basically control the above-described components. For example, the control unit 900 may control the movement of the conveying means 800 and the amount of the cosmetic material discharged from the cosmetic material supply unit 200. Additionally, the control unit 900 may include a skin condition analysis unit 910 that analyzes the skin condition from the skin measurement data provided from any one of the terminal 20 and the operating server 40. As described above, the skin condition analysis unit 910 may receive an analysis result according to an embodiment.

In addition, the control unit 900 may include a composition ratio determination unit 920 that determines composition ratio data of cosmetic materials for manufacturing customized cosmetics according to the skin condition analysis result generated by the skin condition analysis unit 910. The composition ratio determination unit 920 may determine the composition ratio by substituting the skin condition analysis result as a variable value in a preset calculation formula, or select and determine the composition ratio closest to or most suitable for the skin condition analysis result from among a plurality of preset composition ratios. The preset composition ratio data may be understood as including the kinds and amounts of cosmetic materials to be used and the input ratios thereof, and in order for a user to intuitively understand this, and include data on physical properties such as color or viscosity of cosmetics corresponding to each composition ratio data.

In this case, the control unit 900 may include a composition ratio modification unit 930 that provides a user with an opportunity to modify the composition ratio data by providing the determined composition ratio to the user through a user interface unit 130. The user may check the composition ratio data presented through the user interface unit 130, determine whether to accept it as it is or use other composition ratio data, and input the modified data. At this time, the composition ratio data presented to the user may be the ratio itself, or may be characteristic information such as color or physical properties of cosmetics manufactured according to the composition ratio data. Accordingly, the modified data input by the user may also be characteristic information such as color or physical properties of cosmetics. According to an embodiment, the composition ratio modification unit 930 may transmit data to the terminal 20 instead of the user interface unit 130, and receive the modified data through the terminal 20.

Additionally, the control unit 900 may include a cosmetic kind receiving unit 940 receiving a desired kind of cosmetic from the user, a manufacturing mode receiving unit 950 receiving a desired manufacturing mode, and a composition ratio determination unit 920. In this embodiment, the information provided to the cosmetic kind receiving unit 940 may be related to whether the kind of customized cosmetic to be manufactured is the first container or the second container, or the information provided to the manufacturing mode receiving unit 950 may be related to whether the mode is one of receiving samples or one of receiving finished products. Here, the sample is a cosmetic manufactured by using a relatively small amount while maintaining the composition ratio of the cosmetic, and the finished product refers to a cosmetic filled with a preset capacity to be provided as a single sale product.

Additionally, the manufacturing mode may further include a mode for requesting a finished product after receiving a sample, a mode for requesting a sample according to the changed composition ratio after receiving a sample, and a mode for requesting discard after receiving a sample. These manufacturing modes may be presented to the user upon receipt of the sample.

A user may select a kind of cosmetic or a manufacturing mode through the user interface unit 130. To this end, the user interface unit 130 may present a screen for receiving the kind of cosmetic and the manufacturing mode selected by the user. Also, according to an embodiment, the user may provide the cosmetic kind or manufacturing mode to the cosmetic manufacturing apparatus 10 through the terminal 20 or the operating server 40.

Hereinafter, with reference to the drawings, a method of controlling a cosmetic manufacturing apparatus having the above-described configuration will be described.

FIG. 11 is a flowchart illustrating a control method of the cosmetic manufacturing apparatus of FIG. 1.

Referring to FIG. 11, the control method of the cosmetic manufacturing apparatus may include calculating data on a cosmetic to be manufactured including the composition ratio by the control unit 900 (S10); discharging the cosmetic materials stored in the cosmetic storage unit 140 to the mixing container 161 according to the composition ratio by controlling the cosmetic material supply unit 200 and the conveying means 800 by the control unit 900 (S20); mixing the cosmetic materials discharged into the mixing container 161 by controlling the mixing unit 400 and the conveying means 800 by the control unit 900 (S30); providing the mixing container 161 to the user when the control unit 900 determines that the cosmetic materials accommodated in the mixing container 161 is a sample, and receiving an input from the user as to whether to change the composition ratio (S40); and storing the cosmetic materials accommodated in the mixing container 161 in at least one of the first container provided as a pump-type container and the second container provided as a compact container and providing it to a user, by controlling the conveying means 800 by the control unit 900 (S50).

The above-described S40 may be optionally provided; S10 may include at least one of S110, S120, S130, S140, and S150 to be described later; S20 may include one of S210 and S220 to be described later; S30 may include at least one of S230 and S240 to be described later; S40 may include at least one of S310, S320, S330, S340, S350, S360, S370, S380, S390, S400, S420, and S430 to be described later; S50 may include at least one of S500 and S900 to be described later; and detailed description thereof will be given later.

FIG. 12 is a flowchart showing in more detail the control method of the cosmetic manufacturing apparatus 10 of FIG. 1.

Referring to FIG. 12, the control unit 900 may collect desired cosmetic kind data from a user through the cosmetic kind receiving unit 940 (S110). The cosmetic kind data may be input through the user interface unit 130 as described above, or may be provided through the terminal 20 and the operating server 40.

Also, the control unit 900 may collect manufacturing mode data as to whether a product desired by the user is a sample or a finished product through the manufacturing mode receiving unit 950 (S120). The manufacturing mode data may be input through the user interface unit 130, or may be provided from the terminal 20 or the operating server 40.

Then, the control unit 900 analyzes the skin condition of the user through the skin condition analysis unit 910 (S130). As described above, the skin condition analysis unit 910 may receive the already analyzed result from any one of the terminal 20 and the operating server 40.

The composition ratio determination unit 920 of the control unit 900 determines the composition ratio data based on the analysis result provided in step S130, and determines the amount to be manufactured as a cosmetic according to the manufacturing mode collected in step S120 (S140). In this step, the supply amounts of a plurality of kinds of cosmetics stored in the cosmetic storage unit 140 may be determined. For example, when the user selects the sample manufacturing mode, supply amounts of the cosmetic materials required to produce a relatively small amount of the cosmetic may be determined. In addition, when the user selects the finished product manufacturing mode, as a relatively large amount, a set amount to be provided as one product for sale may be set as the total amount of the cosmetic, and the supply amount of each cosmetic material for this may be determined. In this embodiment, the composition ratio determination unit 920 may determine a result closest to the skin condition analysis result among a plurality of preset composition ratios, as composition ratio data.

Further, S140 may include determining the composition ratio data by the composition ratio determination unit 920 under the consideration of the user's cosmetic purchase history. For example, if the user has a lot of history of purchasing cosmetics with a brighter color than the skin condition measured by the terminal 10, the composition ratio determination unit 920 may determine the composition ratio data to represent a brighter color than the composition ratio data based on the skin condition analysis result.

And, after the composition ratio modification unit 930 of the control unit 900 presents the composition ratio data (at least one of a composition ratio based on a skin condition analysis result and a composition ratio under the consideration of a cosmetic purchase history) to the user through the user interface unit 130, or the like, it may collect the composition ratio modification data from the user, and modify the composition ratio data and the supply amount of each cosmetic material according to the result (S150).

In step S150, the user may select not to modify the composition ratio through the user interface unit 130 or the terminal 20, and in this case, the composition ratio data determined in step S140 may be maintained as it is.

S110 to S150 described above are steps of collecting information necessary for cosmetic manufacturing and generating data, and their order can be interchanged, and each step can be divided into more subdivided steps so that it can be transformed to interact with the user or process data.

After the collection of information and data processing necessary for cosmetic manufacturing have been completed, the physical cosmetic manufacturing step is performed.

The control unit 900 may control the robot arm control unit 820 to drive the conveying means 800. As described above, the conveying means 800 may be constituted by the first conveying unit 801 and the second conveying unit 802, and in each step to be described later, any one or both of the first conveying unit 801 and the second conveying unit 802 may be used as the conveying means 800 in the cosmetic manufacturing process.

Specifically, the control unit 900 may control the conveying means 800 to move the mixing container 161 toward the cosmetic material supply unit 200 (S210).

At this time, if the mixing container 161 is moved toward the cosmetic material supply unit 200 disposed on one side (the left side of FIG. 4), the mixing container 161 in the part supply unit 160 can be moved directly to the cosmetic material supply unit 200, while, if the mixing container 161 is moved to the cosmetic material supply unit 200 disposed on the other side (the right side of FIG. 4), the mixing container 161 in the part supply unit 160 may be moved to the cosmetic material supply unit 200 after being seated on the mounting unit 300.

Here, the movement of the mixing container 161 toward the cosmetic material supply unit 200 may be understood as moving to the seat groove 2547a for a mixing container of the mixing container conveying unit 250.

Meanwhile, when S210 is performed a second time, that is, when it is preformed after the mixing container 161 has been provided to the user as a sample manufacturing mode and recovered, the control unit 900 may directly move the mixing container 161 in the part supply unit 160 to the cosmetic material supply unit 200 with the conveying means 800, or move the mixing container 161 in the part supply unit 160 to the seat portion 300, and move from the seat portion 300 back to the cosmetic material supply unit 200.

In this way, the specific control method varies depending on the number of times in which S210 is performed, and the mixing container 161 provided as a sample to the user is also used in subsequent procedures, thereby preventing unnecessary process waste and material waste, and thus lowering the production cost of the product.

Thereafter, the cosmetic material supply unit 200 is controlled by the control unit 900 to supply cosmetic materials to the mixing container 161 according to the predetermined composition ratio (S220). The control unit 900 may control such that the cosmetic materials are sequentially discharged from each cartridge 142 through the cosmetic material supply means 220 so as to correspond to the predetermined composition ratio data and the production amount. To this end, the control unit 900 may control the conveying means 800 to move and fix the movable block 254 for a mixing container of the mixing container conveying unit 250. Specifically, the conveying means 800 may selectively constrain the movable block 254 to the stopper 256 for a mixing container by operating the locking lever 255 for a mixing container, and move the movable block for a mixing container in a preset order according to the composition ratio data, thereby allowing the mixing container 161 to be supplied with the cosmetic materials provided from the cosmetic supply means 220. Here, the movement of the mixing container conveying unit 250 disposed on one side may be performed by the second conveying unit 802, and the movement of the mixing container conveying unit 250 disposed on the other side may be performed by the first conveying unit 801.

Meanwhile, in S220, the control unit 900 may adjust the supply speed of the cosmetic material supply means 220 according to the amount of the supplied cosmetic material. For example, in the case of supplying any one cosmetic material stored in any one cartridge 142 to the mixing container 161, when the ratio (B/A) of the already-supplied amount (B) to the total amount (A) to be supplied from the cartridge 142 is lower than the preset range, the cosmetic supply means 220 allows the cosmetic material to be supplied at a relatively high-speed, while, when the ratio is higher than the preset range, it allows the cosmetic material to be supplied at a relatively low-speed. Accordingly, high-speed supply can be achieved in the initial section where fine control is unnecessary, and thus the total cosmetic supply time can be shortened. Here, as a method of measuring the already-supplied amount (B), a method in which the control unit 900 calculates the supply amount according to the recording time and speed at which the cosmetic supply means 220 has been driven may be used, or a method in which it is calculated by receiving the changed weight data from the weight sensor provided in the movable block 254 for a mixing container may be used.

The mixing container 161 for which the cosmetic material injection has been finished in the cosmetic material supply unit 200 may be moved to the mixing unit 400 by the conveying means 800 (S230).

Here, after the cosmetic material injection to the mixing container 161 has been finished in the cosmetic material supply unit 200 disposed on one side, the mixing container 161 may be moved from the cosmetic material supply unit 200 to the mixing unit 400 by the second conveying unit 802. Additionally, after the cosmetic material injection to the mixing container 161 has been finished in the cosmetic material supply unit 200 disposed on the other side, the mixing container 161 may be seated on the seat portion 300 by the first conveying unit 801 and then moved from the seat portion 300 to the mixing unit 400 by the second conveying unit 802.

The control unit 900 drives (e.g., rotates) the mixing unit 400 to mix the cosmetic materials accommodated in the mixing container 161, applying an external force to the mixing container 161 (S240). As described above, the mixing unit 400 may rotate the mixing container 161 on its axis while at same time it revolves at a high speed, and the cosmetic materials inside the mixing container 161 can be well mixed by the vortex generated thereby. At this time, after the rotation of the mixing unit 400 stops, the first rotating member 402 of the mixing unit 400 into which the mixing container 161 is inserted may be controlled to stop at the same position by the control unit 900. In this case, the conveying means 800 can insert the mixing container 161 into the first rotating member 402 stopped at a preset position, and thus there is an advantage in that the control for inserting the mixing container 161 into the first rotating member 402 can be simplified.

S210 to S240 described above may be understood as steps of supplying the cosmetic material to the mixing container 161 and mixing a plurality of cosmetic materials accommodated in the mixing container 161.

When S240 has been completed, the control unit 900 determines whether the manufacturing mode collected in step S120 is the sample manufacturing mode or the finished product manufacturing mode (S310).

If the finished product manufacturing mode is selected instead of the sample manufacturing mode, the process of manufacturing a cosmetic may be performed according to the kind of cosmetic (S500). Specific details of S500 will be described later.

The control unit 900 may control the conveying means 800 to present the finished cosmetic container (first container or second container), which has been manufactured at S500 and delivered to the groove 167 of the part supply unit 160, to the user (S900). Specifically, the control unit 900 may control the second conveying unit 802 to place the completed cosmetic container (the first container or the second container) in the groove 167 of the part supply unit 160. At this time, the user may open the part supply door 129 and take out the completed cosmetic container placed on the part supply unit 160. Alternatively, the second conveying unit 802 may push the tray 165 of the part supply unit 160, so that the completed cosmetic container placed on the part supply unit 160 can be discharged to the outside of the main body 100.

Meanwhile, as a result of the determination in S310, in the case of the sample manufacturing mode, the control unit 900 may move the mixing container 161 of the mixing unit 400 to the groove 167 of the part supply unit 160 or the mixing container support unit 163a by the conveying means 800 in order for the user to try the mixed cosmetic materials accommodated in the mixing container 161 as a sample (S320). In this case, the second conveying unit 802 may be used as the conveying means 800. According to an embodiment, the control unit 900 may control the conveying means 800 to move the mixing container 161 from the seat portion 300 to the part supply unit 160 after moving the mixing container 161 of the mixing unit 400 to the seat portion 300.

The control unit 900 may control the conveying means 800 to supply the mixing container 161 delivered to the part supply unit 160 to the user (S330). S330 may be understood as being substantially the same as S900 described above.

Since the user has selected the sample manufacturing mode, the user may receive and try the mixing container 161 provided as a sample, and then put it back on the part supply unit 160, specifically, the groove 167 of the part supply unit 160, or the mixing container support unit 163a.

At this time, at least one of the tray 165 or the groove 167 or the mixing container support 163a is provided with a predetermined detection means such as a weight sensor, so that it can be detected whether the user has returned the mixing container 161 of the sample cosmetic. Alternatively, the cosmetic manufacturing apparatus 10 may receive an input from the user through the user interface unit 130 as to whether the mixing container 161 is returned to the part supply unit 160 after the sample cosmetic has been used. Alternatively, the control unit 900 may induce the user to return the mixing container 161 to the part supply unit 160 by notifying the user through the user interface unit 130 that the part supply unit 160 is automatically recovered after a preset period of time has elapsed.

The control unit 900 may move the tray 165 of the part supply unit 160 back to the inside of the main body 100 by using the conveying means 800, thereby recovering the mixing container 161 again (S340).

In addition, the control unit 900 may collect subsequent manufacturing mode data and, if necessary, composition ratio modification data from the user through the manufacturing mode receiving unit 950 (S350). The subsequent manufacturing mode may be collected through the user interface unit 130 and the like, similarly to the manufacturing mode in step S120 described above, and may be one of the finished product manufacturing request, the composition ratio modification request, and the discard request. In this case, when the subsequent manufacturing mode selected by the user is a composition ratio modification request, the control unit 900 may additionally collect composition ratio modification data through the composition ratio modification unit 930.

If the subsequent manufacturing mode collected in S350 is the finished product manufacturing request (S360), the control unit 900 may change the data of the total amount of the cosmetic to be manufactured to correspond to the manufacturing of the finished product, and may change the manufacturing mode from the sample manufacturing mode to the finished product manufacturing mode (S370). In this case, the manufacturing amount data of the cosmetic to be additionally manufactured may be set as an amount obtained by subtracting the amount provided as a sample from the total amount. According to an embodiment, the control unit 900 may set the manufacturing amount of cosmetic to be additionally manufactured under the consideration of the difference between the initial weight provided as a sample and the returned weight.

Then, the control unit 900 may re-perform S210 and process after it. Therefore, additional cosmetic material supply for manufacturing the finished product is performed according to the preset composition ratio, and the data is changed to the finished product manufacturing mode, so that the process after S500 may be performed according to the determination result in S310.

Meanwhile, as a result of the determination in step S360, if it is not a request for manufacturing a finished product, the control unit 900 determines whether or not the user's request is a request for modifying the composition ratio (S380). In this flowchart, S360 and S380 are illustrated by way of example as being sequentially performed, but in an actual control program, these may be processed as a single branch logic.

As a result of the determination in S380, if it is not a request to modify the composition ratio, it may be treated as a request for discard of the manufactured sample, and the control unit 900 may control the conveying means 800 to move the mixing container 161 in which the mixed cosmetic is stored from the part supply unit 160 to the recovery portion 112 (S420). In this case, the second conveying unit 802 may be used as the conveying means 800.

As a result of the determination in step S380, if there is a request for modification of the composition ratio, the control unit 900 determines whether or not such composition ratio modification is possible (S390). A user's request for modification may be made in various ways, and in some cases, there may be a case in which modification is impossible with the already-manufactured cosmetic in the mixing container 161. For example, if cosmetic material of a specific ingredient should be excluded or if a specific cosmetic material has been added more than the amount that should be included in the finished product, it is impossible to respond by supplying additional cosmetic materials to the mixing container 161 in which the already-manufactured cosmetic materials are stored. In this case, the control unit 900 may output a message that the composition ratio cannot be modified to the user through the user interface unit 130 (S430), and recover the mixing container 161, that is, the sample manufactured by performing S420.

On the other hand, if it is determined in S390 that the composition ratio can be modified, the control unit 900 determines composition ratio data and production amount for manufacturing a new sample according to the composition ratio requested to be modified (S400). This may be performed substantially in the same way as S150, but an additional input amount of each cosmetic material may be calculated under the consideration of the amount of the cosmetic material that has already been put into the mixing container 161.

Then, the control unit 900 may re-perform S210 and process after it. Thereby, additional cosmetic material supply for manufacturing other sample is made according to the changed composition ratio data and production amount, and since it is still in the sample manufacturing mode, the process after S320 may be performed according to the determination result in step S310.

According to an embodiment, the number of requests for modification of the sample may be limited, and the control unit 900 may notify the limited number of times through the user interface unit 130 before and after performing S350 and S370, or inform that a request for further modification of the sample is impossible.

S310 to S430 described above may be understood as providing sample cosmetics to the user.

Through the above-described process, the user may receive and test a sample of the cosmetic that he or she wants to manufacture or a customized cosmetic suitable for his or her skin condition, or change it and test it again, and manufacture the finished product immediately or after sample testing. Therefore, the cosmetic manufacturing apparatus 10 can provide improved satisfaction to the user.

Hereinafter, with reference to the drawings, the manufacturing process according to the cosmetic kind (e.g., whether the first container or the second container) performed as S500 will be described in detail.

FIG. 13 is a flowchart showing specific processes of a manufacturing step according to the kind of cosmetic of FIG. 12.

Referring to FIG. 13, as S500, the control unit 900 may move the mixing container 161 from the mixing unit 400 with the conveying means 800 to the part holding unit 50 (specifically, the seat portion 300), and the mixing container 161 seated on the seat portion 300 may wait for a subsequent process (S510).

When the kind of cosmetic collected in S110 is the first container (S520), the control unit 900 may control the conveying means 800 to move the discharging member 162 provided in the part supply unit 160 to the upper part of the mixing container 161 seated on the seat portion 300 (S610). This process may be performed by the second conveying unit 802, and the second conveying unit 802 may maintain the state of continuously gripping the discharging member 162 after moving the discharging member 162 to the predetermined position. Here, the kind of cosmetic may be transmitted to the control unit 900 from the user interface unit 130 or the terminal 20.

Thereafter, the control unit 900 controls the conveying means 800 to couple the discharging member 162 to the mixing container 161 on the seat portion 300 (S620). The mixing container 161 and the discharging member 162 may be coupled to each other by screw coupling, that is, the mixing container 161 is fixed to the mixing container seat groove 302 of the seat portion 300, so that the conveying means 800 may achieve screw coupling by rotating the discharging member 162 after fitting the discharging member 162 to the upper end of the mixing container 161.

In this case, the discharging member 162 may include a straw 1622, a pumping part 1621, and a cap 1623, and the straw 1622 needs to enter the interior of the mixing container 161 before the screw coupling of the cap 1623 and the mixing container 161. However, since the straw 1622 is formed of a soft material and its shape or orientation is not constant, the first conveying unit 801 may support the straw 1622 in the coupling process, so that the straw can smoothly enter the inlet of the mixing container 161. Specifically, the second conveying unit 802 grips the cap 1623, and the first conveying unit 801 may be moved up and down while being in contact with the straw 1622, so that the straw 1622 can be aligned with an inlet portion 1611 of the mixing container 161 in the seating portion 300.

By completing the coupling of the mixing container 161 and the discharging member 162, the first container may be provided as a finished product, and the control unit 900 may control the conveying means 800 to move the assembled container on the seat portion 300 to the part supply unit 160 (S630). This may be performed by the second conveying unit 802. Such processes S610 to S630 may be understood as an assembly process of the first container.

Meanwhile, in S520, when it is determined that the kind of cosmetic to be manufactured is the second container, the control unit 900 controls the conveying means 800 to move the base container 164 in the part supply unit 160 to the assembly portion 500 (S710). This process may be performed by the second conveying unit 802.

And the control unit 900 may control the conveying means 800 to take the mixing container 161 from the seat portion 300, pour and discharge the mixed cosmetic materials into the interior of the base container 164 (S720). Discharging the cosmetic materials from the mixing container 161 may use a method in which they naturally fall by gravity by turning over the mixing container 161, and to this end, the conveying means 800 may perform an operation of tilting the mixing container 161 to a predetermined angle. In this case, the cosmetic materials inside the mixing container 161 may not be completely discharged, and thus the conveying means 800 may further perform a shaking operation after a predetermined period of time has elapsed after rotating the mixing container 161 at a preset angle, so that even a little more cosmetic material can be discharged due to inertia. Such process may be performed by the second conveying unit 802. For example, the mixing container 161 may rotate 150 degrees to 180 degrees, and when the mixing container 161 rotates 180 degrees, it may be understood as the inlet portion 1611 of the mixing container 161 facing the floor.

The control unit 900 may further control the conveying means 800 that has performed S720 to move the mixing container 161 which has discharged the cosmetic materials, to the recovery portion 112 to recover it.

And, the control unit 900 may control the conveying means 800 to grip the impregnating member 168 from the part supply unit 160 and insert it into the base container 164 in which the cosmetic materials are accommodated (S730). This process may be performed by the second conveying unit 802.

Thereafter, the control unit 900 may move the base container 164 in which the impregnating member 168 is accommodated to the moisture absorption unit 600 by the conveying means 800 (S740). This process may be performed by the first conveying unit 801.

In the moisture absorption unit 600, the base container 164 may be moved to a position corresponding to the moisture absorption tool 620 through the base container conveying unit 650, and a moisture absorption process may be performed by the moisture absorption tool 620 (S750).

The control unit 900 may control the conveying means 800 for the movement of the base container 164 and the operation of the moisture absorption tool 620, and specifically, the operation of moving the base container 164 by operating the base container conveying unit 650 may be performed by the first conveying unit 801, while providing a pressing force for moisture absorption through the moisture absorption tool 620 may be performed by the second conveying unit 802. That is, the moisture absorption process may be achieved by cooperation of the first conveying unit 801 and the second conveying unit 802. The moving structure of the base container conveying unit 650 may include a guide rail, a movable block, a locking lever, a stopper, and the like, similarly to the above-described mixing container conveying unit 250, and may operate substantially in the same manner. However, the movable block of the base container conveying unit 650 may further include a structure for operating in linkage with the moisture absorption tool 620. By this process, the cosmetic materials accommodated in the base container 164 may be sufficiently impregnated in the impregnating member 168.

When all the moisture absorption process in S750 is completed, the control unit 900 may control the conveying means 800 to move the base container 164 from the moisture absorption unit 600 to the assembly portion 500 again (S760). This process may be performed by the first conveying unit 801.

And, the control unit 900 may control the conveying means 800 to take out the cover container 166 from the part supply unit 160 and couple it to the base container 164 on the assembly portion 500 (S770). This process may also be performed by the first conveying unit 801.

By completing the coupling of the base container 164 and the cover container 166, the second container is completed as a finished product, and the control unit 900 may control the conveying means 800 to move the assembled container on the assembly portion 500 to the part supply unit 160 (S780). This may be performed by the second conveying unit 802. Such processes S710 to S780 may be understood as an assembly process of the second container.

Through the above process, the cosmetic manufacturing apparatus 10 and the control method of the cosmetic manufacturing apparatus 10 can provide the first container as a pump-type container or the second container as a compact container depending on the user's selection. However, the spirit of this disclosure is not limited thereto, and according to an embodiment, the cosmetic manufacturing apparatus 10 may be implemented and operated as providing only one cosmetic container among the first container and the second container. In this case, the components and the control method used for manufacturing the other kind of cosmetic in the above description may be omitted.

Meanwhile, FIG. 14 is a flowchart illustrating a method of controlling a cosmetic manufacturing apparatus depending on a cosmetic kind by summarizing FIGS. 12 and 13.

Referring to FIG. 14, the control method of the cosmetic manufacturing apparatus according to this disclosure may include collecting or calculating data on the kind of cosmetic selected by the user by the control unit 900, discharging at least one cosmetic material to the mixing container 161 by controlling the cosmetic supplying unit 200 and the conveying means 800 by the control unit 900, mixing the cosmetic materials accommodated in the mixing container 161 in the mixing unit 400 by controlling the mixing unit 400 and the conveying means 800 by the control unit 900, moving the mixing container 161 accommodating the mixed cosmetic materials therein to the part holding unit 50 using the conveying means 800 by controlling the conveying means 800 by the control unit 900, when the kind of cosmetic selected by the user and input to the control unit 900 is the first container, forming the first container by controlling the conveying means 800 by the control unit 900 to move the discharging member 162 in the part supply unit 160 to the upper part of the part holding unit 50, and assemble the discharging member 162 with the mixing container 161, when the kind of cosmetic selected input to the control unit 900 is the second container, forming the second container by controlling the conveying means 800 by the control unit 900 to move the base container 164, the impregnating member 168, and the cover container 166 in the part supply unit 160 to the part holding unit 50, and assemble them with each other, controlling the conveying means 800 by the control unit 900 to move the assembled first container or the second container to the part supply unit 160 and provide it to the user.

Hereinafter, the moisture absorption unit 600 described above will be described in more detail with reference to FIGS. 15 to 18 along with FIGS. 7 and 8.

The moisture absorption unit 600 may be provided to receive the base container 164 in which the cosmetic materials and the impregnating member 168 are accommodated, and to impregnate the impregnating member 168 with the cosmetic materials. That is, the moisture absorption unit 600 may help the cosmetic materials to be easily impregnated (absorbed) into the impregnating member 168 with the cosmetic materials put in the base container 164 seated on the assembly part 500, and the impregnating member 168 accommodated on the cosmetic materials. Accordingly, the moisture absorption unit 600 may include a moisture absorption tool 620 and a base container conveying unit 650.

The moisture absorption tool 620 may press the impregnating member 168 to a preset pressure to impregnate the cosmetic materials into the impregnating member 168. Additionally, the base container conveying unit 650 may be of a configuration provided to move the base container 164 accommodating the cosmetic materials and the impregnating member 168 therein to the position where the impregnation is performed by the moisture absorption tool 620.

Specifically, referring to FIG. 8, the moisture absorption tool 620 may include a static position holder 630 and a pressing unit 640, and may further include a weight 660.

The moisture absorption tool 620 may be provided at the lower part of the table 114 on which the seat portion 300 and the assembly part 500 are provided, and the static position holder 630 can be raised and lowered in the height direction in the lower part of the table 114. Here, the static position holder 630 may include a support 631, a holder 632, a holder lever 633, and a guider 634.

The support 631 may support or be connected to the holder 632, the holder lever 633, and the guider 634. The holder 632 may be installed on the support 631 and protrudes downward, and when the base container conveying unit 650 on which the base container 164 is seated is located below the holder, it is possible to maintain the static position state of the base container 164 by fixing the base container 164 so as not to move.

The holder lever 633 may be connected to the support 631 and configured to protrude to one side, so that any one conveying unit of the conveying means 800 (e.g., the first conveying unit 801) can move the support 631 by gripping and moving the holder lever up and down, left and right.

In addition, the guider 634 may be positioned between the lower surface of the table 114 and the bottom surface of the moisture absorption part 600, penetrate the support 631, and be formed to extend in the height direction so as to guide the support 631 ascending and descending in the height direction.

Accordingly, when the base container 164 is placed directly below the holder 632 in a state in which the support 631 is raised, the conveying means 800 holds the holder lever 633 and lowers the support 631 downward, so that the base container 164 is fixed by the holder 632 to maintain the static position.

Meanwhile, when the base container 164 is fixed in the static position without moving, the pressing unit 640 presses the impregnating member 168 accommodated in the base container 164 while ascending and descending within the static position holder 630, so that the cosmetic materials accommodated in the base container 164 can be easily absorbed to the impregnating member 168. Specifically, the pressing unit 640 may include a pressing cylinder 641, a pressing handle 642, and a pressing spring 643.

Referring to 16 and 18, the pressing cylinder 641 may be slid in an up and down direction inside the holder 632, and may press the impregnating member 168 accommodated in the base container 164 fixed in the static position by the holder 632.

A portion of the pressing handle 642 is inserted into the pressing cylinder 641 through the central portion of the pressing cylinder 641, while another portion is exposed to the outside of the upper part of the pressing cylinder 641 and protrudes so as to be pressed by the conveying means 800.

Additionally, in the case where the pressing spring 643 is elastically installed between the pressing cylinder 641 and the pressing handle 642, when the pressing handle 642 is pressed, the spring can elastically transmit the external force to the pressing cylinder 641. Therefore, for example, when the second conveying unit 802 of the conveying means 800 presses the pressing handle 642 once or more, the pressing cylinder 641 presses the impregnating member 168 with an appropriate elastic force, so that the cosmetic materials in the base container 164 can be impregnated into the impregnating member 168 without damaging the impregnating member 168.

In addition, referring to FIGS. 15 and 16, the weight 660 may be provided to maintain the static holder 630, when no external force is applied to the static holder 630, in a position where the static position holder 630 is raised as far as possible so that the base container 164 can easily enter the lower portion of the static holder.

Since the static holder 630 is a weight body having its weight, it may be descended downward by gravity when no other external force is applied thereto, and thus, there was inconvenience that the static holder 630 needs to be raised additionally in order for the base container conveying unit 650 on which the base container 164 is seated to enter under the static holder 630. When the base container conveying unit 650 on which the base container 164 is seated enters, the static holder 630 can be maintained in a raised state by using the weight 660 so as not to interfere with the base container conveying unit.

Specifically, the weight 660 may be connected to the static holder 630 via a connection line 661 so that a force in the opposite direction to gravity can act on the static holder 630. The connection line 661 may be a conventional wire, and a pulley mechanism (not shown) such as one or more pulleys may be used on the path of the connection line 661 so that the connection line 661 can be moved and change its directions smoothly.

In this regard, the weight 660 may be configured to be heavier than the weight of the static holder 630 so that, when an external force is not applied to the static holder 630 or is removed therefrom, the static holder 630 can be raised by the weight 660.

Accordingly, when the weight 660 is connected to the support 631 of the static holder 630, the static holder 630 can be maintained naturally in the raised state by the weight of the weight 660. Because the static holder 630 is raised by the weight 660, the base container conveying unit 650 with the base container 164 mounted thereon may easily enter such that the base container 164 is positioned under the holder portion 632.

When the base container 164 is positioned under the holder 632, the conveying means 800 can hold the holder lever 633 and press it downward so that the base container 164 can be fixed in the static position as the holder 632 moves downward. At this time, as the support 631 and the holder 632 are moved downward, the weight 660 may be raised upward by the external force applied from the conveying means 800.

Additionally, in the case where the impregnation of the impregnating member 168 is finished, when the conveying means 800 slightly lifts the holder lever 633 upward, the entire static position holder 630 can be easily lifted upward by the self weight of the weight 660, thereby reducing the external force provided to the conveying means 800 for raising the static holder 630.

Additionally, the base container conveying unit 650 may be provided to move the base container 164 accommodating the cosmetic materials and the impregnating member 168 therein to the position where the impregnation is performed by the moisture absorption tool 620. That is, the base container conveying unit 650 may move the base container 164 to a position under the holder 632 of the static holder 630. The base container conveying unit 650 may be moved up to the position under the static holder 630, and the base container 164 accommodating the cosmetic materials and the impregnating member 168 therein may be seated thereon.

Specifically, the base container conveying unit 650 may include a guide rail 651 for the base container, a movable block 652 for the base container, a locking lever 653 for the base container, and a stopper 654 for the base container.

The guide rail 651 for the base container may be provided to extend from the outside of the moisture absorption tool 620 to the lower side of the moisture absorption tool 620. The movable block 652 for the base container may be installed on the guide rail 651 for the base container, and moved along the guide rail 651 for the base container, and the base container 164 may be seated on one upper side.

Additionally, the locking lever 653 for the base container may be provided to move the movable block 652 for the base container, and formed to protrude outward from one side of the movable block 652 for the base container. Accordingly, the conveying means 800 can move the movable block 652 for the base container in a desired direction by holding the locking lever 653 for the base container.

In addition, the stopper 654 for the base container may extend along the guide rail 651 for the base container in parallel to the guide rail 651 for the base container while being spaced apart from the guide rail 651 for the base container by a predetermined distance. A plurality of locking grooves 654a may be formed in the stopper 654 for the base container so that one side of the locking lever 653 for the base container can be caught. When the locking lever 653 for the base container is caught in the locking groove 654a, the movement of the movable block 652 for the base container is constrained, so that the base container 164 can be prevented from moving freely during the moisture absorption process of the moisture absorption unit 600.

Hereinafter, the conveying means 800 will be described in more detail with reference to FIGS. 19 and 20 along with FIG. 9 described above.

Figure 19B:
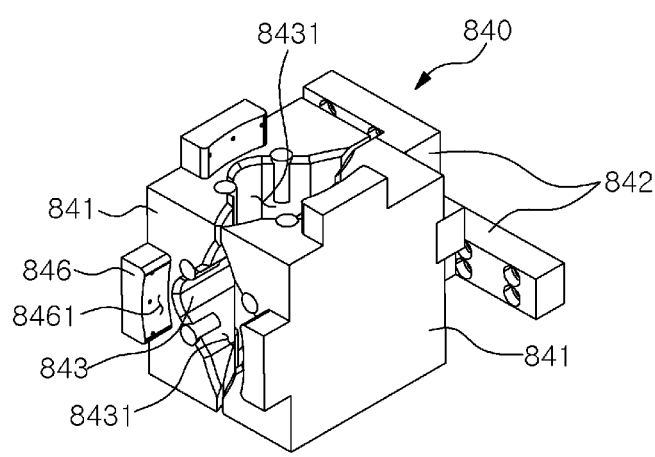
Figure 20A:
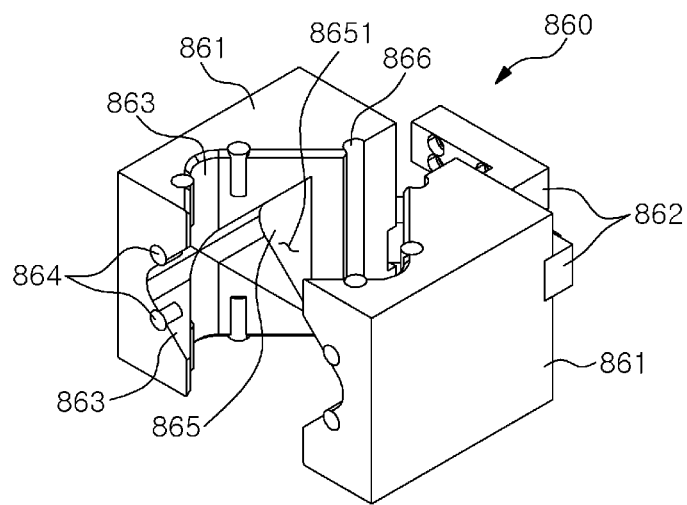
FIG. 20(a) and FIG. 20(b) are perspective views illustrating a second gripper of the conveying means of FIG. 9.
Figure 20B:
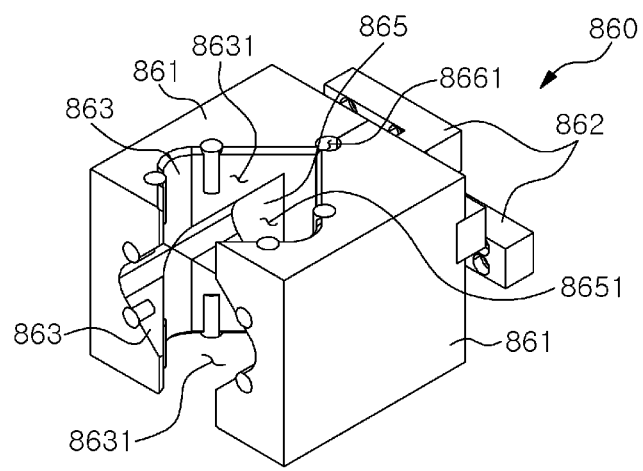

FIG. 19(a) and FIG. 19(b) are perspective views illustrating the first gripper 840 of the conveying means 800, and FIG. 20(a) and FIG. 20(b) are perspectives view illustrating the second gripper 860 of the conveying means 800. In this regard, FIG. 19(a) is a view showing the first gripper 840 when not holding a part, and FIG. 19(b) is a view showing the first gripper 840 when holding a part. Also, FIG. 20(a) is a view showing the second gripper 860 when not holding a part, and FIG. 20(b) is a view showing the second gripper 860 when holding a part.

Referring to FIGS. 9, 19 and 20, the conveying means 800 may move parts, and support and move the container main body so that the cosmetic material can be provided in the container main body. Further, a container main body in which the cosmetic material is provided, and a main body cover for protecting the container main body may be coupled to each other. In this regard, the container main body may include the mixing container 161 of the first container and the base container 164 of the second container, and the main body cover may include the discharging member 162 of the first container and the cover container 166 of the second container.

The conveying means 800 may be provided as a multi-articulated robot arm 810, and provided as a first conveying unit 801 extending from the robot arm control unit 820 to the other side (right side of FIGS. 4 and 9) and a second conveying unit 802 extending to one side (left side of FIGS. 4 and 9) from the robot arm control unit 820. Further, a first gripper 840 is provided to the first conveying unit 801, and a second gripper 860 is provided to the second conveying unit 802. In this case, the first conveying unit 801 and the second conveying unit 802 may be independently movable and perform different roles.

The first gripper 840 may selectively grip a part, and include a plurality of first grip bodies 841. Specifically, the first gripper 840 may include two first grip bodies 841, and the two first grip bodies 841 may be provided in the same shape. In this embodiment, an example in which the first gripper 840 grips and moves a part will be described. However, the spirit of this disclosure is not limited thereto, and the first gripper 840 may support and move a part in various forms such as suction besides the gripping method.

The first grip body 841 may be coupled to the first conveying unit 801 through a first coupler 842. In this case, the first grip body 841 and the first coupler 842 may be provided integrally, and the first coupler 842 and the first conveying unit 801 may be coupled to each other through a separate coupling means. For example, a plurality of through-holes (not marked) may be formed in the first coupler 842, and a coupling means such as a bolt may penetrate the through-hole of the first coupler 842, and then be coupled to the first conveying unit 801. However, the coupling method of the first coupler 842 and the first conveying unit 801 is not limited thereto, and the first coupler 842 and the first conveying unit 801 may be provided through various coupling methods. Alternatively, the first grip body 841 and the first coupler 842 may be provided as separate parts and coupled to each other.

The two first grip bodies 841 may be provided to face each other. In this case, the interval between the first grip bodies 841 may be adjusted according to the operation of the robot arm control unit 820. Specifically, before gripping a part, the first grip bodies 841 may be provided at a predetermined interval as shown in FIG. 19(*a*), while, in order to grip a part, the first grip bodies 841 may be provided in abutting form as shown in FIG. 19(*b*).

The outside of first grip bodies 841 may be formed in a flat shape except for surfaces facing each other. Specifically, when one side of the first grip body 841 provided on the left side based on the drawing is formed in a flat shape, another side of the first grip body 841 provided on the right side based on the drawing may be formed in a flat shape. Also, when the first coupler 842 is provided at one end of the first grip body 841, another end of the first grip body 841 may be formed in a flat shape.

Each of the first grip bodes 841 may have a first-first gripping groove 843 formed on surfaces facing each other. Specifically, when the other side of the first grip body 841 provided on the left based on the drawing and one side of the first grip body 841 provided on the right based on the drawing face each other, the first-first gripping groove 843 may be formed on each of the other side of the first grip body 841 provided on the left and one side of the first grip body 841 provided on the right side.

The first-first gripping groove 843 may be a groove formed on one side of the first grip body 841, and formed in a shape corresponding to the mixing container 161. Specifically, the first-first gripping groove 843 may be formed in the form of a groove that becomes deeper as it moves from the periphery to the center of the first grip body 841. That is, the groove may be deepest in the central side of the first grip body 841.

As shown in FIG. 19(*b*), when the robot arm control unit 820 is operated to bring portions of the first grip bodies 841 in contact with each other, a first-first gripping region 8431 may be formed by the first-first gripping grooves 843 formed in both of the first gripping bodies 841. The first-first gripping region 8431 may correspond to the mixing container 161 having a longitudinal cross-section with an edge. That is, when the mixing container 161 is provided in the first-first gripping region 8431, two opposite corners of the mixing container 161 may be provided between the two first gripping bodies 841, and the remaining two corners of the mixing container 161 may be provided in the deepest portions of the first-first gripping grooves 843.

A first pad 844 that is a friction pad may be provided on one side of the first grip body 841. One or more first pads 844 may be provided on each of the first grip bodies 841, and preferably, a plurality of first pads 844 may be provided on the outside of the first-first gripping groove 843 at certain intervals.

A plurality of first pads 844 may be provided to prevent friction between the mixing container 161 and the first grip body 841, and may be provided outside the first-first gripping groove 843. In this case, the first pad 844 may be provided as an elastic material, and in an example, the first pad 844 may be provided as a sponge. However, the material of the first pad 844 is not limited thereto, and various materials capable of preventing friction may be provided.

The first pad 844 may be provided to protrude from the outer surface of the first-first gripping groove 843. That is, the first pad 844 may be provided in a protruding from inside the first-first gripping region 8431.

When the first gripper 840 grips the mixing container 161 after the position of the first grip body 841 is adjusted such that a portion of the first grip body 841 abuts to that of another, the first pad 844 may directly contact the mixing container 161. Since the first pad 844 is provided in the first-first gripping region 8431, the risk that the mixing container 161 is damaged due to contact between the first grip body 841 and the mixing container 161 can be prevented.

A first-second gripping groove 845 may be formed at one side of the first-first gripping groove 843. Specifically, a first-second gripping groove 845 may be a groove formed in a portion of the first-first gripping groove 843, and be formed one for each first grip body 841. When the position of the first grip body 841 is adjusted such that a portion of the first grip body 841 abuts to that of another, a first-second gripping region 8451 may be formed in the first-first gripping region 8431 by two first-second gripping grooves 845. At this time, the first-second gripping region 8451 may correspond to the shape of the spherical lever, and, for example, may correspond to the shape of the locking lever 255 for a mixing container.

A fixing pin 846 may be provided on one side of the first grip body 841. The fixing pin 846 may be for gripping the part of the second container, and be formed in a shape protruding to the outside of the first grip body 841. In this case, the fixing pin 846 may be provided to each of all the first grip bodies 841. Preferably, the fixing pins 846 of the same shape may be provided to the first grip bodies 841 such that they face each other. In this embodiment, it is described by way of example that one fixing pin 846 is provided on one side of each first grip body 841, and one fixing pin 846 is provided on the lower surface of each first grip body 841, but the position of the fixing pin 846 and the number thereof are not limited thereto. For example, the fixing pin 846 may be provided only on the side surface of the first grip body 841 or only on the lower surface of the first grip body 841. In this case, the upper surface of the first grip body 841 means the surface on which the first coupler 842 is positioned, and the lower surface means the opposite surface to the upper surface, on which no first coupler 842 is located, and the side surface of the first grip body 841 means a surface thereof except for the upper surface and the lower surface.

One side of the fixing pin 846 may be formed to have a predetermined curvature. Specifically, a shape having a certain curvature may be formed on one surface of the fixing pin 846 facing that of another.

When the position of the first grip body 841 is adjusted such that one side of the first grip body 841 abuts that of another to grip the part, a predetermined distance may be maintained between the facing fixing pins 846. That is, a third gripping region 8461 may be formed between the fixing pins 846. As a shape having a predetermined curvature is formed on one surface of the fixing pin 846, the third gripping region 8461 can also be provided in a shape having a predetermined curvature. Accordingly, the third gripping region 8461 can grip the circular part.

The third gripping region 8461 may be formed in a size corresponding to the part of the second container, and specifically, the third gripping region 8461 may be formed to have a size corresponding to the base container 164, the cover container 166, and the impregnating member 168. Accordingly, the first gripper 840 can grip the base container 164, the cover container 166, and the impregnating member 168 through the third gripping region 8461.

The second conveying unit 802 may be provided with a second gripper 860. The second gripper 860 may selectively grip a part, and include a plurality of second grip bodies 861. Specifically, the second gripper 860 may include two second grip bodies 861, and the two second grip bodies 861 may be provided in the same shape. In this regard, the second gripper 860 may support and move a part in various ways as well as in the same manner as the first gripper 840.

The second grip body 861 may be coupled to the second conveying unit 802 through a second coupler 862. In this case, the second grip body 861 and the second coupler 862 may be provided integrally. In addition, the coupling method of the second conveying unit 802 and the second coupler 862 may be the same as the coupling method of the first conveying unit 801 and the first coupler 842, but since the spirit of this disclosure is not limited thereto, various methods of coupling the second conveying unit 802 with the second coupler 862 may be provided.

The two second grip bodies 861 may be provided to face each other. In this case, the interval between the second grip bodies 861 may be adjusted according to the operation of the robot arm control unit 820. Specifically, before gripping a part, the second grip bodies 861 may be provided at a predetermined interval as shown in FIG. 20(*a*), while, in order to grip a part, the second grip bodies 861 may be provided in abutting form as shown in FIG. 20(*b*).

The outside of second grip bodies 861 may be formed in a flat shape except for surfaces facing each other. Specifically, when one side of the second grip body 861 provided on the left side based on the drawing is formed in a flat shape, another side of the second grip body 861 provided on the right side based on the drawing may be formed in a flat shape. Also, when the second coupler 862 is provided at one end of the second grip body 861, another end of the second grip body 861 may be formed in a flat shape.

Each of the second grip bodes 861 may have a second-first gripping groove 863 formed on surfaces facing each other. Specifically, when the other side of the second grip body 861 provided on the left based on the drawing and one side of the second grip body 861 provided on the right based on the drawing face each other, the second-first gripping groove 863 may be formed on each of the other side of the second grip body 861 provided on the left and one side of the second grip body 861 provided on the right side.

The second-first gripping groove 863 may be a groove formed on one side of the second grip body 861, and formed in a shape corresponding to the mixing container 161. Specifically, the second-first gripping groove 863 may be provided in the same size and shape as the first-first gripping groove 843, and be formed in the form of a groove that becomes deeper as it moves from the periphery to the center of the second grip body 861. That is, the groove may be deepest in the central side of the second grip body 861.

As shown in FIG. 20(*b*), when the robot arm control unit 820 is operated to bring portions of the second grip bodies 861 in contact with each other, a second-first gripping region 8631 may be formed by the second-first gripping grooves 863 formed in both of the second gripping bodies 861. The second-first gripping region 8631 may correspond to the mixing container 161 having a longitudinal cross-section with an edge. That is, when the mixing container 161 is provided in the second-first gripping region 8631, two opposite corners of the mixing container 161 may be provided between the two second gripping bodies 861, and the remaining two corners of the mixing container 161 may be provided in the deepest portions of the second-first gripping grooves 863. The second-first gripping region 8631 of the second gripper 860 may be included in the first gripping regions 8431 and 8631 together with the first-first gripping region 8431 of the first gripper 840.

A second pad 864 that is a friction pad may be provided on one side of the second grip body 861. A plurality of second pads 864 may be provided to prevent friction between the mixing container 161 and the second grip body 861, and may be provided outside the second-first gripping groove 863. Further, the second pad 864 may be formed of the same material as the first pad 844, but the spirit of the disclosure is not limited thereto.

A second-second gripping groove 865 may be formed at one side of the second-first gripping groove 863. Specifically, a second-second gripping groove 865 may be a groove formed in a portion of the second-first gripping groove 863, and be formed one for each second grip body 861. When the position of the second grip body 861 is adjusted such that a portion of the second grip body 861 abuts to that of another, a second-second gripping region 8651 may be formed in the second-first gripping region 8631 by two second-second gripping grooves 865. At this time, the second-second gripping region 8651 may correspond to the shape of the spherical lever, and, for example, may correspond to the shape of the locking lever 255 for a mixing container or the locking lever 653 for the base container. The second-second gripping region 8651 of the second gripper 860 may be included in the second gripping regions 8451 and 8651 together with the first-second gripping region 8451 of the first gripper 840.

A second-third gripping groove 866 may be formed at one side of the second grip body 861. The second-third gripping groove 866 may be formed to have a semicircular cross-section, and be formed to have a size corresponding to the straw 1622 of the discharging member 162. Specifically, when a portion of the second grip body 861 is provided to abut that of another, the second-third gripping grooves 866 respectively formed in the two second gripping bodies 861 may be in contact with each other and have a circular cross-section. That is, the fourth gripping region 8661 may be formed through the second-third gripping grooves 866, and the fourth gripping region 8661 may correspond to the size and shape of the straw 1622.

The fourth gripping region 8661 may be formed to have a relatively smaller diameter than that of the second-first gripping region 8631 and the second-second gripping region 8651. Also, the fourth gripping region 8661 may be formed at a position that does not overlap the second-first gripping region 8631 and the second-second gripping region 8651. Preferably, the second-third gripping groove 866 may be formed in a position adjacent to the upper surface of the second grip body 861. Accordingly, the second-third gripping groove 866 may be positioned between the second-first gripping groove 863 and the upper surface of the second grip body 861. That is, the fourth gripping region 8661 may be formed at a position adjacent to the upper surface of the second grip body 861. Here, the upper surface of the second grip body 861 means a surface on which the second coupler 862 is located.

The fourth gripping region 8661 may be formed to have a larger diameter than that of the straw 1622 to grip the straw 1622. Thereby, the straw 1622 can be disposed inside the fourth gripping region 8661. Also, the fourth gripping region 8661 may be formed to have a smaller diameter than the inlet portion 1611 of the mixing container 161. Thereby, when the second gripper 860 is provided on the upper side of the mixing container 161, the fourth gripping region 8661 may be located on one side of the inlet portion 1611. That is, after the fourth gripping region 8661 is located on one side of the inlet portion 1611, the second gripper 860 may introduce the straw 1622 into the mixing container 161 through the inlet portion 1611. In other words, as the fourth gripping region 8661 for gripping the straw 1622 is formed in a size smaller than that of the inlet portion 1611 of the mixing container 161, the straw 1622 may be provided inside the inlet 1611 without leaving the inlet 1611. That is, the discharging member 162 may be accurately positioned on the upper side of the mixing container 161 with the straw 1622 inserted into the mixing container 161.

FIG. 21 is a diagram schematically illustrating a step of coupling a mixing container and a discharging member, which are some compartments of the cosmetic manufacturing apparatus of FIG. 1.

Referring to FIG. 21A, the mixing container 161 may be seated on the part holding unit 50. Specifically, the mixing container 161 may be moved from the mixing unit 400 to the part holding unit 50 after a plurality of cosmetic materials accommodated in the mixing container 161 are mixed in the mixing unit 400. In this case, the movement of the mixing container 161 from the mixing unit 400 to the part holding unit 50 may be performed by the second conveying unit 802. Specifically, the mixing container 161 may be moved to the part holding unit 50 while being gripped by the first-second gripping region 8451 of the second gripper 860. At this time, the mixing container 161 moved by the second gripper 860 may be seated on the seating portion 300 of the part holding unit 50, but the position where the mixing container 161 is seated is not limited to the seat portion 300.

The discharging member 162 may be moved upwardly of the mixing container 161 by the first conveying unit 801. Specifically, the first gripper 840 of the first conveying unit 801 may grip the discharging member 162 supplied to the part supply unit 160 to the upper side of the mixing container 161 seated on the seat portion 300. At this time, the discharging member 162 may be disposed at a predetermined distance above the mixing container 161, and at this position, the straw 1622 may also be positioned at a distance from the mixing container 161. Further, the second gripper 860 of the second conveying unit 802 may be provided at a position that does not overlap the mixing container 161 and the discharging member 162.

Referring to FIG. 21B, one end of the straw 1622 may be aligned by the second conveying unit 802. Specifically, the second gripper 860 of the second conveying unit 802 may be moved toward the discharging member 162 to guide the straw 1622 to its static position. Specifically, the straw 1622 may be supported by inserting the straw 1622 into the fourth gripping region 8661 of the second gripper 860, thereby guiding the straw 1622 to the static position. In this regard, the static position of the straw 1622 may be a position corresponding to the upper side of the inlet portion 1611 of the mixing container 161.

Referring to FIG. 21C, at least a portion of the straw 1622 may be inserted into the mixing container 161 by the first conveying unit 801. Specifically, when the straw 1622 is aligned by the second gripper 860, the discharging member 162 may be lowered by the first gripper 840 that grips the discharging member 162. That is, as the straw 1622 descends according to the movement of the discharging member 162, at least a portion of the straw 1622 may be inserted into the mixing container 161.

Referring to FIG. 21D, the position of the second conveying unit 802 may be moved such that interference does not occur between the second conveying unit 802 and the first conveying unit 801. Specifically, when a portion of the straw 1622 is inserted into the mixing container 161, the second gripper 860, which was guiding the insertion of the straw 1622, may stop guiding the straw 1622 and move to one side where the mixing container 161 is not located. That is, the discharging member 162 and the mixing container 161 may be provided such that they can be coupled.

Referring to FIG. 21E, the discharging member 162 and the mixing container 161 may be coupled to each other by the first conveying unit 801. Specifically, the first gripper 840 of the first conveying unit 801 may couple the discharging member 162 to the mixing container 161 while gripping the discharging member 162. At this time, the discharging member 162 may be rotated according to the rotation of the first gripper 840, and may be screw-coupled to the mixing container 161. That is, the mixing container 161 may be sealed by the discharging member 162.

Hereinafter, the use of the first gripper 840 and the second gripper 860 in the cosmetic manufacturing step will be described in detail.

First, the mixing container 161 stored in the part supply unit 160 may be moved to the cosmetic material supply unit 200 by the conveying means 800, and the cosmetic materials may be supplied into the mixing container 161 from the cosmetic material supply unit 200. can Specifically, in the case of accommodating the cosmetic material in the mixing container 161 from the cosmetic material supply unit 200 disposed on one side (the left side of FIG. 4) in the main body 100 (hereinafter referred to as a first case), the second conveying unit 802 may grip the mixing container 161 supplied in the part supply unit 160, and move the mixing container 161 directly to the mixing container conveying unit 250 disposed at one side in the main body 100.

Thereafter, the conveying means 800 may grip the locking lever 255 for a mixing container of the mixing container conveying unit 250 and move the mixing container 161 to under the discharging hole 232 of the cosmetic material supply unit 200. Thereby, the cosmetic materials can be stored in the mixing container 161. At this time, in the first case where cosmetic materials are supplied from the cosmetic material supply unit 200 disposed on one side of the main body 100, the second conveying unit 802 may move the mixing container 161 by operating the mixing container conveying unit 250 disposed on one side of the main body 100. Specifically, in the first case, the second gripper 860 of the second conveying unit 802 may grip and manipulate the locking lever 255 for a mixing container of the mixing container conveying unit 250 disposed on one side of the main body 100.

As another example, in the case of accommodating the cosmetic material in the mixing container 161 from the cosmetic material supply unit 200 disposed on another side (the right side of FIG. 4) of the main body 100, the second conveying unit 802 may grip the mixing container 161 supplied in the part supply unit 160, and seat the mixing container 161 on the seat portion 300. Thereafter, the first conveying unit 801 may grip the mixing container 161 seated on the seat portion 300, and move the mixing container 161 to the mixing container conveying unit 250 disposed on the other side of the main body 100.

In the second case where cosmetic materials are supplied from the cosmetic material supply unit 200 disposed on the other side of the main body 100, the first conveying unit 801 may move the mixing container 161 by operating the mixing container conveying unit 250 disposed on the other side of the main body 100.

Additionally, in the second case, the first gripper 840 of the first conveying unit 801 may grip and manipulate the locking lever 255 for a mixing container of the mixing container conveying unit 250 disposed on the other side of the main body 100. That is, the conveying unit 801 may grip the locking lever 255 for a mixing container of the mixing container conveying unit 250 disposed on the other side of the main body 100 and move the mixing container 161 to under the discharging hole 232 of the cosmetic material supply unit 200. Thereby, the cosmetic materials can be stored in the mixing container 161.

The mixing container 161 that is fed with the cosmetic materials from any one of the cosmetic material supply unit 200 disposed on one side of the body 100 and the cosmetic material supply unit 200 disposed on the other side of the body 100 through the above-described process may be conveyed to the mixing unit 400 by the conveying means 800.

At this time, in the first case, the first conveying unit 801 may transfer the mixing container 161 from the cosmetic material supply unit 200 to the mixing unit 400.

Additionally, in the second case, after the first conveying unit 801 seats the mixing container 161 on the seat portion 300, the second conveying unit 802 moves the mixing container 161 from the seat portion 300 to the mixing unit 400.

Meanwhile, after the mixing of the cosmetic materials accommodated in the mixing container 161 by the mixing unit 400 is completed, the mixing container 161 is moved from the mixing unit 400 to the seat portion 300 by the second conveying unit 802.

Hereinafter, after the cosmetic mixing is completed by the mixing unit 400, the steps for manufacturing the cosmetic of the first container and the steps for manufacturing the cosmetic of the second container will be separately described.

When the cosmetic manufacturing apparatus 10 manufactures a cosmetic of the first container, the first gripper 840 grips the discharging member 162 through the first-first gripping region 8431 and position it above the mixing container 161 seated on the seat portion 300. When the discharging member 162 is aligned with the upper side of the mixing container 161, the second gripper 860 may grip the straw 1622 of the discharging member 162 through the fourth gripping region 8661. In this case, the fourth gripping region 8661 is located above the inlet portion 1611 of the mixing container 161, and thereby, the straw 1622 may smoothly enter the inside of the mixing container 161. That is, the second gripper 860 may guide the entry of the straw 1622 into the inlet portion 1611 through the fourth gripping region 8661.

After the straw 1622 enters the mixing container 161, the position of the second gripper 860 may be adjusted to be spaced apart from the discharging member 162 by a predetermined distance, and the first gripper 840 may couple the discharging member 162 and the mixing container 161 to each other. That is, the second gripper 860 may be moved to a position where it does not interfere with the operation of coupling the discharging member 162 to the mixing container 161 by the first gripper 840. In this case, the first gripper 840 may grip and rotate the discharging member 162 with the first-first gripping region 8431. That is, the discharging member 162 and the mixing container 161 may be screw-coupled by the rotation of the first gripper 840. Thereby, the cosmetic of the first container can be completed.

When the discharging member 162 and the mixing container 161 are coupled, the second gripper 860 may grip and move the mixing container 161 via the second-first gripping region 8631, and seat the mixing container 161 in the groove 167 of the tray 165. That is, the second gripper 860 may seat the completed cosmetic of the first container in the groove 167.

Thereafter, the second conveying unit 802 may push the tray 165 to discharge the completed cosmetic container (the first container) seated in the groove 167 to the outside of the body 100.

Meanwhile, when the cosmetic manufacturing apparatus 10 manufactures a cosmetic of the second container, the first gripper 840 may grip the base container 164 through the third gripping region 8461, and move the base container 164 to the assembly portion 500.

The second gripper 860 may grip the mixing container 161 seated on the seat portion 300 through the second-first gripping region 8631, and move it to the upper side of the base container 164 seated on the assembly part 500, and then pour and discharge the cosmetic materials accommodated in the mixing container 161 into the base container 164. At this time, the second conveying unit 802 may perform a shaking motion of the mixing container 161 after a predetermined period of time has elapsed after rotating the mixing container 161 at a preset angle, so that more cosmetic material can be discharged due to inertia.

When the discharging of the cosmetic materials into the base container 164 is completed, the first gripper 840 may grip the mixing container 161 through the first-first gripping region 8431 and move it to the recovery portion 112.

The first gripper 840 may move the impregnating member 168 supplied to the part supply unit 160 via the third gripping region 8461, and insert it into the base container 164. In addition, the first gripper 840 may grip the base container 164 accommodating the impregnating member 168 therein via the third gripping region 8461, and move it to the moisture absorption unit 600.

The first gripper 840 may move the position of the base container 164 by manipulating the locking lever 653 for the base container via the second-first gripping region 8631. Also, the second gripper 860 may provide a pressing force to the moisture absorption tool 620 via the lower surface of the second grip body 861.

When the moisture absorption process is completed, the first gripper 840 may grip the base container 164 via the third gripping region 8461 and move it to the assembly portion 500. Thereafter, the first gripper 840 may grip the cover container 166 supplied to the part supply unit 160 via the third gripping region 8461 and couple it to the base container 164. Thereby, the cosmetic of the second container can be completed.

When the cosmetic manufacturing of the second container is completed through the coupling of the base container 164 and the cover container 166, the coupled base container 164 and the cover container 166 may be gripped and moved via the third gripping region 8461 of the first gripper 840 to be seated in the groove 167. That is, the first gripper 840 may seat the completed cosmetic of the second container in the groove 167.

Thereafter, the second conveying unit 802 may push the tray 165 to discharge the completed cosmetic container (the second container) seated in the groove 167 to the outside of the body 100.

Hereinafter, the control method for providing the sample described above will be discussed in more detail.

A user may request a sample through the user interface unit 130 or the terminal 20. Specifically, the user may first be provided with a sample before receiving the finished product, and may input such a request into the user interface unit 130 or the terminal 20.

When the manufacturing mode receiving unit 950 receives the user's request for a sample, the control unit 900 may analyze the skin condition of the user who requested the sample through the skin condition analysis unit 910. Specifically, the skin condition analysis unit 910 may receive the measured data from the terminal 20 and analyze the user's skin condition. Accordingly, the control unit 900 may analyze the skin condition at the time of the user's request for a sample and reflect it on the sample. Alternatively, the control unit 900 may analyze the skin condition through the skin condition analysis unit 910 after receiving the already-measured data from the terminal 20 in advance, and may reflect the result to the sample. In this case, the terminal 20 may include a known skin condition measuring means such as a camera, a moisture sensor, an oil sensor, and a color difference meter.

Although, in this embodiment, it is described by way of example that the composition ratio (first composition ratio, second composition ratio, fourth composition ratio) to be described later is calculated by the control unit 900 of the cosmetic manufacturing apparatus 10, the spirit of this disclosure is not limited thereto, and may include calculating the composition ratio in the terminal 20 and/or the operating server 40.

The control unit 900 may determine the cosmetic material composition ratio in the composition ratio determination unit 920 based on the result analyzed by the skin condition analysis unit 910. Alternatively, the control unit 900 may determine the cosmetic material composition ratio based on previously inputted skin condition information of the user. In this case, the composition ratio determined by the composition ratio determination unit 920 may be referred to as a first composition ratio.

Specifically, composition ratio data according to each skin condition may be stored in the control unit 900. For example, the control unit 900 may store composition ratio data indicating that composition ratio a may be applied in the case of skin condition A, composition ratio b may be applied in the case of skin condition B, and composition ratio c may be applied in the case of skin condition C. At this time, when the result of analysis through the skin condition analysis unit 910 or the previously inputted user's skin condition is close to skin condition A, the composition ratio determination unit 920 may determine a composition ratio a suitable for the skin condition A through the stored composition ratio data, and may determine a cosmetic supply amount suitable for the composition ratio a. That is, the control unit 900 may determine the composition ratio a stored in the database as the first composition ratio.

The control unit 900 may receive user information from the operating server 40, and calculate a second composition ratio obtained by modifying the first composition ratio using a preset algorithm based on the user information. In this case, the user information received by the control unit 900 may be the user's cosmetics purchase history, but the user information is not limited thereto.

Specifically, when the user has a lot of history of purchasing cosmetics of a color brighter than that of the cosmetic having the first composition ratio, a second composition ratio representing a color brighter than that of the first composition ratio may be calculated and proposed to the user. Contrarily, when the user has a lot of history of purchasing cosmetics of a color darker than that of the cosmetic having the first composition ratio, a second composition ratio representing a color darker than that of the first composition ratio may be calculated and proposed to the user. Accordingly, the composition ratio determination unit 920 may determine the first composition ratio or the second composition ratio as the composition ratio to be applied to the sample. When the composition ratio determination unit 920 determines the second composition ratio as the composition ratio, the user's taste can be reflected to further increase the user's satisfaction.

Although, in this embodiment, it is described by way of example that the calculation process of the above-described first composition ratio and second composition ratio is performed by the cosmetic manufacturing apparatus 10, the spirit of this disclosure is not limited thereto, and after the first composition ratio and the second composition ratio are calculated by the operating server 40, it may be transmitted to the cosmetic manufacturing apparatus 10, or displayed on the terminal 20 or the user interface unit 130.

The control unit 900 may determine the discharge amount of each cosmetic material through the composition ratio determined by the composition ratio determination unit 920. For example, when the sample is provided in an amount equivalent to one Nth (1/N) of that of the finished product, the control unit 900 may determine the supply amount of each cosmetic material in an amount of 1/N through the composition ratio determined by the composition ratio determination unit 920.

The control unit 900 may transmit the composition ratio determined by the composition ratio determination unit 920 to the user interface unit 130 or the terminal 20, and the user interface unit 130 or the terminal 20 may show the received composition ratio to the user.

The user may modify the informed first composition ratio or second composition ratio through the user interface unit 130 or the terminal 20. As an example, when the user wants to increase the moisture level in the informed first or second composition ratio, the user may request to increase the ratio of a cosmetic material associated with moisture, while, when the user wants to increase the viscosity in the informed first or second composition ratio, the user may request to increase the ratio of a cosmetic material associated with the viscosity. In this case, the user may directly input the modification into the user interface unit 130 or the terminal 20. Accordingly, the control unit 900 may receive the third composition ratio information modified from the first composition ratio or the second composition ratio by the user, and change the composition ratio information to the third composition ratio by applying a modification to one of the existing first and second composition ratios in the composition ratio modification unit 930. The composition ratio modification process through the composition ratio modification unit 930 may be omitted.

The cosmetic manufacturing apparatus 10 may manufacture a sample based on the composition ratio determined by the composition ratio determination unit 920 or modified by the composition ratio modifying unit 930. Specifically, the control unit 900 may control the conveying means 800 to provide the mixing container 161 to the cosmetic material supply unit 200, and through this, cosmetic materials may be provided to the mixing container 161 according to one of the first composition ratio, the second composition ratio, and the third composition ratio determined by the composition ratio determination unit 920 or the composition ratio modifying unit 930.

When the supply of the cosmetic materials to the mixing container 161 is completed, the control unit 900 may control the conveying means 800 again to provide the mixing container 161 to the groove 167 of the part supply unit 160. That is, a sample in which cosmetic is stored as much as one Nth of that of the finished product may be seated in the groove 167 of the tray 165, and provided to the user.

The user may directly use the sample received from the part supply unit 160, and may provide the used sample again to the groove 167 or the mixing container support unit 163a of the part supply unit 160. In this case, the control unit 900 may recover the sample after detecting whether or not the sample is provided, through a sensor provided in the tray 165 or the groove 167 or the mixing container support unit 163a. Alternatively, after providing the sample to the user, the tray 165 may be controlled after a preset period of time to recover the sample. In this case, the control unit 900 may notify the user of the recovering time through the user interface unit 130 or the terminal 20. When the sample after use is not provided to the tray 165 after a preset period of time, the control unit 900 may send a sample recovery signal to the user through a separate notification.

After using the sample, the user may input an additional request through the user interface unit 130 or the terminal 20. In this case, the user may select at least one of the plurality of modes. For example, the plurality of modes may include a finished product request mode, a sample modification request mode, and a sample discard request mode. In this case, a sample that has already been delivered to the user is referred to as a first sample, and a sample delivered to the user after the first sample is referred to as a second sample.

When the user inputs the finished product request mode through the user interface unit 130 or the terminal 20, the control unit 900 may receive the finished product request mode through the manufacturing mode receiving unit 950. That is, when the user inputs the finished product request mode after using the first sample, it may be understood as additional supply of cosmetic materials of the same composition ratio as the first sample.

Specifically, when the finished product request mode is received, the control unit 900 may control the conveying means 800 to move the mixing container 161 of the recovered first sample to the cosmetic material supply unit 200 again, and control the cosmetic material supply unit 200 to additionally supply the cosmetic materials to the mixing container 161. At this time, when the user does not consume all of the first sample, the mixing container 161 may be provided in which the cosmetic for sample is already stored. Therefore, the control unit 900 may adjust the supply amount of the cosmetic to be supplied to the mixing container 161 by subtracting the supply amount supplied during sample manufacture from the supply amount of the finished product. For example, if the cosmetic is stored as much as one Nth of the mixing container 161 when manufacturing the first sample, cosmetic may be supplied as much as (N−1)/N of the mixing container 161 when manufacturing the finished product. That is, when manufacturing the finished product, it is possible to prevent the cosmetic supply from exceeding the amount that can be stored in the mixing container 161.

Alternatively, after measuring the weight of the first sample provided to the cosmetic material supply unit 200, the control unit 900 may adjust the cosmetic supply amount when manufacturing the finished product. In this case, the control unit 900 may supply cosmetic materials to fill the mixing container 161, and provide a finished product to the user.

When the user inputs the sample modification request mode through the user interface unit 130 or the terminal 20, the control unit may receive the sample modification request mode for re-requesting a second sample having a composition ratio different from that of the first sample through the manufacturing mode receiving unit 950.

That is, if the user inputs the sample modification request mode after using the first sample, a cosmetic having a composition ratio different from that of the first sample may be manufactured and provided to the user as a second sample.

In this case, the second sample may be manufactured by adding a cosmetic material to the first sample containing the cosmetic, or by newly supplying the cosmetic materials again to the empty mixing container 161 from the beginning. In this embodiment, it is described by way of example that the second sample is manufactured by newly supplying cosmetic materials to the empty mixing container 161.

Specifically, the user may input composition ratio modification data through the user interface unit 130 or the terminal 20. In this case, the composition ratio of the existing first sample (one composition ratio among the first composition ratio, the second composition ratio, and the third composition ratio) may be displayed on the user interface unit 130 or the terminal 20, and the user may input a modification request from the first sample composition ratio to a desired composition ratio. That is, the user may input a fourth composition ratio obtained by adding modification to one of the first composition ratio, the second composition ratio, and the third composition ratio. For example, if the user wants a second sample having a higher viscosity than the first sample, the user may modify the composition ratio through the user interface unit 130 or the terminal 20 to increase the proportion of the cosmetic material for improving the viscosity.

The control unit 900 may receive the fourth composition ratio generated by the modification by the user, and determine whether or not such modification to the composition ratio is feasible.

If it is determined that the composition ratio can be modified, the control unit 900 may modify the composition ratio to the fourth composition ratio in the composition ratio modification unit 930. When the composition ratio modification unit 930 completes the modification of the composition ratio, the control unit 900 may control the conveying means 800 to place another mixing container 161 different from the mixing container 161 used for the first sample in the cosmetic material supply unit 200. At this time, the mixing container 161 used for the first sample will be referred to as a first mixing container, and a new mixing container 161 not used for the first sample will be referred to as a second mixing container. That is, when the composition ratio modification unit 930 completes the modification of the composition ratio, the control unit 900 may control the conveying means 800 to position the second mixing container, which is the empty mixing container 161, in the cosmetic material supply unit 200, and supply the cosmetic materials to the empty mixing container 161 according to the fourth composition ratio.

The above-described composition ratios may be stored in a product database. For example, 200 to 100,000 composition ratios may be stored in the product database, and a composition ratio may be selected from among them stored in the product database, and a cosmetic may be manufactured according to the selected composition ratio.

However, the spirit of this disclosure is not limited thereto, and the control unit 900 may place the first mixing container recovered by controlling the conveying unit 800 in the cosmetic material supply unit 200.

The cosmetic material supply unit 200 may supply cosmetic materials to the second mixing container of the mixing container 161 as much as supply amounts dependent on the fourth composition ratio under the control of the control unit 900.

The second sample according to the fourth composition ratio may be delivered to the groove 167 of the tray 165 again through the conveying means 800, and provided to the user. That is, the second sample that the user receives again may be provided with a cosmetic different from that of the first sample. Additionally, the second sample may be provided to the user again by a second mixing container different from the first mixing container in which the first sample is accommodated, or by the first mixing container to which the cosmetic materials are supplied again after its recovery.

The control unit 900 may determine that it is impossible to modify the composition ratio based on the composition ratio data received by the user. As an example, if a specific cosmetic material was input in the first sample provided to the user in order to have a low viscosity, and the composition ratio of the second sample requested by the user exclude the specific cosmetic material, the control unit 900 may determine that it is impossible to modify the composition ratio. That is, in the case where the first sample and the second sample are provided in the same mixing container 161, since the specific cosmetic material cannot be removed from the already manufactured first sample, the control unit 900 may determine that it is impossible to modify the composition ratio. Alternatively, in order to manufacture the second sample with the fourth composition ratio requested by the user, more cosmetic than the amount of cosmetic that the mixing container 161 can accommodate may be supplied. In this case, the control unit 900 may determine that it is impossible to modify the composition ratio. The case where it is impossible to modify the composition ratio described in this embodiment is an embodiment, and the spirit of this disclosure is not limited thereto.

When the user inputs the first sample discard request mode of through the user interface unit 130 or the terminal 20, the control unit 900 may receive the first sample discard request mode through the manufacturing mode receiving unit 950.

Upon receiving the first sample discard request mode, the control unit 900 may control the conveying means 800 to recover the recovered first sample to the recovery portion 112.

Hereinafter, the mixing unit 400 will be described in more detail with reference to FIGS. 4, 22 and 23.

The mixing unit 400 is configured to receive the mixing container 161 to which the cosmetic supply has been completed through the cosmetic material supply unit 200, and mix a plurality of cosmetic materials accommodated in the mixing container 161. Specifically, the mixing unit 400 may mix the cosmetic materials in the mixing container 161 through the revolution and rotation of the mixing container 161. In this regard, the mixing unit 400 may be disposed at the rear side of the part supply unit 160.

Specifically, the mixing unit 400 may include a mixing housing 410, a first rotating member 402, a second rotating member 404, and a rotation driving unit 430.

The mixing housing 410 may form the overall shape of the mixing unit 400, and have an accommodating space therein. That is, the mixing housing 410 may provide a space for mixing the cosmetic materials in the mixing container 161. At this time, at least one of the first rotating member 402, the second rotating member 404, and the rotation driving unit 430 may be accommodated in the inner accommodating space of the mixing housing 410. Although, in this embodiment, it is described by way of example that the first rotating member 402, the second rotating member 404, and the rotation driving unit 430 are all accommodated in the mixing housing 410, this does not limit the scope of this disclosure.

The first rotating member 402 may be capable of rotating the mixing container 161 delivered to the mixing unit 400, and have a mixing container insertion hole 406 into which the mixing container 161 can be inserted. In this regard, the first rotating member 402 may be rotated with the mixing container 161 inserted therein. Since the first rotating member 402 may rotate with the mixing container 161 inserted therein, the mixing container 161 may be rotated.

The second rotating member 404 may cause the mixing container 161 delivered to the mixing unit 400 to revolve, and may rotate the first rotating member 402. At this time, since the first rotating member 402 is disposed spaced apart from the center M of the second rotating member 404 by a predetermined distance, the mixing container 161 accommodated in the first rotating member 402 may be revolved by the rotation of the second rotating member 404.

Specifically, the second rotating member 404 may be rotated around the second central axis X2 penetrating the center M, and the mixing container 161 conveyed to the mixing unit 400 may be revolved by the rotation of the second rotating member 404. At this time, the second central axis X2 may be provided in the center of the second rotating member 404, and penetrate the center M while achieving a direction that intersects the ground. Specifically, the second central axis X2 may be perpendicular to the ground.

In addition, the first rotating member 402 may accommodate the mixing container 161 by having the mixing container insertion hole 406 as described above. Additionally, a portion of the first rotating member 402 may be disposed to be inserted into one side of the second rotating member 404. At this time, the first rotating member 402 may be inserted and fixed to the second rotating member 404 slantingly so that the longitudinal direction of the first rotating member 402 forms a predetermined angle with the ground. Here, the longitudinal direction of the first rotating member 402 may be a direction in which the mixing container 161 is inserted.

In this case, the first rotating member 402 may be disposed on the second rotating member 404 to be spaced apart from the second central axis X2 by a predetermined distance in the radial direction. As a result, as the second rotating member 404 is rotated around the second central axis X2, the mixing container 161 accommodated in the first rotating member 402 may be revolved.

Specifically, the first rotating member 402 may be rotated around a first central axis X1 different from the second central axis X2. In this regard, the first central axis X1 may be provided at the center of the first rotating member 402 along the longitudinal direction of the first rotating member 402. In this case, since the first rotating member 402 is disposed to be spaced apart from the second central axis X2 by a predetermined distance in the radial direction on the second rotating member (404), the first central axis X1 may be provided on the rotating body 420 to be spaced apart from the second central axis X2. In addition, since the first rotating member 402 is inserted into the second rotating member 404 slantingly so that its longitudinal direction forms a predetermined angle with the ground, the first central axis X1 may be provided in a direction intersecting the direction of the second central axis X2.

Meanwhile, the mixing container insertion hole 406 may be provided in a shape corresponding to the mixing container 161. Specifically, the mixing container 161 may be formed in a structure having a corner in its longitudinal section, and the mixing container insertion hole 406 may have a shape corresponding to the above-described mixing container 161. In the process of inserting the mixing container 161 into the mixing container insertion hole 406 by the conveying means 800, the conveying means 800 may perform a process of changing the direction of the mixing container 161 to a preset direction before seating the mixing container 161, in order for a mixing container 161 to be accurately fitted into the mixing container insertion hole 406.

The rotation driving unit 430 may rotate one or more of the first rotating member 402 and the second rotating member 404. For example, the rotation driving unit 430 may be a motor. Although, in this embodiment, it is described by way of example that the first driving unit 432 for rotating the first rotating member 402 and the second driving unit 434 for rotating the second rotating member 404 are separately provided, this does not limit the spirit of the disclosure. As another example, the first rotating member 402 and the second rotating member 404 may be simultaneously rotated by one rotation driving unit 430.

Meanwhile, the control unit 900 may control the operation of the mixing unit 400.

First, the control unit 900 may rotate the first rotating member 402 and the second rotating member 404 at the same time for a preset period of time. Thereby, the mixing container 161 inserted into the mixing container insertion hole 406 may be rotated while being revolved at the same time. In this case, the period of time for which the first rotating member 402 and the second rotating member 404 are rotated may be variable depending on the total amount and kinds of cosmetic materials.

After the rotation of the first rotating member 402 and the second rotating member 404 is completed, the control unit 900 may control the mixing unit 400 to stop the mixing container insertion hole 406 at a preset position. Since the mixing container insertion hole 406 is stopped to be positioned at a preset position after its rotation by the control unit 900, the operation of taking out the mixing container 161 from the mixing container insertion hole 406 by the conveying means 800 can always be performed at a preset position after the mixing process by rotation is completed. Additionally, after the mixing container 161 is withdrawn, the conveying means 800 may insert the next mixing container 161, in which the mixing process is to be performed, at a predetermined position. That is, the operation of inserting the mixing container 161 into the first rotating member 402 or withdrawing the mixing container 161 from the first rotating member 402 can always be performed at a preset position by the conveying means 800. Thereby, there is an advantage that it is possible to facilitate the control of the conveying means 800. Specifically, there is no need that the conveying means 800 should perform a control process of detecting the position of the mixing container insertion hole 406 and moving the mixing container 161 suitably to the detected location of the mixing container insertion hole 406 in order to grip the mixing container 161 supplied with the cosmetic materials through the cosmetic supply means 220 and insert it into the mixing container insertion hole 406.

Meanwhile, the preset position at which the mixing container insertion hole 406 stops after rotation of the first rotating member 402 and the second rotating member 404 may be a position closest to the seat portion 300. Specifically, the preset position at which the mixing container insertion hole 406 stops may be a direction spaced apart from the center M of the mixing unit 400 in the y-axis direction with reference to FIG. 3. Accordingly, when the multi-articulated robot arm 810 of the conveying means 800 moves the mixing container 161 to the seat portion 300, a subsequent process position, after the mixing process in the mixing unit 400 is completed, the moving distance can be shortened, and thus the driving radius of the multi-articulated robot arm 810 can be reduced. Accordingly, it is possible to efficiently drive the multi-articulated robot arm 810 and to reduce the time required for the process.

FIG. 24 is a perspective view illustrating a cosmetic manufacturing apparatus according to another embodiment of this disclosure, and FIG. 25 is a perspective view illustrating a part supply unit of the cosmetic manufacturing apparatus of FIG. 24.

Hereinafter, a cosmetic manufacturing apparatus 10' according to another embodiment of this disclosure will be described with reference to FIGS. 24 and 25. However, since the cosmetic manufacturing apparatus 10' shown in FIGS. 24 and 25 is different from the cosmetic manufacturing apparatus shown in FIG. 2 in that the position of the parts supply unit 160' is changed, and a serving unit 700 is further provided, differences will be mainly described, and for the same parts, descriptions and reference numerals of the embodiments described with reference to FIGS. 1 to 13 will be cited.

Cosmetic manufacturing apparatus 10' according to another embodiment of this disclosure, like the cosmetic manufacturing apparatus described in FIGS. 1 to 13, may include a cosmetic storage unit 140', a cosmetic material supply unit 200', a seat portion 300', a mixing unit 400', and an assembly portion 500', a moisture absorption unit 600', a conveying means 800', and a control unit. In this embodiment, the seat portion 300', the mixing unit 400', and the serving unit 700 may be understood as being included in the part holding unit.

When describing the arrangement of the detailed configuration of the cosmetic manufacturing apparatus 10' according to another embodiment of this disclosure, the cosmetic material supply unit 200' may be disposed on one side of the main body 100'; the part supply unit 160' may be disposed on another side of the main body 100' opposite to the cosmetic material supply unit 200'; and the part holding unit (the seat portion 300', the assembly portion 500', and the serving unit 700)) may be disposed between the cosmetic material supply unit 200' and the part supply unit 160'.

The part supply unit 160' may include a tray 169' on which a mixing container 161', a discharging member 162', a base container 164', a cover container 166', and an impregnating member 168' are disposed. Here, the tray 169' of the part supply unit 160' in contact with the mixing container 161' and the components may be disposed to be inclined at a preset angle with the base 110' forming the bottom surface of the cosmetic manufacturing space, wherein the preset angle may be 30 degrees to 80 degrees, preferably 45 degrees to 60 degrees.

Since the tray 169' of the part supply unit 160' is designed to have the preset angle like this, the conveying means 800' can be moved along an optimized path when gripping the components stored in the part supply unit 160'.

Further, the inclined surface of the part supply unit 160' may be formed such that the distance from the conveying means 800' becomes longer as it moves toward the upper end, and thus it is possible to ensure that the parts are stably supported on the inclined surface.

Respective parts may be arranged side by side in a direction parallel to or away from the base 110', and one or more of these arrangements may be provided depending on the embodiment. Although, in this embodiment, it is described by way of example that respective parts are arranged in one row parallel to the base 110', the spirit of this disclosure is not limited thereto. In this case, the mixing container 161', which can be used for manufacturing both the first container and the second container, may be disposed closest to the conveying means 800'. For example, the mixing container 161' may be provided in the lowest row of the part supply unit 160'.

Additionally, the parts for constituting one container may be disposed adjacent to each other. For example, from the lower side of the part supply unit 160', the mixing container 161' and the discharging member 162' constituting the first container may be sequentially arranged, and then, the base container 164', the impregnating member 168', and the cover container 166' constituting the second container may be sequentially disposed.

Further, the part holding unit of this embodiment may include the serving unit 700 capable of discharging the mixing container 161' in which the cosmetic materials are stored, or the cosmetic container which is completed by coupling the components, to the outside of the body 100'.

In this case, a door (not shown) through which the cosmetic container can be discharged to the outside of the main body 100' may be provided on a side in front of the serving unit 700.

The serving unit 700 may discharge the mixing container 161' in which the cosmetic materials are stored to the outside of the main body 100' (sample discharge), or discharge the cosmetic container completed by coupling the parts on the assembly portion 500' to the outside of the main body 100' so as to provide it to a user. The serving unit 700 may be disposed between the seat portion 300' and the assembly portion 500' to minimize the movement distance of a part and the operation distance of a robot arm provided as the conveying means 800'.

In addition, at least a portion of the serving unit 700 may be able to reciprocate between the inside and the outside of the main body 100'. Specifically, when the conveying means 800' grips the completed cosmetic container (the first container or the second container) and places it on the serving unit 700, the serving unit 700 may be discharged to the outside of the main body 100', so that the cosmetic container can be provided to the user. Here, the conveying means 800' may push or pull the serving unit 700, or according to another embodiment, a separate driving device for driving the serving unit 700 may be provided.

In addition, as described above, the cosmetic material supply unit 200' is disposed on one side of the main body, the part supply unit 160' is disposed on the other side of the main body, and the part holding unit is disposed between the cosmetic material supply unit 200' and the part supply unit 160', and thereby, the movement path of the conveying means 800' may be changed. Here, the movement of the conveying means 800' may be understood as being controlled by the control unit.

Specifically, the first conveying unit 801' may move the mixing container 161' provided in the part supply unit 160' to one side (e.g., the seat portion 300' formed on the table 114'), and the second conveying unit 802' may move the mixing container 161' moved to one side (e.g., the seat portion 300') toward the cosmetic material supply unit 200'.

Thereafter, the second conveying unit 802' may move the mixing container 161' in the cosmetic material supply unit 200' to the mixing unit 400'. Then, the mixing unit 400' may rotate to mix the cosmetic materials accommodated in the mixing container 161', and the second conveying unit 802' may move the mixing container 161' in the mixing unit 400' to the seat portion 300'. After that, the second conveying unit 802' takes out the components constituting the first container or the second container in the part supply unit 160', the first container or the second container may be assembled by the operation of the first conveying unit 801' and the second conveying unit 802'. The assembly of the first container and the second container is the same as the above-described embodiment, and a detailed description thereof will be omitted.

After the first container or the second container is assembled, the first conveying unit 801' or the second conveying unit 802' may seat the assembled first or second container on the serving unit 700, and then provide it to the user.

The following is a list of the above-described embodiments.

Item 1 may provide a cosmetic manufacturing apparatus comprising: a main body (100) providing a cosmetic manufacturing space (102); a part supply unit (160) providing at least one of a mixing container (161) for accommodating cosmetic materials, and a component which constitute a cosmetic container; a cosmetic material supply unit (200) discharging one or more cosmetic materials stored in a cosmetic material storage unit (140) to the mixing container (161); a conveying means (800) for moving at least one of the mixing container (161) and the component constituting the cosmetic container which have been provided to the part supply unit (160); and a control unit (900) controlling at least one of the cosmetic material supply unit (200) and the conveying means (800), such that one or more cosmetic materials stored in the cosmetic material storage unit (140) can be mixed and accommodated in at least one of the mixing container (161) and the component constituting the cosmetic container.

Item 2 may provide the cosmetic manufacturing apparatus (10) of item 1, further comprising: a mixing unit (400) rotatably provided to mix cosmetic materials accommodated in the mixing container (161).

Item 3 may provide the cosmetic manufacturing apparatus of items 1 and 2, wherein the conveying means (800) includes a plurality of conveying units (801, 802) that move the component provided in the part supply unit (160) to the part holding unit (50), and assemble the component moved to the part holding unit (50) into a first container to be provided as a pump-type container, or into a second container to be provided as a compact type container.

Item 4 may provide the cosmetic manufacturing apparatus of items 1 to 3, wherein the conveying means (800) includes a first conveying unit (801) and a second conveying unit (802) that are movable independently of each other, and wherein when assembling the first container to form a pump-type container, one of the first conveying unit (801) and the second conveying unit (802) grips a cap (1623) of a discharging member (162), and the other is moved up and down while being in contact with a straw (1622), such that the straw (1622) of the discharging member (162) is aligned with an inlet portion 1611 of the mixing container (161) in the part holding unit (50), and when assembling the second container to form a compact container, one of the first conveying unit (801) and the second conveying unit (802) seats the base container (164) constituting the second container on the part holding unit (50), and the other turns over the mixing container (161), such that the cosmetic materials accommodated in the mixing container (161) can be moved to the base container (164).

Item 5 may provide the cosmetic manufacturing apparatus of items 1 to 4, further comprising: a part holding unit (50) on which the mixing container (161) and the component in the part supply unit (160) are moved and seated, wherein the part holding unit (50) includes a seat portion (300) providing a space in which the first container to be provided as a pump-type container can be assembled; and an assembly portion (500) providing a space in which the second container to be provided as a compact container can be assembled.

Item 6 may provide the cosmetic manufacturing apparatus of items 1 to 5, wherein the component in the part supply unit (160) includes a discharging member (162) provided as a part of the first container, and wherein the conveying means 800 moves the mixing container (161) in the part supply unit 160 to the cosmetic material supply unit (200) so that the mixing container (161) provided as an empty container from the part supply unit (160) receives cosmetic materials; moves the mixing container (161) in the cosmetic material supply unit (200) to the mixing unit (400) where the cosmetic materials accommodated in the mixing container (161) is mixed; moves the mixing container (161) in the mixing unit (400) to the part holding unit (50) so as to provide the mixing container (161) as a part of the first container; and moves the discharging member (162) in the part supply unit (160) to above the mixing container (161) in the part holding unit (50), and couples the discharging member (162) with the mixing container (161).

Item 7 may provide the cosmetic manufacturing apparatus of items 1 to 6, wherein the component in the part supply unit (160) includes an impregnating member (168), a base container (164) for accommodating the impregnating member (168), and a cover container (166) for covering the impregnating member (168), which are provided as parts of the second container; and wherein the conveying means 800 moves the mixing container (161) in the part supply unit 160 to the cosmetic material supply unit (200) so that the mixing container (161) provided as an empty container from the part supply unit (160) receives cosmetic materials; moves the mixing container (161) in the cosmetic material supply unit (200) to the mixing unit (400) where the cosmetic materials accommodated in the mixing container (161) is mixed; moves the base container (164) in the part supply unit (160) to the part holding unit (50); tilts the mixing container (161) storing the cosmetic materials above the top of the base container (164) so that the base container (164) in the part holding unit (50) receives the cosmetic materials.

Item 8 may provide the cosmetic manufacturing apparatus of items 1 to 7, wherein the cosmetic material supply unit 200 includes a cosmetic supply means (220) for discharging a predetermined amount of cosmetic material stored in a cartridge (142); a plurality of discharging holes (232) through which cosmetic materials conveyed from the cosmetic material supply unit (220) are discharged; and a mixing container conveying unit (250) that fixes the mixing container (161) to accommodate the cosmetic materials discharged from the plurality of discharging holes (232) into the mixing container (161), and is movable under the discharging holes (232).

Item 9 may provide the cosmetic manufacturing apparatus of items 1 to 8, wherein the mixing unit 400 includes a first rotating member (402) into which the mixing container (161) can be inserted, and which is rotatable; and a second rotating member (404) for rotating the first rotating member (402), and wherein the first rotating member (402) is spaced apart from the center (M) of the second rotating member (404) by a predetermined distance.

Item 10 may provide the cosmetic manufacturing apparatus of items 1 to 9, wherein the control unit (900) controls such that the first rotating member (402) into which the mixing container (161) is inserted may be stopped at a preset position.

Item 11 may provide the cosmetic manufacturing apparatus of items 1 to 10, wherein the component includes the base container 164 and the impregnating member 168 which are provided as parts of the second container, and wherein the cosmetic manufacturing apparatus further comprises a moisture absorption tool (600) for impregnating the impregnating member (168) with the cosmetic materials accommodated in the base container (164).

Item 12 may provide the cosmetic manufacturing apparatus of items 1 to 11, wherein the table (114) is provided on one side of the conveying means (800), the moisture absorption unit (600) is provided under the table (114), and the part holding unit (50) on which at least one of the mixing container (161) and the component can be seated is disposed on the top of the table (114).

Item 13 may provide the cosmetic manufacturing apparatus of items 1 to 12, wherein the part supply unit (160) includes a tray (165) on which the component can be placed; a first container component support (163) for supporting the mixing container (161) and the discharging member (162), which are provided as parts of the first container; and a second container component support (169) for supporting the base container (164), the impregnating member (168), and the cover container (166), which are provided as parts of the second container.

Item 14 may provide a control method of a cosmetic manufacturing apparatus of Items 1 to 13, the control method comprising: calculating data on a cosmetic to be manufactured including the composition ratio by the control unit (900); discharging the cosmetic materials stored in the cosmetic storage unit (140) to the mixing container (161) according to the composition ratio by controlling the cosmetic material supply unit (200) and the conveying means (800) by the control unit (900); mixing the cosmetic materials discharged into the mixing container (161) by controlling the mixing unit (400) and the conveying means (800) by the control unit (900); and storing the cosmetic materials accommodated in the mixing container (161) in at least one of the first container provided as a pump-type container and the second container provided as a compact container and proving it to a user, by controlling the conveying means (800) by the control unit (900).

Item 15 may provide a control method of a cosmetic manufacturing apparatus of Items 1 to 14, further comprising: after the mixing the cosmetic materials discharged to the mixing container (161), providing the mixing container (161) to the user when the control unit (900) determines that the cosmetic materials accommodated in the mixing container (161) is a sample, and receiving an input from the user as to whether or not to change the composition ratio.

Item 16 may provide a control method of a cosmetic manufacturing apparatus of Items 1 to 15, wherein the discharging the cosmetic materials stored in the cosmetic storage unit (140) to the mixing container (161) according to the composition ratio (S20) by controlling the cosmetic material supply unit (200) and the conveying means (800) by the control unit (900) includes moving the mixing container (161) in the part supply unit (160) toward the cosmetic material supply unit (200) by controlling the conveying means (800) by the control unit (900) (S210); and supplying the cosmetic material to the mixing container (161) according to the composition ratio by controlling the cosmetic material supply unit (200) and the conveying means (800) by the control unit (900) (S220).

Item 17 may provide a control method of a cosmetic manufacturing apparatus of Items 1 to 16, wherein the mixing the cosmetic materials discharged into the mixing container (161) by controlling the mixing unit (400) and the conveying means (800) by the control unit (900) includes moving the mixing container (161) in the cosmetic material supply unit (200) to the mixing unit (400) by controlling the conveying means (800) by the control unit (900); and rotating and revolving the mixing container (161) so as to mix the cosmetic materials stored in the mixing container (161) by controlling the mixing unit (400) by the control unit (900).

Item 18 may provide a control method of a cosmetic manufacturing apparatus of Items 1 to 17, wherein storing the cosmetic materials accommodated in the mixing container (161) in at least one of the first container provided as a pump-type container and the second container provided as a compact container and providing it to the user by controlling the conveying means (800) by the control unit (900) includes: moving the mixing container (161) accommodating the mixed cosmetic material to the part holding unit (50) by controlling the conveying means (800) by the control unit (900); when the kind of cosmetic input to the control unit (900) is the first container, forming the first container by controlling the conveying means (800) by the control unit (900) to move the discharging member (162) in the part supply unit (160) to the upper part of the part holding unit (50), and assemble the discharging member (162) with the mixing container (161); when the kind of cosmetic selected input to the control unit (900) is the second container, forming the second container by controlling the conveying means (800) by the control unit (900) to move the base container (164), the impregnating member (168), and the cover container (166) in the part supply unit (160) to the part holding unit (50), and assemble the base container (164), the impregnating member (168), and the cover container (166) with one other; and moving the assembled first container or the second container to the part supply unit (160) and providing it to the user by controlling the conveying means (800) by the control unit (900).

Item 19 may provide a cosmetic manufacturing system comprising: a terminal (20) for receiving information about a user context and measuring user's skin condition; an operating server (40) for collecting or processing data from the terminal (20) and transmitting it to a cosmetic manufacturing apparatus (10); and the cosmetic manufacturing apparatus (10) of items 1 to 13 which receives a composition ratio from at least one of the terminal (20) and the operating server (40), or process information transmitted from at least one of the terminal (20) and the operating server (40) to calculate the composition ratio, and manufactures a cosmetic according to the calculated composition ratio.

Item 20 may provide a cosmetic manufacturing apparatus comprising a moisture absorption unit for impregnating a impregnating member with a cosmetic material, wherein the moisture absorption unit includes a base container conveying unit that receives a base container in which the impregnating member is accommodated, and is movably provided; and a moisture absorption tool for pressing the impregnating member seated on the base container conveying unit.

Item 21 may provide the cosmetic manufacturing apparatus of item 20, wherein the moisture absorption tool can press the impregnating member with a preset pressure, and the base container conveying unit can move the base container to a position where the impregnation by the moisture absorption tool is performed.

Item 22 may provide the cosmetic manufacturing apparatus of items 20 and 21, wherein the moisture absorption tool includes a static position holder which can be raised and lowered, and maintains the static position state of the base container; and a pressing unit which can be raised or lowered in the static position holder and presses the impregnating member.

Item 23 may provide the cosmetic manufacturing apparatus of items 20 to 22, wherein the moisture absorption tool further includes a weight which maintains the static position holder in a raised position to allow the base container to enter when no external force is applied to the static position holder.

Item 24 may provide the cosmetic manufacturing apparatus of items 20 to 23, wherein the static position holder includes a support; a holder which is installed on the support and maintains a static position such that the base container does not move when the base container conveying unit on which the base container is seated is located at the holder; a holder lever connected to the support and protruding to one side to move the support; and a guider penetrating the support and extending in the height direction to guide the support so that the support is raised and lowered in the height direction.

Item 25 may provide the cosmetic manufacturing apparatus of items 20 to 25, wherein the pressing unit includes a pressing cylinder which slides in an up and down direction inside the holder, and presses the impregnating member inside the base container fixed in a static position state by the holder; a pressing handle having a portion which is inserted into the pressing cylinder through the central portion of the pressing cylinder, and another portion which is exposed to the outside of the upper part of the pressing cylinder and protrudes so as to be pressed by the conveying means; and a pressing spring which is installed between the pressing cylinder and the pressing handle, and elastically transmit the external force to the pressing cylinder when the pressing handle is pressed.

Item 27 may provide the cosmetic manufacturing apparatus of items 20 to 26, wherein the weight is connected to the static holder via a connection line so that a force in the opposite direction to gravity can act on the static holder.

Item 28 may provide the cosmetic manufacturing apparatus of items 20 to 27, wherein the weight is heavier than the static holder so that the static holder is raised by the weight when an external force is removed from the static holder.

Item 29 may provide the cosmetic manufacturing apparatus of items 20 to 28, wherein the base container conveying unit includes a guide rail for a base container which extends from the outside of the moisture absorption tool to a lower position of the moisture absorption tool; a movable block for a base container which is provided on the guide rail for a base container, and moved along the guide rail for a base container, and on which the base container is seated on one side; a locking lever for the base container provided to move the movable block for the base container; and a stopper for a base container which extends along the guide rail for the base container in parallel to the guide rail for the base container, and has a locking groove by which one side of the locking lever for the base container is caught so as to restrict the movement of the movable block for the base container.

Item 30 may provide a control method of a cosmetic manufacturing apparatus for impregnating an impregnating member with a cosmetic material by using a moisture absorption unit, the method comprising: seating a base container in which the impregnating member is accommodated in the base container conveying unit by a conveying means; moving the base container seated on the base container conveying unit by the conveying means to under a moisture absorption tool; fixing the base container seated on the base container conveying unit by the conveying means with a static holder of the moisture absorption tool; and pressing the impregnating member accommodated in the base container by the conveying means at least once or more with a pressing unit of the moisture absorption tool.

Item 31 may provide the control method of a cosmetic manufacturing apparatus of item 30, further comprising: before the seating the base container in which the impregnating member is accommodated in the base container conveying unit, accommodating cosmetic materials in an empty mixing container by the conveying means; accommodating the cosmetic materials into the base container from the mixing container in which the cosmetic materials are accommodated by a conveying means; and accommodating the impregnating member in the base container in which the cosmetic materials are stored by the conveying means.

Item 31 may provide the control method of a cosmetic manufacturing apparatus of items 30 and 31, further comprising: after the pressing the impregnating member accommodated in the base container by the conveying means at least once or more with the pressing unit of the moisture absorption tool, moving the base container accommodating the impregnated member impregnated with the cosmetic materials by the conveying means to the assembly portion, and coupling the cover container to the base container; and moving the finished product container assembled by the conveying means from the assembly portion to a serving unit.

Item 33 may provide a control method of a cosmetic manufacturing apparatus, comprising a main body providing a cosmetic manufacturing space; a part supply unit providing at least one of a mixing container for accommodating cosmetic materials and a component constituting a cosmetic container; a cosmetic material supply unit for discharging one or more cosmetic materials to the mixing container; a moisture absorption unit for receiving a impregnating member and a base container in which cosmetic materials is accommodated, and impregnating the impregnating member with the cosmetic materials; a conveying means which grips and moves at least one of the mixing container and the component constituting the cosmetic container, and which can be moved to the part supply unit and the cosmetic material supply unit; and a control unit which receives different kinds of cosmetic information desired by a user through communication from a user interface unit or a terminal, and which controls at least one of the cosmetic material supply unit and the conveying means to manufacture cosmetics corresponding to the cosmetic information on the spot.

Item 34 may provide a cosmetic manufacturing method comprising: calculating data on the kind of cosmetic selected by a user by a control unit; discharging at least one cosmetic material to a mixing container by controlling a cosmetic supplying unit and a conveying means by the control unit; mixing cosmetic materials accommodated in the mixing container by controlling a mixing unit and a conveying means by the control unit; moving the mixing container accommodating the mixed cosmetic material to a part holding unit by controlling the conveying means by the control unit; when the kind of cosmetic input to the control unit is a first container, forming the first container by controlling the conveying means by the control unit to move a discharging member in the part supply unit to the upper part of the part holding unit, and assemble the discharging member with the mixing container; when the kind of cosmetic selected input to the control unit is a second container, forming the second container by controlling the conveying means by the control unit to move a base container, a impregnating member, and a cover container in the part supply unit to the part holding unit, and assemble the base container, the impregnating member, and the cover container with one other; moving the assembled first container or the second container to the part supply unit and providing it to the user, by controlling the conveying means by the control unit.

Item 35 may provide a cosmetic manufacturing apparatus comprising: a conveying means for supporting and moving a container main body that can store cosmetic materials, and a main body cover that can cover the container main body, wherein the conveying means seats the container main body, which can store cosmetic materials, on a part holding unit, closes the container main body seated on the part holding unit with the body cover.

Item 36 may provide the cosmetic manufacturing apparatus of item 35, wherein the conveying means includes a first conveying unit extending from a robot arm control unit to another side; and a second conveying unit extending from the robot arm control unit to one side, wherein the first conveying unit and the second conveying unit perform different roles.

Item 37 may provide the cosmetic manufacturing apparatus of items 35 and 36, wherein the first conveying unit includes a first gripper, and the second conveying unit includes a second gripper, and wherein the first gripper and the second gripper selectively grip one side of the part.

Item 38 may provide the cosmetic manufacturing apparatus of items 35 to 37, wherein the first gripper and the second gripper include a first gripping region which corresponds to the shape of the container main body of the first container, and selectively grips the container main body of the first container; and a second gripping region formed inside the first gripping region.

Item 39 may provide the cosmetic manufacturing apparatus of items 35 to 38, wherein the first gripper includes a third gripping region for selectively gripping a part of a second container having a shape different from that of the first container.

Item 40 may provide the cosmetic manufacturing apparatus of items 35 to 39, wherein the second gripper includes a fourth gripping region for guiding a straw of the discharging member of the first container.

Item 41 may provide the cosmetic manufacturing apparatus of items 35 to 40, wherein the fourth gripping region is formed to have a smaller diameter than the inlet portion of the first container, and is formed to have a larger diameter than the straw, and wherein after the position of the straw is aligned via the second gripper, the straw is inserted into the container main body of the first container via the first gripper.

Item 42 may provide the cosmetic manufacturing apparatus of items 35 to 41, wherein a friction pad is provided on and protrudes from one side of the first gripping region, and the friction pad is provided as a material having elasticity.

Item 43 may provide the cosmetic manufacturing apparatus of items 35 to 42, wherein the second gripping region selectively grips a spherical lever.

Item 43 may provide the cosmetic manufacturing apparatus of items 35 to 43, wherein the first conveying unit and the second conveying unit are provided as multi-articulated robot arms.

Item 45 may provide a control method of a cosmetic manufacturing apparatus for selectively supporting and conveying a part, the method comprising: seating a container main body, which stores cosmetic materials therein, on a part holding unit by a conveying means; moving a main body cover, which can be coupled to the container main body, to the part holding unit by the conveying means; and completing a cosmetic by coupling the main body cover to the container main body seated on the part holding unit, by the conveying means.

Item 46 may provide the control method of a cosmetic manufacturing apparatus of item 45, wherein the conveying means includes a first conveying unit and a second conveying unit that are movable independently of each other, and the body cover includes a discharging member provided with a straw, and wherein the completing the cosmetic by coupling the main body cover to the container main body seated on the part holding unit, by the conveying means includes: gripping and placing the discharging member on the upper side of the container main body by the first conveying unit; aligning one end of the straw with the upper side of the inlet portion of the container main body by the second conveying unit; lowering the discharging member and inserting at least a portion of the straw into the container main body by the first conveying unit; moving the second conveying unit to one side where the container main body is not present, so that the second conveying unit and the first conveying unit do not interfere with each other; and sealing the container main body by lowering the discharging member by the first conveying unit.

Item 47 may provide the control method of a cosmetic manufacturing apparatus of items 45 and 46, further comprising: before the seating the container main body, which stores cosmetic materials therein, on a part holding unit by the conveying means, storing the cosmetic materials in the container main body by moving the container main body supplied to a component supply part by the conveying means toward a cosmetic material supply unit.

Item 48 may provide the control method of a cosmetic manufacturing apparatus of items 45 to 47, further comprising: after the completing the cosmetic by coupling the main body cover to the container main body seated on the part holding unit, by the conveying means, moving the completed cosmetic to a groove by the conveying means.

Item 49 may provide a control method of a cosmetic manufacturing apparatus for selectively supporting and conveying a part, the method comprising: seating a container main body, which stores cosmetic materials therein, on a part holding unit by a conveying means; moving a base container having a shape different from that of the container main body toward the part holding unit by the conveying means; discharging the cosmetic materials stored in the container main body to the base container by the conveying means; accommodating an impregnating member into the base container in which the cosmetic materials are stored, by the conveying means; and coupling the cover container to the base container in which the impregnating member is accommodated, by the conveying means.

Item 50 may be a cosmetic manufacturing apparatus which provides a sample, the apparatus comprising: a conveying means for conveying a sample and a finished product; and a control unit for controlling the conveying means and receiving a sample receiving mode through a manufacturing mode receiving unit, wherein by controlling a cosmetic material discharge amount of the cosmetic material supply unit by the control unit, the sample is provided at the same composition ratio of cosmetic materials as that of the finished product, and in a smaller amount than the finished product.

Item 51 may be the cosmetic manufacturing apparatus of item 50, wherein the control unit further comprises a composition ratio modification unit for receiving modification composition ratio data.

Item 52 may be the cosmetic manufacturing apparatus of items 50 and 51, wherein the manufacturing mode receiving unit receives a plurality of modes, and wherein the plurality of modes includes a finished product request mode for requesting a finished product having the same composition ratio as an already-delivered first sample; a sample modification request mode for re-requesting a second sample having a composition ratio different from that of the first sample; and the discard request mode of the first sample.

Item 53 may be the cosmetic manufacturing apparatus of items 50 to 52, wherein when receiving the finished product request mode, the control unit controls the cosmetic material supply unit and the conveying means to provide the finished product of the same composition ratio as the first sample.

Item 54 may be the cosmetic manufacturing apparatus of items 50 to 53, wherein when receiving the sample request mode, the control unit controls the cosmetic material supply unit and the conveying means to provide a second sample of a composition ratio different from that of the first sample.

Item 55 may be the cosmetic manufacturing apparatus of items 50 to 54, further comprising a part supply unit which is movable in one direction, and discharges a sample and a finished product to the outside.

Item 56 may be a control method of a cosmetic manufacturing apparatus which provides a sample, the method comprising: receiving a sample receiving mode by a manufacturing mode receiving unit; manufacturing a sample in a smaller amount than a finished product at the composition ratio determined by the composition ratio determination unit; and providing the sample by a conveying means.

Item 57 may be a control method of a cosmetic manufacturing apparatus of item 56, wherein the providing the sample by the conveying means includes seating the sample on the part supply unit by controlling the conveying means by the control unit; and discharging to the outside of a main body by moving the part supply unit by controlling the conveying means by the control unit.

Item 58 may be a control method of a cosmetic manufacturing apparatus of items 56 and 57, further comprising: after the providing the sample by the conveying means, receiving an additional request by the manufacturing mode receiving unit; and recovering an already-provided first sample from among the samples.

Item 59 may be a control method of a cosmetic manufacturing apparatus of items 56 to 58, wherein the recovering the first sample includes: detecting the first sample seated in the part supply unit by the control unit; and recovering the first sample seated on the part supply unit to a recovery portion by controlling the conveying means by the control unit.

Item 60 may be a control method of a cosmetic manufacturing apparatus of items 56 to 59, further comprising: when the additional request is the finished product receiving mode, after the recovering the first sample, manufacturing a finished product by adding cosmetic materials having the same composition ratio as that of the first sample to the recovered first sample; and providing the finished product by the conveying means.

Item 61 may be a control method of a cosmetic manufacturing apparatus of items 56 to 60, further comprising: when the additional request is the sample modification request mode, after the recovering the first sample, receiving composition ratio data different from that of the first sample; and changing the composition ratio in the composition ratio modification unit through composition ratio data.

Item 62 may be a control method of a cosmetic manufacturing apparatus of items 56 to 61, further comprising: after the changing the composition ratio in the composition ratio modification unit through composition ratio data, manufacturing a second sample of the modified composition ratio; and providing the second sample by the conveying means.

Item 63 may be a control method of a cosmetic manufacturing apparatus of items 56 to 62, wherein the manufacturing the second sample of the modified composition ratio manufactures the second sample by adding cosmetic materials to the recovered first sample at a composition ratio different from that of the first sample.

Item 64 may be a control method of a cosmetic manufacturing apparatus of items 56 to 63, further comprising: after the changing the composition ratio in the composition ratio modification unit through composition ratio data, when it is impossible to manufacture a second sample of the modified composition ratio, outputting a second sample manufacturing impossibility notification; and discarding the recovered first sample.

Item 65 may be a control method of a cosmetic manufacturing apparatus of items 56 to 64, further comprising: when the additional request is in the first sample discard request mode, after the recovering the first sample, discarding the recovered first sample.

Item 66 may be a cosmetic manufacturing apparatus comprising: a second rotating member which rotates around a second central axis; a first rotating member which is provided on one side of the second rotating member, and includes a mixing container insertion hole into which a mixing container can be inserted; and a control unit which controls the rotation of the second rotating member so that the mixing container insertion hole is located at a preset position when being in a stopped state after the rotation of the second rotating member.

Item 67 may be the cosmetic manufacturing apparatus of item 66, wherein the first rotating member rotates around a first central axis different from the second central axis.

Item 68 may be the cosmetic manufacturing apparatus of items 66 and 67, wherein the mixing container inserted into the mixing container insertion hole is rotated by the rotation of the first rotating member, and the mixing container inserted into the mixing container insertion hole is revolved by the rotation of the second rotating member.

Item 69 may be the cosmetic manufacturing apparatus of items 66 to 68, wherein the second central axis may be perpendicular to the ground, and the first central axis is provided in a direction intersecting the second central axis.

Item 70 may be the cosmetic manufacturing apparatus of items 66 to 69, wherein the first rotating member is spaced apart from the second central axis in the radial direction on the second rotating member.

Item 71 may be the cosmetic manufacturing apparatus of items 66 and 70, wherein the mixing container insertion hole is provided in a shape corresponding to the mixing container.

Item 72 may be the cosmetic manufacturing apparatus of items 66 and 71, wherein, the mixing container is provided in a structure having a corner in its longitudinal section.

Item 73 may be a control method of a cosmetic manufacturing apparatus, the method comprising: receiving a mixing container containing a plurality of cosmetic materials, and inserting it into the mixing container insertion hole of the mixing unit, via a conveying means; rotating a second rotating member around a second central axis; controlling by the control unit such that the mixing container insertion hole stops at a preset position after the rotation of the second rotating member is completed; and transferring the mixing container in which the cosmetic material mixing has been completed to a subsequent process position via a conveying means.

Item 74 may be the control method of a cosmetic manufacturing apparatus of item 73, further comprising: before controlling by the control unit such that the mixing container insertion hole stops at a preset position, rotating the first rotating member around a first central axis different from the second central axis.

Item 75 may be the control method of a cosmetic manufacturing apparatus of item 74, wherein the rotating the second rotating member around the second central axis and the rotating the first rotating member around the first central axis are performed at the same time.

Item 76 may be the control method of a cosmetic manufacturing apparatus of items 73 to 75, further comprising: before the inserting the mixing container into the mixing container insert, converting the direction of the mixing container to a preset direction by the conveying means.

Item 77 may be the control method of a cosmetic manufacturing apparatus of items 73 to 76, further comprising: before the inserting the mixing container into the mixing container insertion hole, accommodating a plurality of cosmetic materials into an empty mixing container via a cosmetic material supply unit; gripping the mixing container in which the cosmetic material accommodation has been completed, by a conveying means; and transferring the mixing container to the mixing unit by the conveying means.

While until now the cosmetic manufacturing apparatus, the control method of a cosmetic manufacturing apparatus, and the cosmetic manufacturing system according to embodiments of this disclosure have been described as concrete embodiments, these are just exemplary embodiments, and this disclosure should be construed in a broadest scope based on the fundamental technical ideas disclosed herein, rather than being limited to them. By combining or replacing a part or parts of embodiments disclosed herein, the ordinary skilled in the art may carry out an embodiment which is not explicitly described herein, and however, it should be noted that it shall not depart from the scope of the disclosure. Besides, the ordinary skilled in the art may easily change or modify embodiments disclosed herein based on the disclosure, and however, it is obvious that such changes or modifications also fall within the scope of the disclosure.

REFERENCE SIGN LIST

1: cosmetic manufacturing system
10: cosmetic manufacturing apparatus
20: terminal
40: operating server
100: main body
140: cosmetic material storage unit
160: part supply unit
200: cosmetic material supply unit 300: seat portion
500: assembly portion
600: moisture absorption unit
800: conveying means
900: control unit

What is claimed is:

1. A cosmetic manufacturing apparatus comprising:
   a main body providing a cosmetic manufacturing space;
   a part supply unit providing at least one of a mixing container for accommodating cosmetic materials and a component constituting a cosmetic container;
   a cosmetic material supply unit for discharging one or more cosmetic materials stored in a cosmetic material storage unit to the mixing container;
   a conveying means for moving at least one of the mixing container and the component constituting the cosmetic container which have been provided to the part supply unit; and
   a control unit for controlling at least one of the cosmetic material supply unit and the conveying means so that the one or more cosmetic materials stored in the cosmetic material storage unit are mixed and accommodated into at least one of the mixing container and the component constituting the cosmetic container,
   wherein the component includes a base container and an impregnating member which are provided as parts of a second container, and
   wherein the cosmetic manufacturing apparatus further comprises a moisture absorption tool for impregnating the impregnating member with the cosmetic materials accommodated in the base container.

2. The cosmetic manufacturing apparatus of claim 1, further comprising a mixing unit rotatably provided to mix cosmetic materials accommodated in the mixing container.

3. The cosmetic manufacturing apparatus of claim 2, wherein the mixing unit includes:
   a first rotating member into which the mixing container can be inserted, and which is rotatable; and
   a second rotating member for rotating the first rotating member, and
   wherein the first rotating member is spaced apart from the center of the second rotating member by a predetermined distance.

4. The cosmetic manufacturing apparatus of claim 3, wherein the control unit controls such that the first rotating member into which the mixing container is inserted can be stopped at a preset position.

5. The cosmetic manufacturing apparatus of claim 1, wherein the conveying means includes a plurality of conveying units that move the component provided in the part supply unit to a part holding unit, and assemble the component moved to the part holding unit into a first container to be provided as a pump-type container, or into the second container to be provided as a compact type container.

6. The cosmetic manufacturing apparatus of claim 1, wherein the conveying means includes a first conveying unit and a second conveying unit that are movable independently of each other, wherein when assembling a first container to form a pump-type container, one of the first conveying unit and the second conveying unit grips a cap of a discharging member, and the other is moved up and down while being in contact with a straw, such that the straw of the discharging member is aligned with the inlet portion of the mixing container in the part holding unit, and
   wherein when assembling the second container to form a compact container, one of the first conveying unit and the second conveying unit seats the base container constituting the second container on a part holding unit, and the other turns over the mixing container, such that cosmetic materials accommodated in the mixing container can be moved to the base container.

7. The cosmetic manufacturing apparatus of claim 1, further comprising a part holding unit on which the mixing container and the component in the part supply unit are moved and seated,
   wherein the part holding unit includes:
   a seat portion providing a space in which a first container to be provided as a pump-type container can be assembled; and
   an assembly portion providing a space in which the second container to be provided as a compact container can be assembled.

8. The cosmetic manufacturing apparatus of claim 1, wherein the component in the part supply unit includes a discharging member provided as a part of a first container,
   wherein the conveying means:
   moves the mixing container in the part supply unit to the cosmetic material supply unit so that the mixing container provided as an empty container from the part supply unit receives cosmetic materials,
   moves the mixing container in the cosmetic material supply unit to the mixing unit where the cosmetic materials accommodated in the mixing container is mixed,
   moves the mixing container in the mixing unit to a part holding unit so as to provide the mixing container as a part of the first container, and
   moves the discharging member in the part supply unit to above the mixing container in the part holding unit, and couples the discharging member with the mixing container.

9. The cosmetic manufacturing apparatus of claim 1, wherein the component in the part supply unit further includes a cover container for covering the impregnating member, which is provided as a part of the second container, and
   wherein the conveying means:
   moves the mixing container in the part supply unit to the cosmetic material supply unit so that the mixing container provided as an empty container from the part supply unit receives cosmetic materials,
   moves the mixing container in the cosmetic material supply unit to the mixing unit where the cosmetic materials accommodated in the mixing container is mixed,
   moves the base container in the part supply unit to a part holding unit, and
   tilts the mixing container storing the cosmetic materials above the top of the base container so that the base container in the part holding unit receives the cosmetic materials.

10. The cosmetic manufacturing apparatus of claim 1, wherein the cosmetic material supply unit includes:
    a cosmetic supply means for discharging a predetermined amount of cosmetic material stored in a cartridge;
    a plurality of discharging holes through which cosmetic materials conveyed from the cosmetic material supply unit are discharged; and
    a mixing container conveying unit that fixes the mixing container to accommodate the cosmetic materials discharged from the plurality of discharging holes into the mixing container, and is movable under the discharging holes.

11. The cosmetic manufacturing apparatus of claim 1, wherein a table is provided on one side of the conveying means, the moisture absorption tool is provided under the table, and a part holding unit on which at least one of the mixing container and the component can be seated is disposed on the top of the table.

12. The cosmetic manufacturing apparatus of claim 1, wherein the part supply unit includes:
- a tray on which the component can be placed;
- a first container component support for supporting a mixing container and a discharging member, which are provided as parts of a first container; and
- a second container component support for supporting the base container, the impregnating member, and a cover container, which are provided as parts of the second container.

* * * * *